United States Patent [19]
Nakashima

[11] Patent Number: 5,729,251
[45] Date of Patent: Mar. 17, 1998

[54] INFORMATION INPUT/OUTPUT SYSTEM

[75] Inventor: Tadashi Nakashima, Kanagawa, Japan

[73] Assignee: Fuji Xerox Co., Ltd., Tokyo, Japan

[21] Appl. No.: 596,486

[22] Filed: Feb. 5, 1996

[30] Foreign Application Priority Data

Feb. 9, 1995 [JP] Japan ................................. 7-021961

[51] Int. Cl.$^6$ .................................................. G06F 17/00
[52] U.S. Cl. .................................................. 395/200.2
[58] Field of Search ................... 364/514 R; 395/200.2; 178/17 D, 18, 19, 20; 345/173, 175, 180

[56] References Cited

U.S. PATENT DOCUMENTS

| | | | |
|---|---|---|---|
| 5,420,379 | 5/1995 | Zank et al. | 178/19 |
| 5,477,012 | 12/1995 | Sekendur | 178/18 |
| 5,495,269 | 2/1996 | Elrod et al. | 345/178 |
| 5,504,279 | 4/1996 | Sizer, II | 178/19 |
| 5,526,023 | 6/1996 | Sugimoto et al. | 345/173 |
| 5,528,002 | 6/1996 | Katabami | 178/18 |
| 5,554,828 | 9/1996 | Primm | 178/18 |
| 5,557,076 | 9/1996 | Wieczorek et al. | 178/19 |
| 5,561,446 | 10/1996 | Montlick | 345/173 |

FOREIGN PATENT DOCUMENTS

| | | |
|---|---|---|
| 1-13125 | 3/1989 | Japan . |
| 4-44117 | 2/1992 | Japan . |
| 4-47321 | 2/1992 | Japan . |
| 4-130515 | 5/1992 | Japan . |
| 5-24556 | 4/1993 | Japan . |
| 5-181582 | 7/1993 | Japan . |
| 5-233125 | 9/1993 | Japan . |
| 6-35604 | 2/1994 | Japan . |
| 6-35923 | 2/1994 | Japan . |
| 6-83472 | 3/1994 | Japan . |
| 6-83516 | 3/1994 | Japan . |

*Primary Examiner*—Ellis B. Ramirez
*Attorney, Agent, or Firm*—Finnegan, Henderson, Farabow, Garrett & Dunner, L.L.P.

[57] ABSTRACT

An information input/output system is made up of an information processing device and a wireless coordinate indicator. The information processing device provided with a display for displaying an object to be processed at a desired position, a position detector for detecting positional information based on indication information from the wireless coordinate indicator, a code extractor for extracting coded information from the indication information, an information controller for storing detected positional information and the extracted coded information by associating the information items with each other, and an information processing device for carrying out predetermined processing. The wireless coordinate indicator provided with a storage device for storing the coded information, and a signal transmission device for transmitting the coded information and the positional information to the information processing device. The coded information is transmitted from the wireless coordinate indicator to the information processing device on the basis of positional relationship associated with coordinate indicating points of the object on the display.

27 Claims, 67 Drawing Sheets

FIG.12
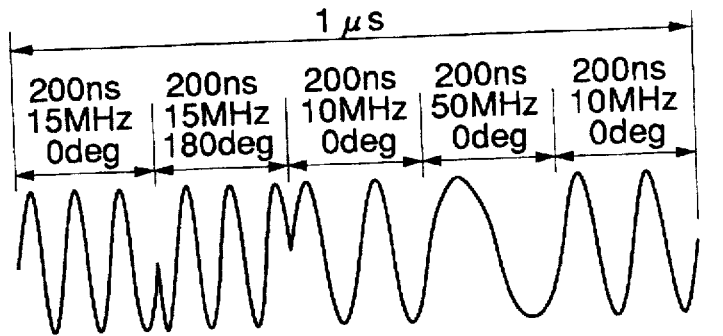
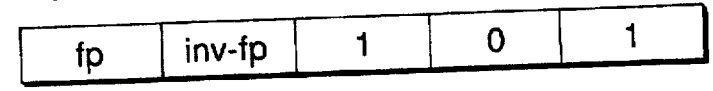
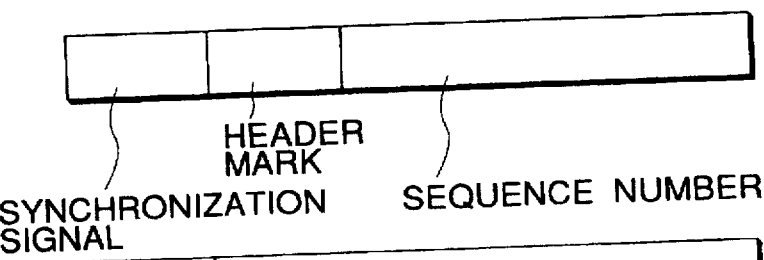
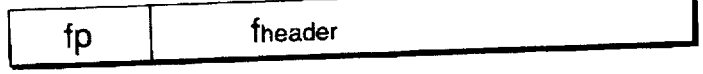
FIG.13
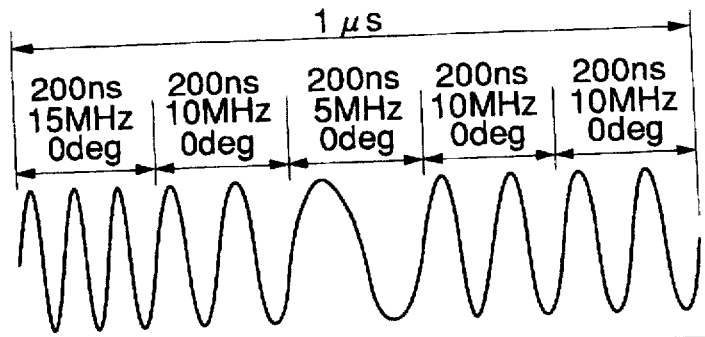
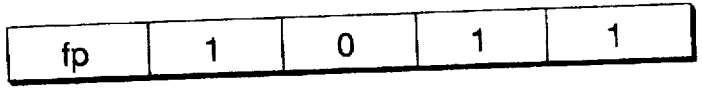
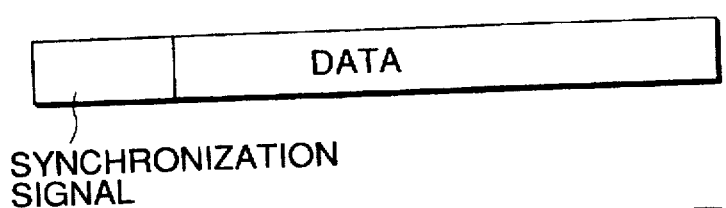
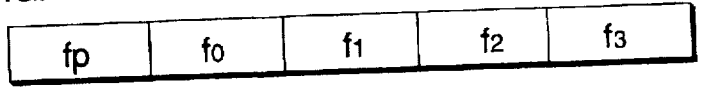

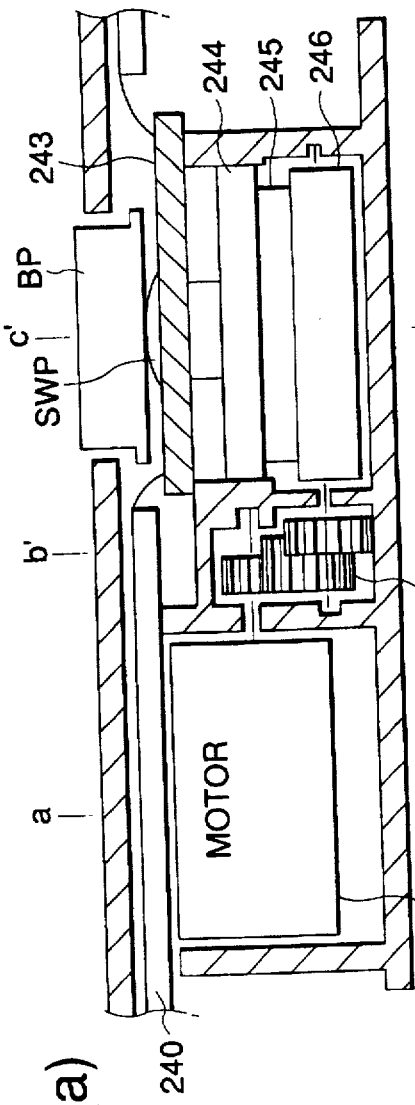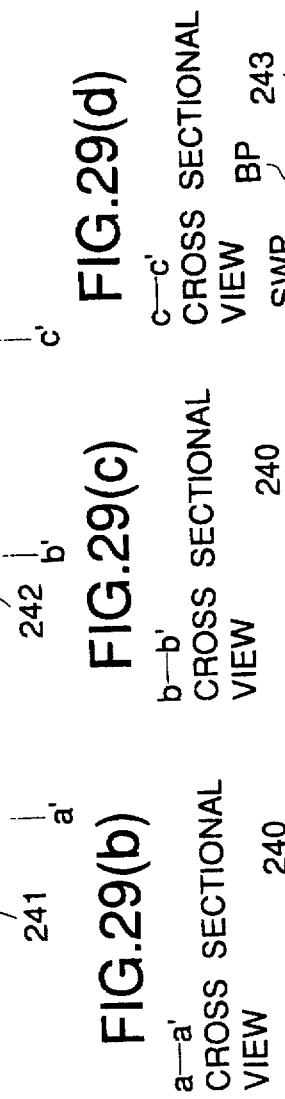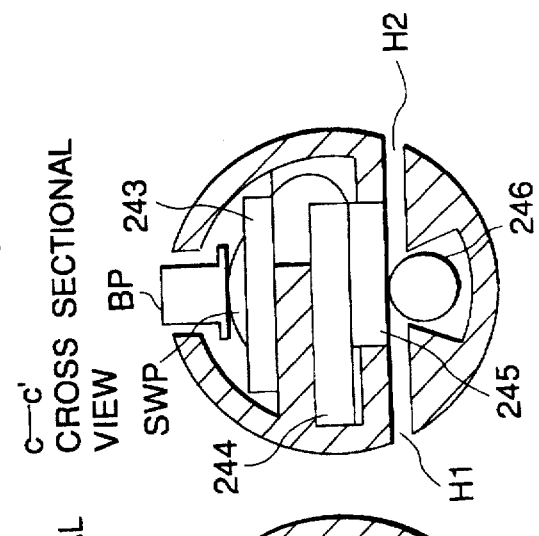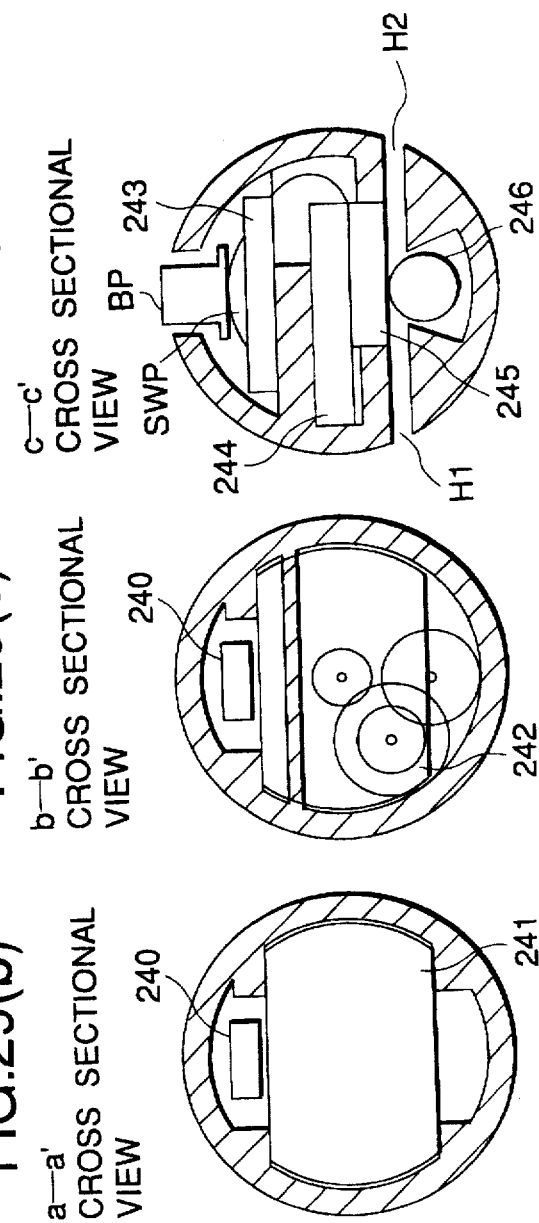

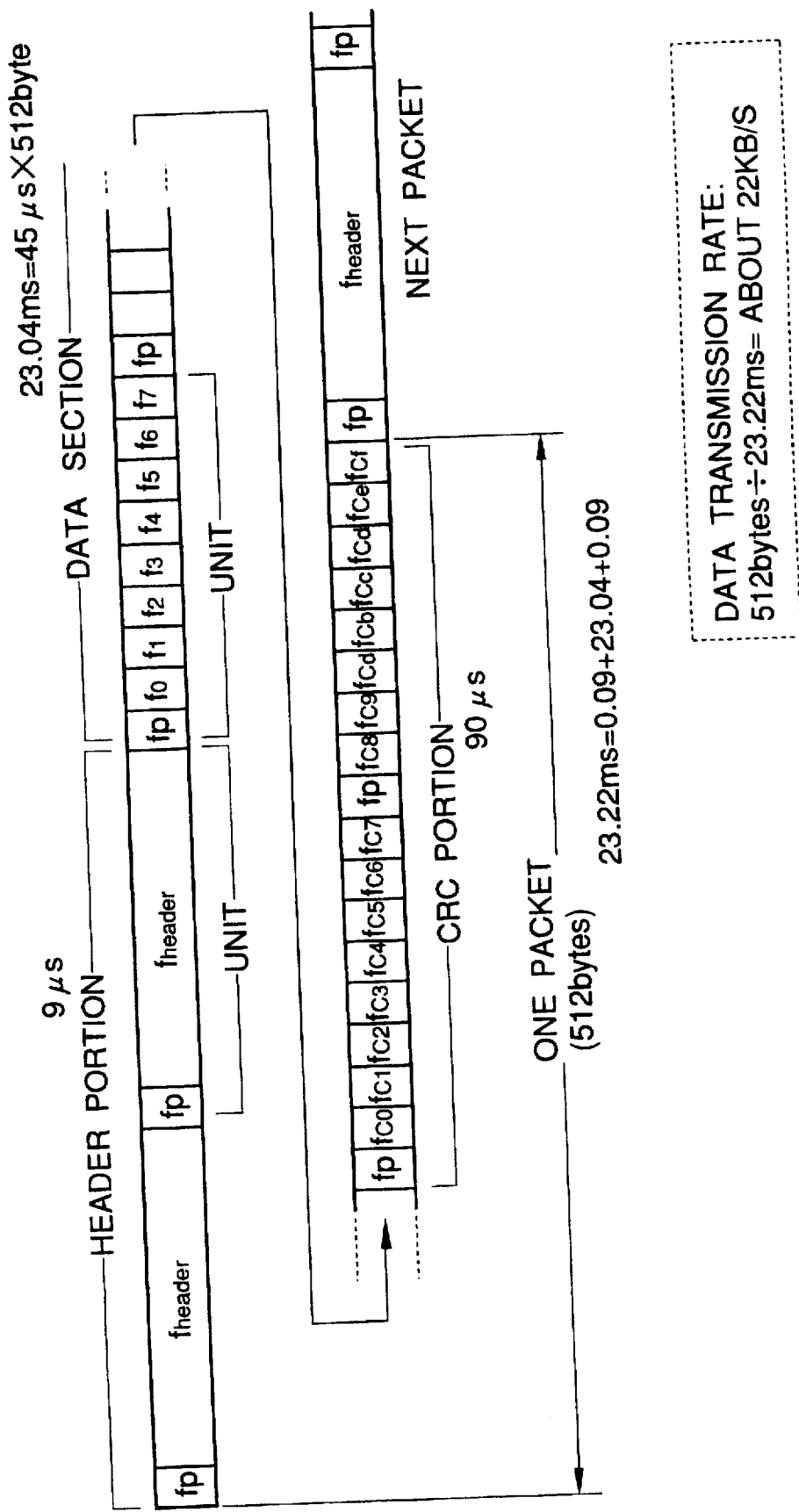

FIG.33

| IDENTIFICATION SIGNAL | fp | inv. fp | inv. fp | b2 | b3 | b4 | b5 | b6 | b7 | fp | b8 | b9 | b10 | b11 | b12 | b13 | b14 | b15 |
|---|---|---|---|---|---|---|---|---|---|---|---|---|---|---|---|---|---|---|
| MEANING | SYNC. HEADER SIGNAL MARK | | | TRANSMISSION OR RECEIPT | SEQUENCE NUMBER (#0~#63) | | | | | SYNC. SIGNAL | MESSAGE (0~15) | | | | ECC FOR b2 TO b11 (HAMMING CODE) | | | | b2 MEANING
0 SEQUENCE NO. MEANS TRANSMITTED PACKET
1 SEQUENCE NO. MEANS RECEIVED PACKET

| NO. | MEANING (WHEN b2=0) | MEANING (WHEN b2=1) |
|---|---|---|
| 0 | NO MEANING | STATUS : NORMAL |
| 1 | DATA TRANSMISSION REQUEST | STATUS : SYNC. ERROR |
| 2 | DATA TRANSMISSION AND LIGHT SENSITIVITY CORRECTION | STATUS : HEADER ERROR |
| 3 | LIGHT SENSITIVITY CORRECTION | STATUS : DATA PARITY ERROR |
| OTHERS | RESERVATION CODE | RESERVATION CODE |

ELECTROMAGNETIC SIGNAL IDENTIFICATION SYMBOLS

MEANING

SYNC. SIGNAL

FIG.41

| IDENTIFICATION SYMBOL | b0 | b1 | b2 | b3 | b4 | b5 | b6 | b7 | b8 | b9 | b10 | b11 | b12 | b13 | b14 | b15 |
|---|---|---|---|---|---|---|---|---|---|---|---|---|---|---|---|---|
| MEANING | DUMMY (b0=0, b1=0) | | TRANSMISSION OR RECEIPT | SEQUENCE NUMBER (#0~#63) | | | | | MESSAGE (0~15) | | | | ECC FOR b2 TO b11 (HAMMING CODE) | | | | b2 MEANING
0 SEQUENCE NO. MEANS TRANSMITTED PACKET
1 SEQUENCE NO. MEANS RECEIVED PACKET

NO. MEANING (WHEN b2=0)
0 DATA TRANSMISSION
1 STATUS TRANSMISSION REQUEST
2 DATA TRANSMISSION AND ELECTROMAGNETIC SENSITIVITY CORRECTION
3 ELECTROMAGNETIC SENSITIVITY CORRECTION
OTHERS RESERVATION CODE

NO. MEANING (WHEN b2=1)
0 STATUS : NORMAL
1 STATUS : SYNC. ERROR
2 STATUS : HEADER ERROR
3 STATUS : DATA CRC ERROR
OTHERS RESERVATION CODE

COORDINATE INDICATOR WITH
ONE-DIMENSIONAL IMAGE SENSOR

DISPLAY SURFACE

POSITION DETECTION UTILIZING ELECTROMAGNETIC

RUBBER ROLLER

LED 500

ANOTHER LED

DISP-E,E', F,F'···

ANOTHER DISP

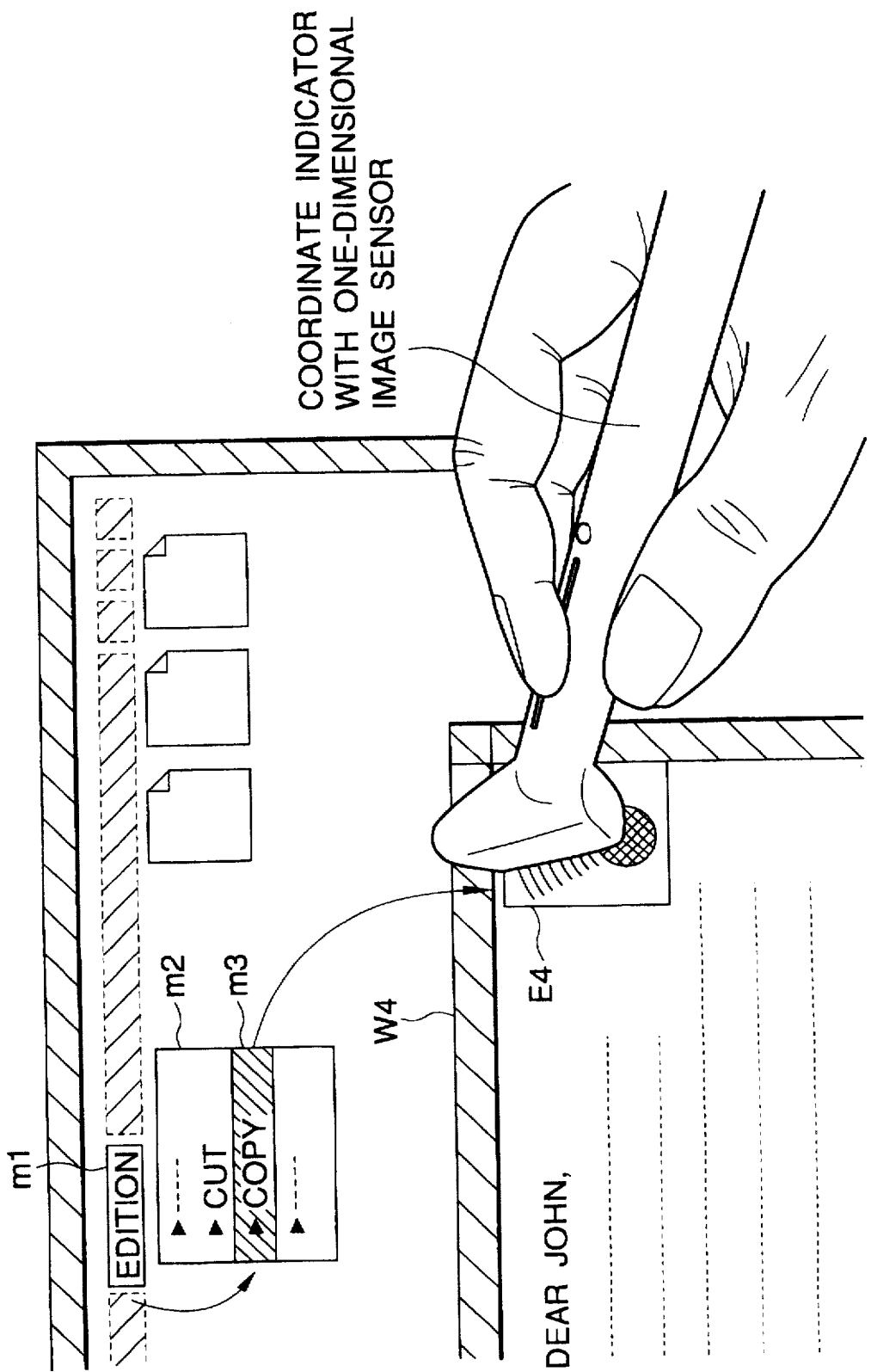

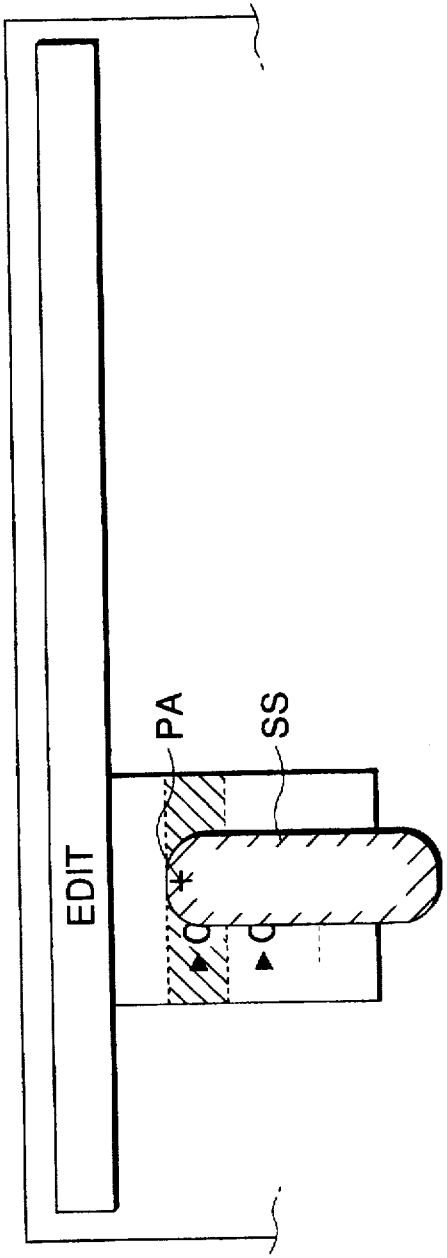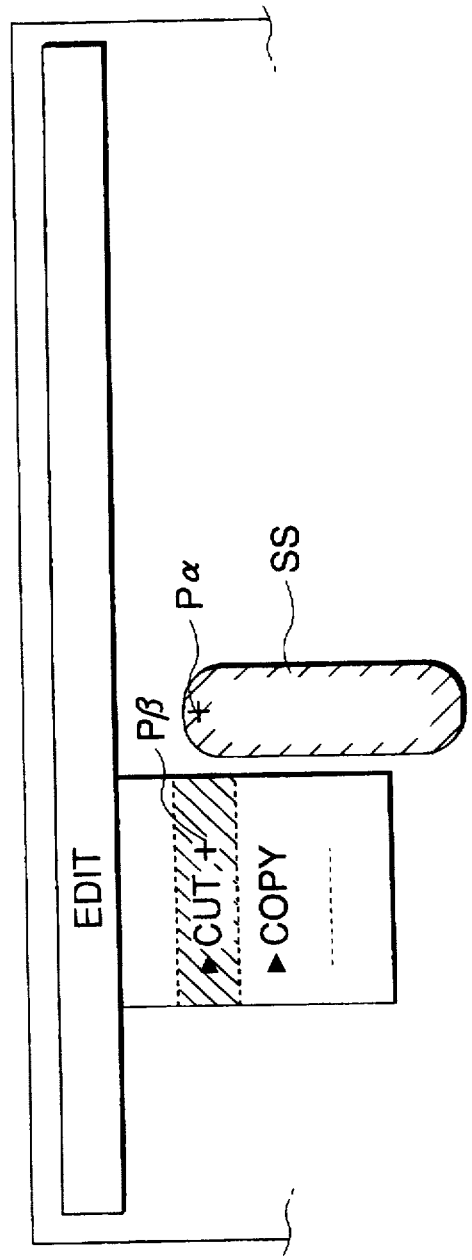

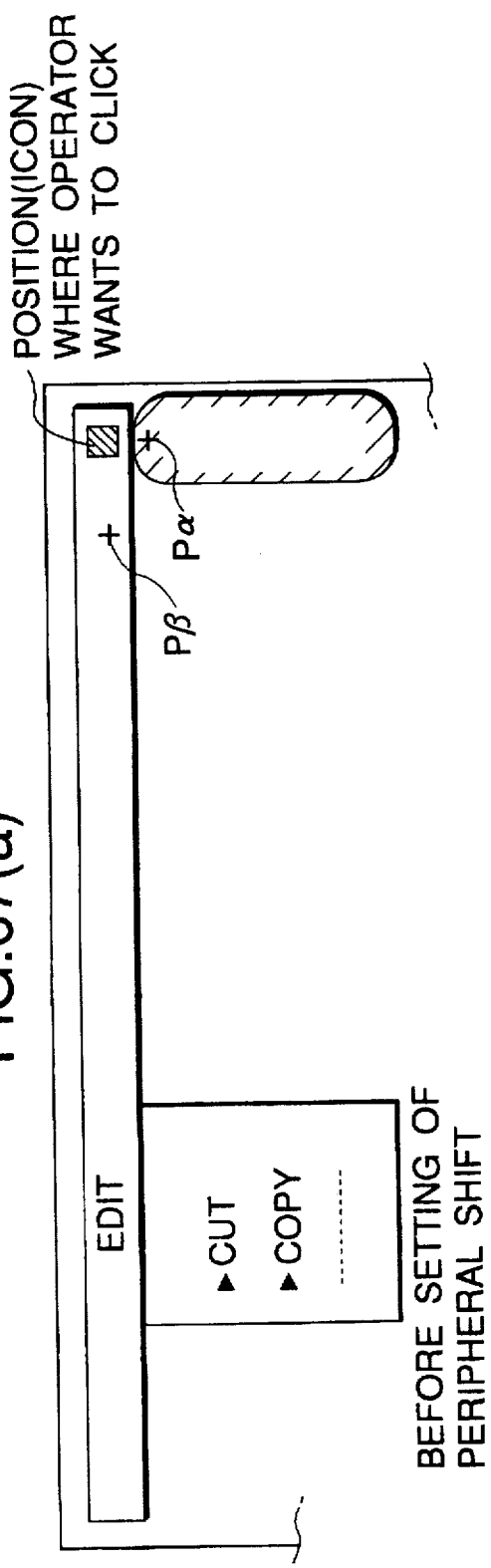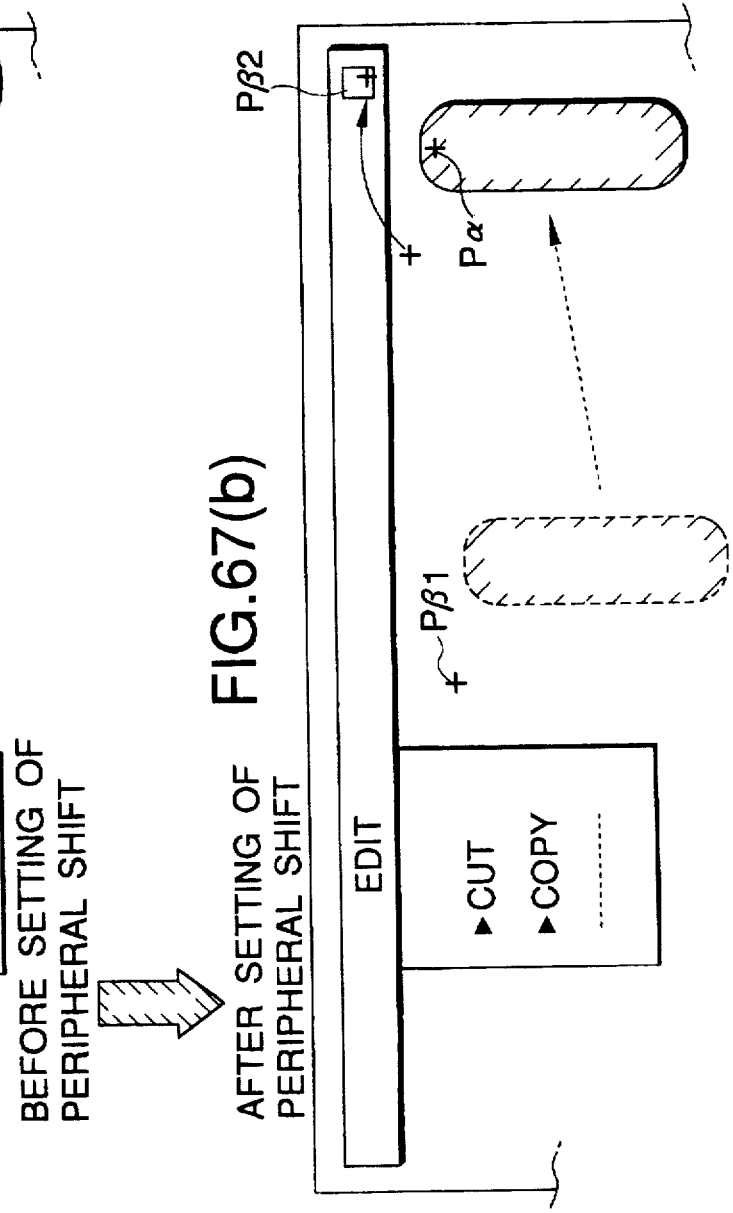

RELATIONSHIP BETWEEN AMOUNT OF SHIFT OF PHYSICAL COORDINATE AND ANGLE OF RELATIVE ROTATION OF LOGICAL COORDINATE IN A SHIFT TRANSMISSION STATE

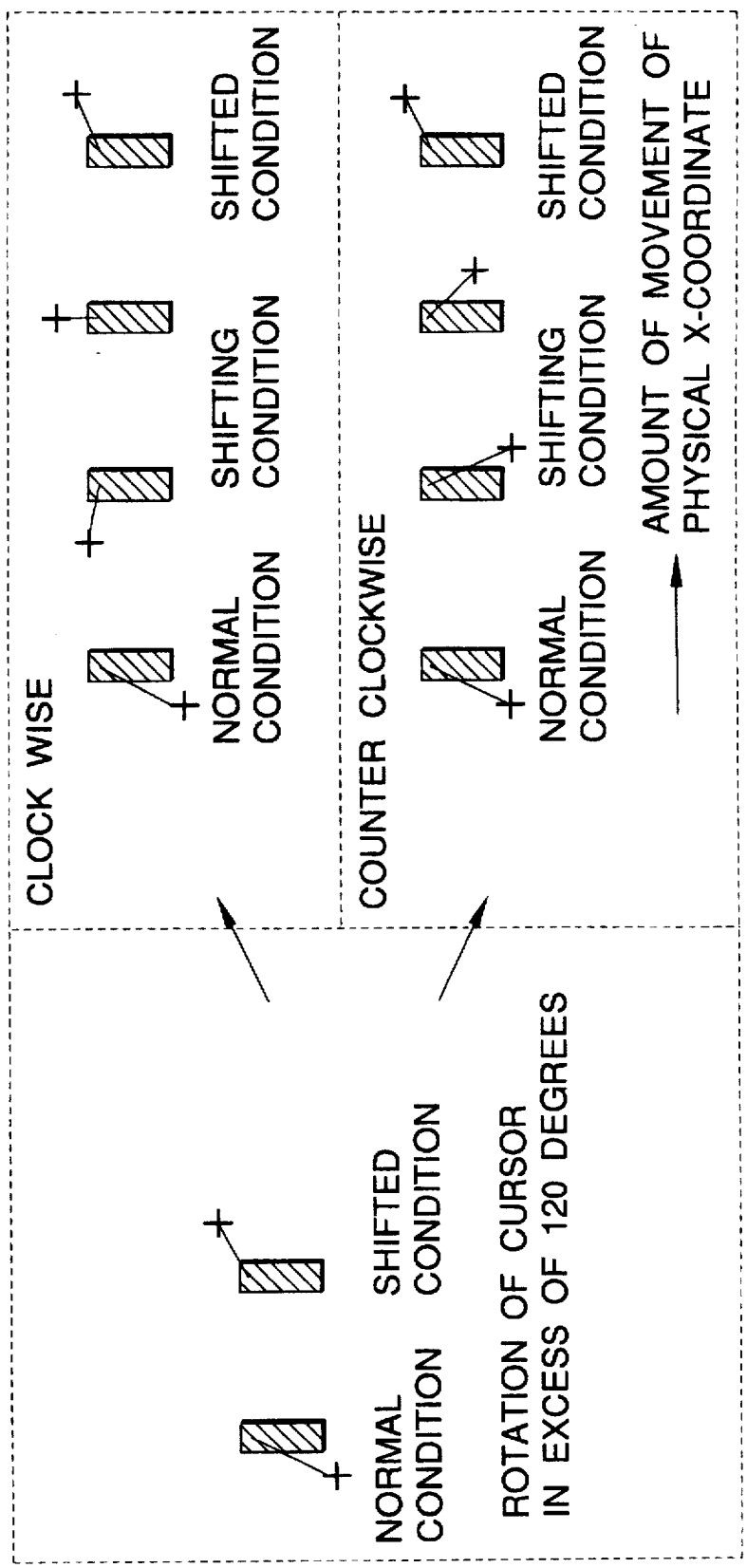

COORDINATE INDICATOR
WITH ONE-DIMENSIONAL
IMAGE SENSOR

RECTANGULAR REGION TO BE DISPLAYED IN MODULATED WAY

TIME DEPENDING NOT ON THE NUMBER OF ASSOCIATED LINES AND TOTAL NUMBER OF X LINES BUT ON THE AMOUNT OF TRANSMITTED CODE

INFORMATION INPUT/OUTPUT SYSTEM

BACKGROUND OF THE INVENTION

1. Field of the Invention

Generally, there is a conventional information processing system which stores and displays image information corresponding to image files registered in a personal computer.

2. Description of the Prior Art

User's operating procedures for transferring information in an information processing system as shown in, for example, FIG. 76 are processed in the manner as shown in FIG. 77. A desired image is photographed with a CCD camera 1000, and this image is stored in a nonvolatile memory card 1001 as image information (step S51). The nonvolatile memory card 1001 holding the image information is removed from the CCD camera 1000 (step S52), and the thus removed nonvolatile memory card 1001 is inserted into a memory card reader 1002 connected to a personal computer PC through a cable (step S53). Thereafter, the user specifies reading operation on a display screen of the personal computer PC using a mouse 1003 (step S54). Further, a target device is designated after the reading of the image information (step S55), whereupon the image information is stored and displayed as information associated with an image file on the personal computer PC. Accordingly, in a conventional information processing system, when information is transferred, a user is forced to perform a number of operating procedures, thereby resulting in laborious operation and time-consuming processing.

To solve these problems, there is an image processing system in which it is possible to transfer various types of information between an information processing system with a display section which carries out various types of information processing and a wireless coordinate indication device such as a stylus pen.

Hereinbelow, an explanation will be given of an information processing system, a wireless coordinate indication device, or an information input/output system consisting of the information processing system and the wireless coordinate indication device which are integrated into one assembly.

With reference to the wireless coordinate indicator as disclosed in japanese Patent Publication. No. Hei. 4-130515, there is a coordinate position measuring device in which attributes are transferred by modifying a current, which flows through a coil, using codes corresponding to a switch. Moreover, there is a wireless coordinate reading device and a switching information detection method of a coordinate indicator display as disclosed in Japanese Patent Publication. No. Hei. 4-47321, in which the state of a switch is transmitted by utilization of the phase of an induced signal varied depending on the state of the switch.

On the other hand, in addition to coordinate position indication by means of a pen, for example, Japanese Patent Publication No. Hei. 6-35923 discloses an operating management system as a coordinate indication system which transmits information to be transferred by radio. The operating management system identifies each operator without the operator being aware of it and provides operating management and service for each operator. An information processing system, as disclosed in Japanese Patent Publication No. Hei. 6-83472, comprises a wireless coordinate indication device which sends a password by radio and identifies each person using the thus transferred password.

There is another wireless coordinate indication device wherein neither a switch, an attribute nor restricted identification information associated with the previously mentioned coordinate indication but indefinite coded information is transmitted by radio, and coded information is transmitted using position detection means. For example, Japanese Patent Publication. No. Hei. 5-210453 discloses a wireless coordinate indication device which generates pulses corresponding to the rotation of a dial of the device and transmits massive amounts of coded information is transmitted by means the pulses.

All of the previously mentioned information transmission systems are intended to transmit information from a coordinate indication device to an information processing device. However, there is also another type of a coordinate input device with a display which transmits information from the information processing device to a wireless coordinate indication device as disclosed in, for example, Japanese Patent Publication No. Hei. 4-44117. In this coordinate input device, an electromagnetic signal for position sensing purposes emitted from an information processing device is modified in agreement with data to be displayed, and a coordinate indicator displays the thus modified electromagnetic signal upon receipt thereof.

In addition to the coordinate input device using electromagnetic coupling by means of electromagnetic signals, there is a device which uses optical coupling. In a liquid crystal display device as disclosed in, for example, Japanese Patent Publication. No. Hei. 1-13125, row electrodes or column electrodes of a liquid crystal device of an active matrix type also serve as photosensitive elements, and they read data.

There is also a typical device, for receiving positional information from a display for information equipment, which is made by the combination of a CRT and a light pen. There is another type of device which acquires arbitrary information from a display appeared on a display unit of information equipment. A data output device as disclosed in, for example, Japanese Patent Publication. No. Hei. 5-24556, is designed so as to read coded information by turning on and off a liquid crystal display without manually scanning the information using a general bar code reader.

There is also a coordinate indicator which is removable from an information processing system, in which information stored in the coordinate indicator such as a pen is transmitted to another information processing device which is not physically connected to the coordinate indicator. A coordinate input device as disclosed in, for example, Japanese Patent Publication. No. Hei. 6-35604, is provided with a separate information storage processing section, and input information is easily moved to another location. In a display data transfer method and a pen-pen adaptor as disclosed in Japanese Patent Publication. No. Hei. 5-181582, information is moved by using a pen with a memory function as an information medium, thereby providing free combination of information with an information processing system.

Further, there is a coordinate indicator, with the function of collecting information and generating coded information based on the collected information, having a bar code input pen which also acts as a stylus pen for coordinate indication purposes. In other words, in a hand writing device as disclosed in Japanese Patent Publication No. Hei. 6-83516, a coordinate indicator having one type of pen shape allows manual input and bar-code input. In a multimedia information input device as disclosed in Japanese Patent Publication No. Hei. 5-233125, an image photographed by an imaging device attached to a stylus pen is transmitted by radio, and an icon or a display of the image is displayed at the position indicated as a result of manual input using the stylus pen.

However, the prior arts as set forth have the following problems:

1) Convenience and degree of freedom of wireless

Coded information transmission using a conventional coordinate indicator is based on the use of a physically and separately connected cable. However, in this case, it is necessary to provide the coordinate and an information processing system with an interface connecter and an adaptor (as disclosed Japanese Patent Publication Nos. Hei. 6-35604 and Hei. 5-181582). Accordingly, physical constraints such as the use of the interface connector and adaptor result in poor information transmission operation and laborious removal of a connector and also make it difficult to reduce the size or thickness of the coordinate indicator and the information processing system.

For example, when information is transferred between two information processing systems using a coordinate indicator as shown in FIG. 78, the user is forced to perform operating procedures as shown in FIG. 79. In other words, the user selects object items to be transferred appeared on a display screen of an information processing system PC1 which is the source of transmission, using a coordinate indicator PEN (step S61). Thereafter, the coordinate indicator PEN is inserted into an adaptor AD1 added to the information processing system PC1 (step S62), and the selected information is fetched. After the fetching of the information, the coordinate indicator PEN holding the fetched information is moved to an information processing system PC2 which is a target device (step S63). The target device displayed on the display screen of the information processing device PC2 is indicated (step S64), and the coordinate indicator PEN is inserted into an adaptor AD2 added to the information processing device PC2 (step S65). Information stored in the coordinate indicator PEN is read by the information processing device PC2 via the adaptor AD2, as a result of which the transfer of the information is completed. In this way, a user is conventionally forced to perform a lot of operating procedures in transmitting information, and the adaptors AD1 and AD2 must be provided to transfer information.

2) General Versatility of Transmission Coded information

Information to be transmitted from the coordinate indicator conventionally comprises information associated with hand-writing input such as the change of thickness and color of a line using a switch, information about the state of a plurality of switches, and information about the identification of a person who inputs information (as disclosed in Japanese Patent Publication. Nos. Hei. 4-130515, Hei. 4-47321, Hei. 6-35923, and Hei. 6-83472). On the other hand, information to be transmitted to the coordinate indicator comprises information used as display data for a display unit (as disclosed in Japanese Patent Publication No. Hei. 4-44117). However, a device which handles such an information item does not handle other information items having general versatility. Moreover, only a part of an information item is transmitted by radio. Therefore, information handled by equipment capable of transmitting coded information by radio is limited, and hence the equipment has poor versatility.

3) Synergistic Function obtained by Combination of Coordinate Indicator with Information Processing System Conventionally, some devices comprise a position detector employing optical coupling and an indicator, both of which are assembled into one unit. However, the relationship between an indicated coordinate position and coded information to be transmitted is not specified (as disclosed Japanese Patent Publication. No. Hei. 1-13125).

In addition, some devices comprise a display unit combined with a bar code reader, and some devices comprise a coordinate indicator combined with a bar code for collecting information. Even in the case of these devices, the relationship between coordinate indication and coded information to be transmitted is not specified (as disclosed in Japanese Patent Publication No. Hei. 5-24556).

Further, some devices comprise a coordinate indicator combined with an information memory function, and, even in this case, the relationship between coordinate indication and coded information to be transmitted is not specified (as disclosed in Japanese Patent Publication No. Hei. 6-83516).

In this way, in the conventional devices, coordinate indication is irrelevant to coded information to be transmitted, and therefore it is impossible for the user to transmit desired coded information by means of a coordinate indicator.

On the other hand, in the case of a device comprising a coordinate indicator combined with an image pick-up device (as disclosed in Japanese Patent Publication. No. Hei. 5-233125), there is a specified relationship between coordinate indication and coded information to be transmitted. However, in this case, a coordinate indicator is not integrated with an information processing device. In other words, coordinate indication which the coordinate indicator provides is independent of communication between the coordinate indicator and the information processing device. Even when coordinate indication is available, communication is not necessarily established between the coordinate indicator and the information processing device, wherefore it becomes impossible to effect communication timely. Transmission/reception sections for communication purposes are provided completely separately from the position indicated by the coordinate indicator, and therefore a signal to be transmitted travels through space which serves as medium. For this reason, the space through which the signal to be transmitted travels is more likely to be interrupted, and the signal might cause reflection or the like, which, in turn, puts communication out of action or brings about radio interference. As a result of this, unreliable communication is effected.

4) Miniaturization and Simplification of Constituent Elements, and High-speed Transmission A device comprising a conventional coordinate indicator combined with an image pick-up device, or a device which emits information input operator identification information, is provided with transmission/reception means specialized for sending information when information is transmitted to an opposite information processing device. This specialized transmission/reception means is implemented in the form of a radio communication device or an infrared communication device so as to make it possible to realize high-speed transmission. Hence, this type of device requires a power amplifying function or a complicated signal conversion function in order to effect high-speed information transmission, thereby rendering the device bulky, heavy, and expensive.

5) Reduced Number of Times of Operation and Smoothing of Sequential Operations

In the case of a device comprising a conventional coordinate indicator combined with an information memory function, it is necessary to insert the coordinate indicator to an adaptor when information is transmitted. In a series of working operations, the number of times of operation increase, and the flow of a series of operations is interrupted.

5

The items 1) to 5) set forth above are closely related with each other.

SUMMARY OF THE INVENTION

A first object of the present invention is to provide an information input/output system which eliminates the previously mentioned problems, improves the convenience of a wireless coordinate indicator, and can be reduced in size and thickness.

A second object of the present invention is to provide an information input/output system which employs coded information having general versatility as coded information to be transmitted between a wireless coordinate indicator and an information processing device.

A third object of the present invention is to provide an information input/output system capable of providing coded information, which is to be transmitted between a wireless coordinate indicator and an information processing device, with contents closely related with coordinate indication obtained by the wireless coordinate indicator, and transmitting the coded information at a position closely related with that coordinate indication.

A fourth object of the present invention is to provide an information input/output system capable of making it possible to realize high-speed transmission as well as implementing compact, thin, and light-weight wireless coordinate indicator and information processing device.

A fifth object of the present invention is to provide an information input/output system capable of reducing operating time as well as improving sequential operability by reducing the number of devices to be operated and the number of times each device is operated.

As view of the first aspect of the invention, there is provided with an information input/output system comprising: (1) an information processing device including: display means for displaying an object to be processed at a desired position; position detection means for detecting positional information based on indication information from outward; code extraction means for extracting coded information from the indication information; information control means for storing the detected positional information and the extracted coded information by associating with each other; and information processing means for carrying out predetermined processing; and (2) a wireless coordinate indicator including: storage means for storing the coded information; and signal transmission means for transmitting the coded information and the positional information to the information processing device; wherein the coded information is transmitted from the wireless coordinate indicator to the information processing device on the basis of positional relationship associated with coordinate indicating points of the object on the display means.

As view of the second aspect of the invention, there is provided with an information input/output system comprising: (1) an information processing device including: information control means for controlling an object to be processed and coded information associated with the object; display means for displaying the object at a predetermined position; position detection means for detecting positional information based on indication information from outward; coded information specifying means for specifying the associated coded information based on the detected positional information; and signal generation means for transmitting the thus specified coded information to outward; and (2) a wireless coordinate indicator including: signal transmission means for transmitting the positional information to the

6 information processing device; coded information receiving means for receiving the coded information from the information processing device; and storage means for storing the coded information; wherein the coded information is transmitted from the information processing device to the wireless coordinate indicator on the basis of positional relationship associated with coordinate indicating points of the object on the display means.

As view of the third aspect of the invention, information input/output system comprising: (1) an information processing device including: information control means for controlling an object to be processed and coded information associated with the object; display means for displaying the object at a predetermined position; indication information detection means for detecting positional information and the coded information based on indication information from outward; coded information specifying means for specifying associated coded information based on the detected positional information; signal generation means for transmitting the thus specified coded information to outward; information storage means for storing the detected positional information and the extracted coded information in the information control means by associating with each other; and information processing means for executing predetermined processing; and (2) a wireless coordinate indicator including: signal transmission means for transmitting the code information and the positional information to the information processing device; coded information receiving means for receiving the coded information from the information processing device; and storage means for storing the coded information; wherein the coded information is bidirectionally transmitted between the information processing device and the wireless coordinate indicator on the basis of positional relationship associated with coordinate indicating points of the object.

BRIEF DESCRIPTION OF THE DRAWINGS

FIG. 12 is a schematic representation showing the detailed configuration of a header unit of the information shown in FIG. 11;

FIG. 13 is a schematic representation showing the detailed configuration of a data unit of the information shown in FIG. 11;

FIGS. 29(a) to 29(d) are schematic representations showing the detailed configurations of the printer of the wireless coordinate indicator S2';

FIG. 32 is a schematic representation showing the overall configuration of information to be transmitted for one packet;

FIG. 33 is a schematic representation showing the detailed configuration of a header portion of the information to be transmitted shown in FIG. 32;

FIG. 41 is a schematic representation showing the configuration of the header portion, i.e., a word 0;

FIG. 61 is a schematic representation showing operation for transmitting document information from the information processing device to the wireless coordinate indicator and the state of the display when the document information is transmitted;

FIG. 62 is a schematic representation showing difficulty of indication of a coordinate indicating point;

FIG. 63 is a schematic representation showing the relationship between a physical coordinate indicating point and a logical coordinate indicating point;

FIGS. 67(a) and 67(b) are schematic representations showing the difficulty of indication of a coordinate indicating point in a peripheral area of the display;

FIGS. 69(a) to 69(c) are schematic representations showing the meanings of values set by the peripheral shift setting window;

DESCRIPTION OF THE PREFERRED EMBODIMENTS

With reference to the accompanying drawings, preferred embodiments of the present invention will be described hereunder.

The principal form of the present invention can be divided into the following three basic forms: namely, 1) Transmission of coded information from a coordinate indicator S to an information processing device T;

2) Transmission of the coded information from the information processing device T to the coordinate indicator S; and 3) Transmission of the coded information between the information processing device T and the coordinate indicator S.

The principal configuration which implements the above mentioned basic forms 1) to 3), and the outline of the operation of that principal configuration will be described in the order of the basic forms 1 to 3. The coded information used throughout the specification means digital information and comprises not only codes like characters but also image data.

Figure 1:
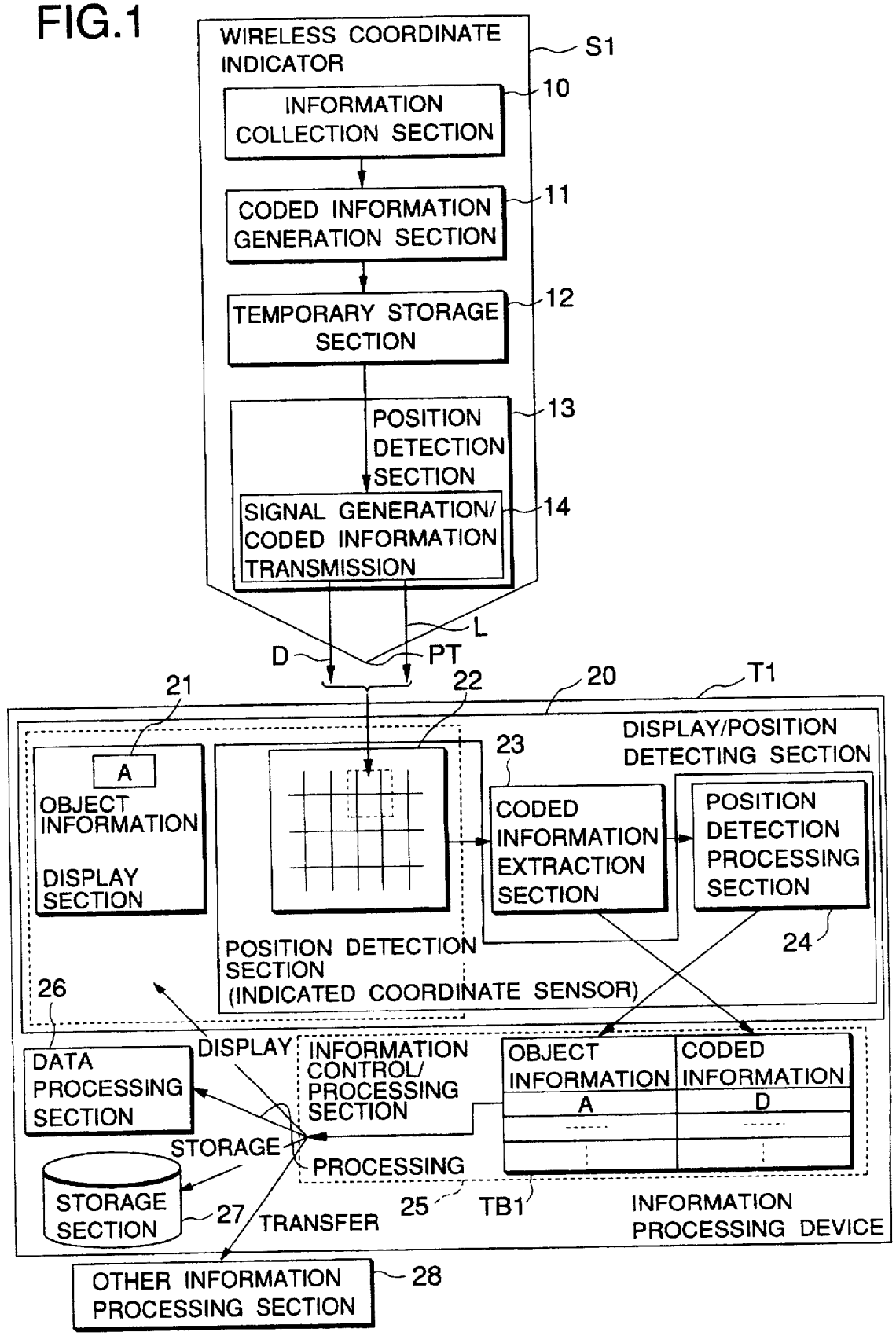
FIG. 1 is a schematic representation showing the principal configuration of an information input/output system according to a first embodiment of the present invention which corresponds to a basic form 1)

FIG. 1 is a schematic representation showing the basic configuration of an information input/output system according to a first embodiment of the present invention associated with the basic form 1). In FIG. 1, this information input/output system is substantially divided into a wireless coordinate indicator S1 and an information processing device T1.

The wireless coordinate indicator S1 is made up of an information collecting section 10, a coded information generation section 11, a temporal storage section 12, and a position detection section 13 which has a signal generation/coded information transmission section 14.

In the wireless coordinate indicator S1, information captured by the information collection section 10 is coded by the coded information generation section 11. The thus coded information D is temporarily stored in the temporal storage section 12. When an operation instruction is received from an operator, the coded information D is sent from the signal generation/coded information transmission section 14 within the position detection section 13 together with a position indication signal L which represents position.

Figure 4:
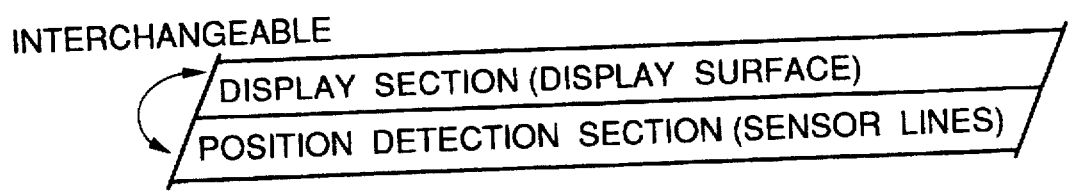
FIG. 4 is a schematic representation showing an example of the configurations of a display section 21 and a position detection section 22.
Figure 5:
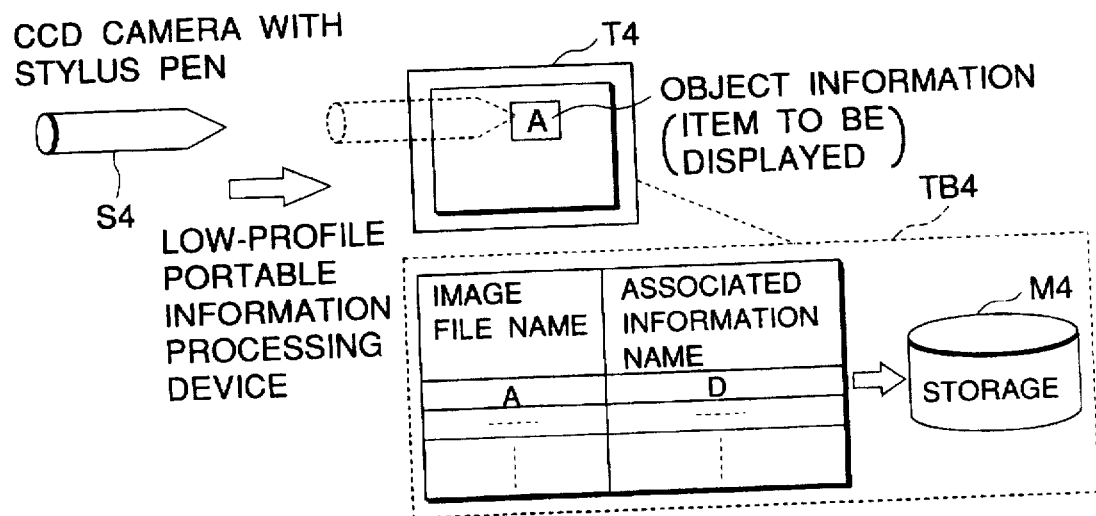
FIG. 5 is a schematic representation showing the state in which image information is transmitted from a stylus pen S4 with a CCD camera (corresponding to an information collection section 10), which corresponds to a wireless coordinate indicator S1, to a low-profile portable information processing device T4 corresponding to an information processing device T1.

The information processing device T1 is provided with a display/position detection section 20, an information control/processing section 25, a data processing section 26, and a storage section 27. This information processing device T1 is connected to another information processing section 28 through a network or the like. The display/position detection section 20 is made up of a display 21, such as a liquid crystal display, for outputting an object item or object position to be displayed (hereinafter referred to as object information) to a display, a position detection section 22 having a line matrix sensor which acts as an indicated coordinate sensor in close cooperation with the display 21, a coded information extraction section 23 for extracting coded information D from the information detected by the position detection section 22, and a position detection processing section 24 for detecting object information A from a position indication signal L which was not extracted by the coded information extraction section 23. The display 21 and the position detection section 22 are assembled into one unit so as to work in close cooperation with each other, and the specific configuration of this assembly is shown in FIG. 4. As the cross-sectional view in FIG. 4 shows, the display 21 may be laid over the position detection section 22, and vice versa.

The position detection section 22 of the information processing device T1 detects the coded information D and the position indication signal L input from the wireless coordinate indicator S1. Of these information items, the coded information D is extracted by the coded information extraction section 23, and thereafter the object information A is fetched from the position indication signal L by the position detection processing section 24. The coded information D extracted by the coded information extraction section 23 and the object information A fetched by the position detection processing section 24 are notified to the information control/processing section 25. The correspondence between the object information A and the coded information D which were notified to the information control/processing section 25 is controlled in the form of a control table TB. Display processing in the display 21, a processing request to the data processing section 26, storage processing in the storage section 27, or transmission to the another information processing section 28 is carried out in accordance with the correspondence in the form of the control table TB.

Figure 2:
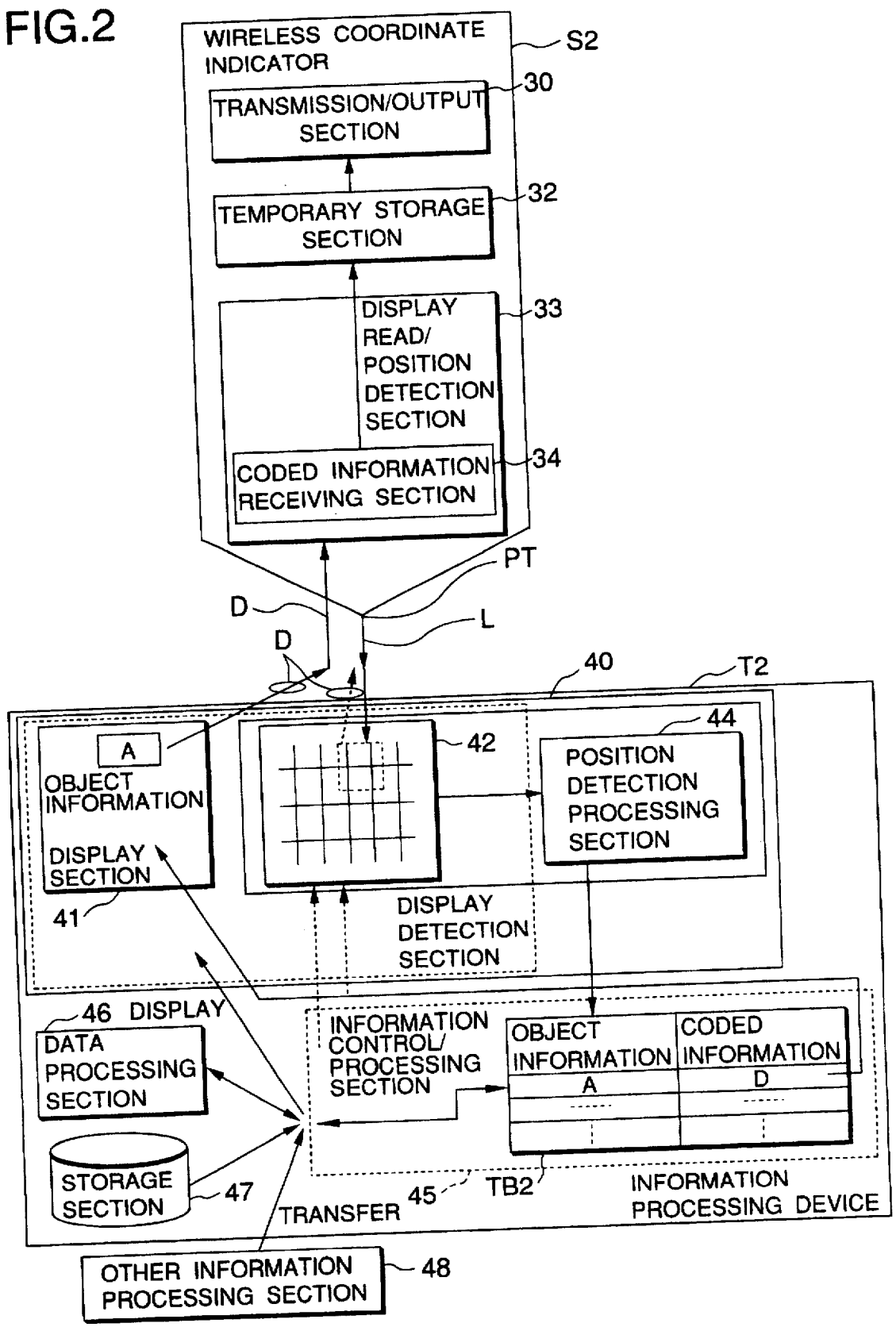
FIG. 2 is a schematic representation showing the principal configuration of an information input/output system according to a second embodiment of the present invention which corresponds to a basic form 2)

FIG. 2 is a schematic representation showing the principal configuration of an information input/output system according to a second embodiment of the present invention associated with the second basic form 2). In FIG. 2, this information input/output system is substantially divided into a wireless coordinate indicator S2 and an information processing device T2.

The information processing device T2 is provided with a display/position detection section 40, an information control/processing section 45, a data processing section 46, and a storage section 47. This information processing device T2 is connected to another information processing section 48 through a network or the like. The display/position detection section 40 is made up of a display 41, such as a liquid crystal display, for outputting object information A to a display or outputting the coded information D to a display in a modulated manner, a position detection section 42 having a line matrix sensor which acts as an indicated coordinate sensor in close cooperation with the display 41, and a position detection processing section 44 for detecting the object information A from the position indication signal L detected by the position detection section 42.

The position detection section 42 of the information processing device T2 detects the position indication signal L indicated and input by the wireless coordinate indicator S2, and the thus detected information is fetched from the object information A by the position detection processing section 44. This object information A is notified to the information control/processing section 45, and the information control/processing section 45 specifies associated coded information D based on a control table TB2. The information control/processing section 45 carries out, based on the specified coded information A, modulated display processing in the display 41, the issue of a processing request to, and the receipt of a result of the processing request from, the data processing section 46, the reading of associated information from the storage section 47, the issue of a transmission request to, and the receipt of information from, the another information processing section 48 in order to receive associated information from another the information processing section 48, the generation of new information within the control table TB2, and composite processing based on the results of the above-mentioned processing.

The wireless coordinate indicator S2 is provided with a transmission/output section 30, a temporal storage section 32, and a display read/position detection section 33. The display read/position detection section 33 has a coded information receiving section 34.

The coded information receiving section 34 of the wireless coordinate indicator S2 reads a modulated display output in the display/position detection section 40 which corresponds to the position indicated by the position indication signal L. The display read/position detection section 33 interprets the thus read signal as the coded information D, and this coded information D is stored in the temporal storage section 32. The coded information D temporarily stored in the temporal storage section 32 is transmitted to another device by means of the output section 30 or printed by means of the printing function of the output section 30.

Figure 3:
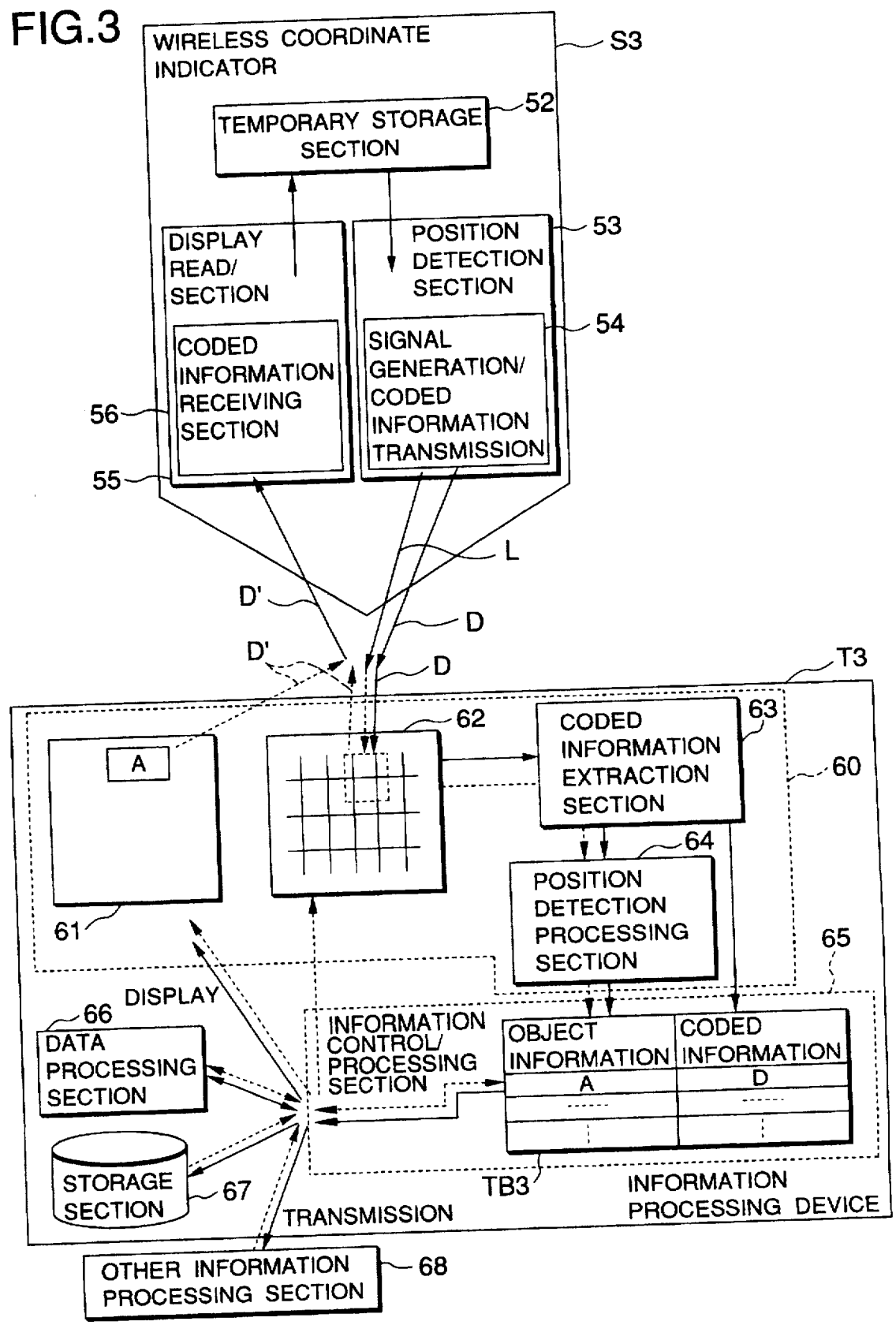
FIG. 3 is a schematic representation showing the principal configuration of an information input/output system according to a third embodiment of the present invention which corresponds to a basic form 3)

FIG. 3 is a schematic representation showing the principal configuration of an information input/output system according to a third embodiment of the present invention associated with a basic form 3). In FIG. 3, this information input/output system is substantially divided into a wireless coordinate indicator S3 and an information processing device T3. The information input/output system in this third embodiment is made by the combination of the first and second embodiments, so that it allows bidirectional communication.

In other words, the wireless coordinate indicator S3 is provided with a temporal storage section 52, a position detection section 53 including a signal generation/coded information transmission section 54, and a display reading section 55 including a coded information receiving section 56.

The information processing device T3 is provided with a display/position detection section 60, a coded information extraction section 63, an information control/processing section 65, a data processing section 66, and a storage section 67. This information processing device T3 is connected to another information processing section 68 through a network or the like. The display/position detection section 60 is made up of a display section 61, such as a liquid crystal display, for outputting the object information A to a display or outputting coded information items D and D' to a display in a modulated manner, a position detection section 62 having a line matrix sensor which acts as an indicated coordinate sensor in close cooperation with the display 61, and a position detection processing section 64 for detecting the object information A from the position indication signal L input from the position detection section 62 through the coded information extraction section 63.

When the coded information D is transmitted from the wireless coordinate indicator S3 to the information processing device T3, the coded information D stored in the temporal storage section 52 of the wireless coordinate indicator S3 is input to the position detection section 53 as instructed by the operator. The position detection section 54 produces outputs of the coded information D and the position indication signal L.

The coded information D and the position indication signal L output from the wireless coordinate indicator S3 are detected by the position detection section 62 of the information processing device T3. The coded information D of the thus detected information items is extracted by the coded information extraction section 63 and is notified to a control table TB3 of the information control/processing section 65. On the other hand, the position indication signal L is detected as the object information A by the position detection section 64, and the detected signal is then notified to the control table TB3. The information control/processing section 65 executes predetermined processing based on the correspondence of the control table TB3. For example, the information control/processing section 65 executes display processing in the display 61, data processing in the data processing section 66, storage processing in the storage section 67, and transmission of the information to the another information processing section 68.

When the coded information D' is transmitted from the information processing device T3 to the wireless coordinate indicator S3, the position detection processing section 64 detects the position indication signal L from the wireless coordinate indicator S3 as the object information A and notifies the information control/processing section 65 of a result of the detection within the display/position detection section 60 of the information processing device T3. The information control/processing section 65 refers to the control table TB3 and fetches the coded information D' associated with the notified object information A. Specifically, the coded information D' is fetched by carrying out data processing in the data processing section 66, the reading of information from the storage section 67, and the acquisition of information by transmitting the information from the information processing section 68. The thus fetched coded information D' is registered in the region of the control table TB3 associated with the object information A. The coded information D' is displayed in the display/position detection section 60, more particularly the display 61, in a modulated manner. The coded information receiving section 56 of the wireless coordinate indicator S3 reads the thus modulated display, and the display reading section 55 interprets the thus modulatedly displayed signal as the coded information D'. The thus read coded information D' is temporarily stored in the temporal storage section 52. As a result of this, the coded information D' is transmitted from the information processing device T3 to the wireless coordinate indicator S3.

According to the previously mentioned first to third embodiments, the operator's processing, such as the transmission of desired information between the wireless coordinate indicator and the information processing device, is considerably alleviated.

Figure 6:
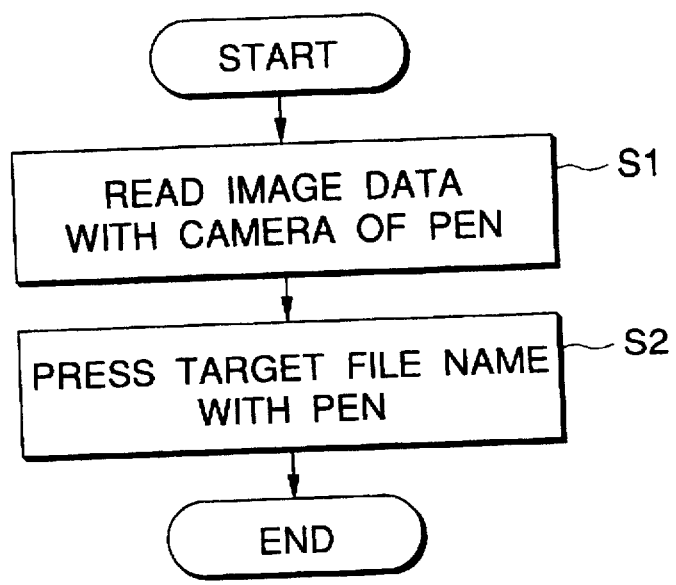
FIG. 6 is a flowchart showing procedures of an operator required when the image information is transmitted as shown in FIG. 5.

For example, when image information is transmitted from a stylus pen S4 with a CCD camera (corresponding to the information collection section 10), which corresponds to the wireless coordinate indicator S1, to a portable low-profile information processing device T4, the operator is required to perform only the processing as illustrated in a flowchart shown in FIG. 6. In other words, an image is read by the CCD camera of the stylus pen S4, and the thus read image information is converted into coded information D by the coded information generation section 11 within the stylus pen S4. The image information converted into the coded information is temporarily stored in the temporal storage section 12 (step S1). Upon reference to the display of the information processing device T4, the operator presses a desired file name (an object item, i.e., object information A) in a storage section M4 within the information processing device T4 using the pen tip (step S2: output of the position indication signal L). The display/position detection section detects the position of the file name, and the object information A, i.e., the image file name A, is specified by the position indication signal L. Information of the coded information D, that is, image information read by the stylus pen S4 is sequentially transmitted from the stylus pen S4 to the information processing device T4 with respect to the image file name A, and the thus transmitted image information is stored in the storage section M4.

Figure 7:
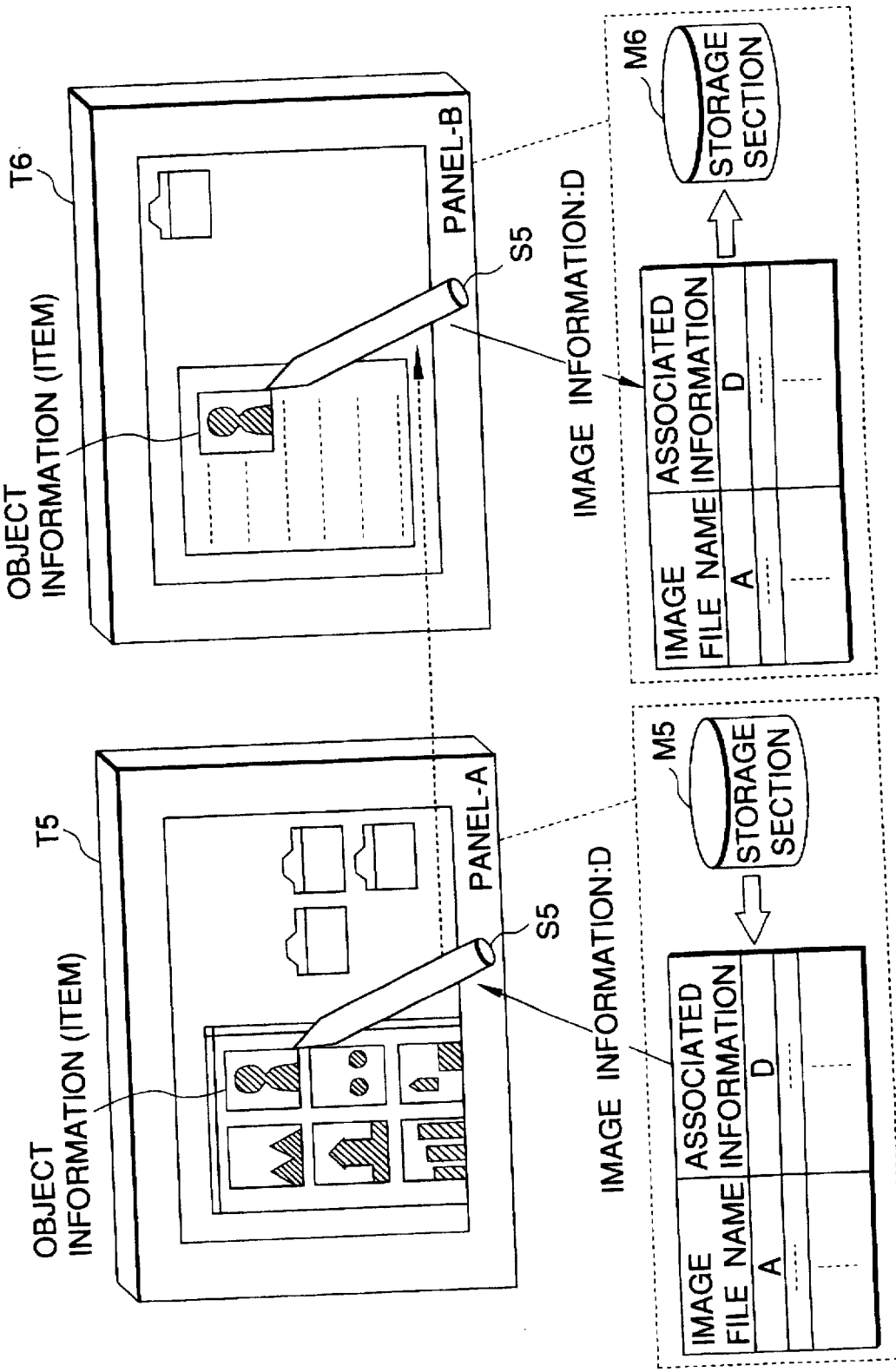
FIG. 7 is a schematic representation showing the state in which information is transmitted between two information processing devices T5 and T6, which correspond to an information processing device S3, using a stylus pen S5.
Figure 8:
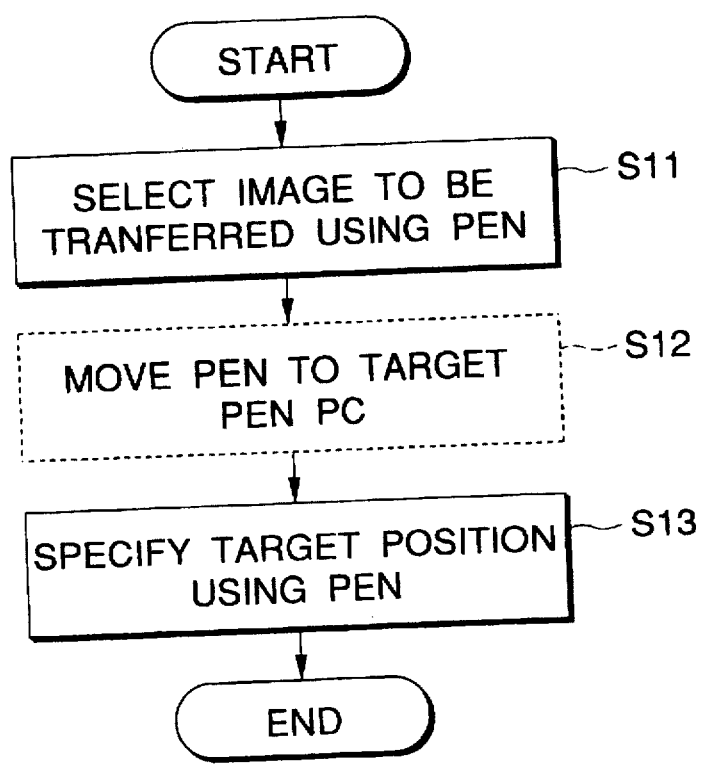
FIG. 8 is a flowchart showing procedures of an operator required when the information is transmitted as shown in FIG. 7.

Further, as shown in FIG. 7, when information is transmitted between two information processing devices T5 and T6 which correspond to the information processing device T1, operator's processing is considerably alleviated by the use of the stylus pen S5 corresponding to a wireless coordinate indicator S3. Assume that image information is transmitted (copied) from the information processing device T5 to the information processing device T6, in this case, the operator can copy the image information by executing only the procedures described in a flowchart shown in FIG. 8. In other words, the operator acquires image information which the operator wants to copy by pressing the object information A (image file name A) appeared in the display of the information processing device T5 using the pen tip of the stylus pen S5, by reading the image information D (image information having the coded information D) associated with the image file name A from a storage section M5 by means of modulated display output in the display, and by temporarily storing the thus read image information in the stylus pen S5. The operator moves the stylus pen S5 which holds the image information D to the vicinity of the information processing device T6 (step S12). A transmission instruction is issued by pressing the pen tip of the stylus pen S5 at a predetermined position appeared in the display of the information processing device T6, i.e., a position to which the operator wants to copy the image information (step S13). As a result of this, the image information D (image information having coded information D) temporarily stored in the stylus pen S5 is transmitted to a storage section M6.

The detailed configurations of the information input/output systems of the previously mentioned first to third embodiments will be described hereinbelow.

Figure 9:
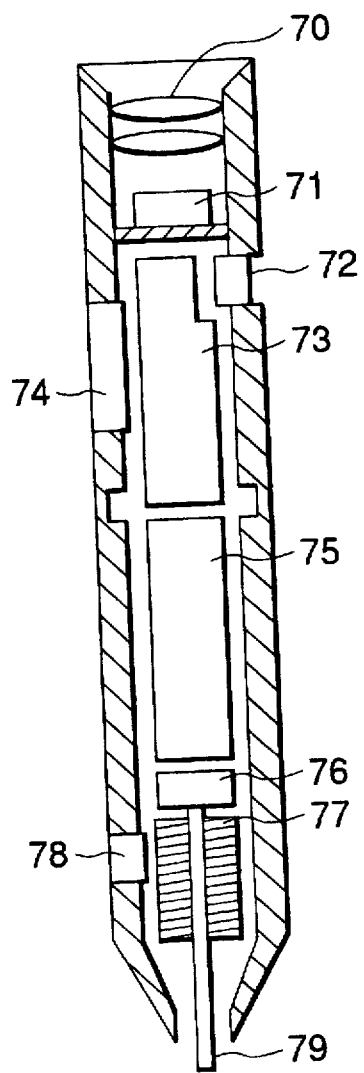
FIG. 9 is a cross-sectional view of an electromagnetic stylus pen showing one specific example of the configuration of the wireless coordinate indicator S1 of the first embodiment.

FIG. 9 is a cross-sectional view showing an electromagnetic stylus pen which is one example of the specific configuration of the wireless coordinate indicator S1 of the first embodiment. This electromagnetic stylus pen is provided with a CCD circuit 71 and a microphone 72 as the information collection section 10. The signal generation section 14 generates a signal by the use of electromagnetic signals. In FIG. 9, an image input through a lens 70 is optically captured, and the thus captured image is converted into an electric signal by means of the CCD circuit 71, in the meantime, sound is converted into an electric signal by the microphone 72. The electric signals converted by the CCD circuit 71 and the microphone 72 are input to an electric circuit 73. The electric circuit 73 has an analog-to-digital function and memory, and hence the image information or sound information converted into the electric signal is subjected to analog-to-digital conversion, whereby the information is digitized and further coded. The coded digital information is temporarily stored in the memory. Control buttons 74 instructs the operation control of the CCD circuit 71 and the microphone 72, and the control of memory in the electric circuit 73. A battery 75 is a power source used for the overall electromagnetic stylus pen. A tool force switch 76 detects the pressing action of the pen tip, that is, a magnetic core 79. A control button 78 issues a selection instruction to the information processing device. A coil 77 and the magnetic core 79 output the coded information in the form of an electromagnetic signal as well as an electromagnetic signal which represents a position indication signal to the information processing device. The drive of the coil 77 is controlled by the electric circuit 73.

As a result of the previously mentioned processing, the collected image and sound information items are output as the electromagnetic signal.

Figure 10:
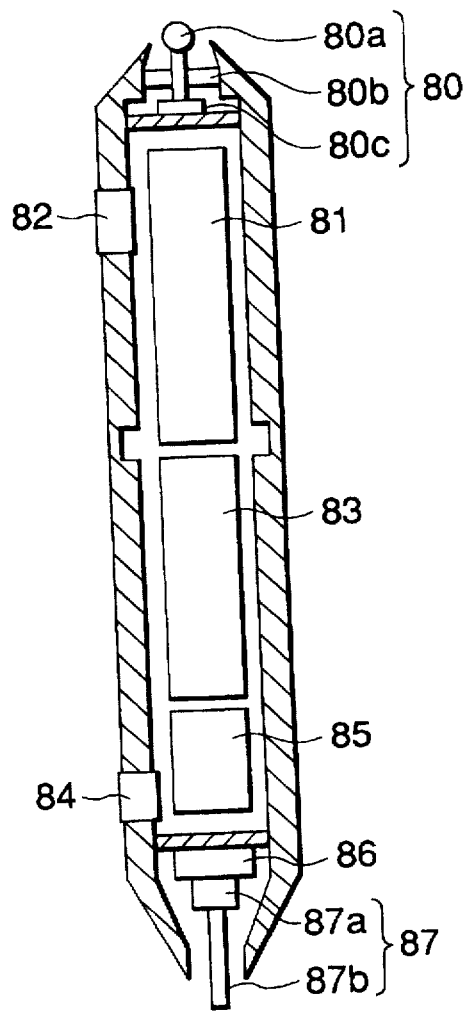
FIG. 10 is a cross-sectional view of an optical stylus pen showing one specific example of the wireless coordinate indicator S1 of the first embodiment.

FIG. 10 is a cross-sectional view showing an optical stylus pen which is one example of the specific configuration of the wireless coordinate indicator S1 of the first embodiment. This optical stylus pen has a bar code reader as the information collection section 10, and the signal generation section 14 generates a signal utilizing an optical signal. In FIG. 10, the bar code reader section 80 consisting of an optical conductor 80a, an LED 80b, and an optical sensor 80c reads a bar code and converts the thus read bar code data into an electric signal. A first electric circuit 81 has a circuit for coding the converted electric signal and memory for temporarily storing the thus coded information. A control button 82 directs the operation control of the bar code reader section 80 and the control of the memory in the first electric circuit 81. A battery 83 is a power source used for the overall optical stylus pen. A control button 84 issues a selection instruction to the information processing device. A tool force switch 86 detects the pressing action of the pen tip, that is, the pressing action of an optical conductor 87b. The LED 87a and the optical conductor 87b form the optical section of the optical stylus pen, and the optical section outputs an optical signal representing a position indication signal to the information processing device and also outputs coded information in the form of an optical signal. A second electric circuit 85 has a circuit for controlling the drive of the LED 87a.

As a result of this, the collected bar code information is output as an optical signal.

Figure 11:
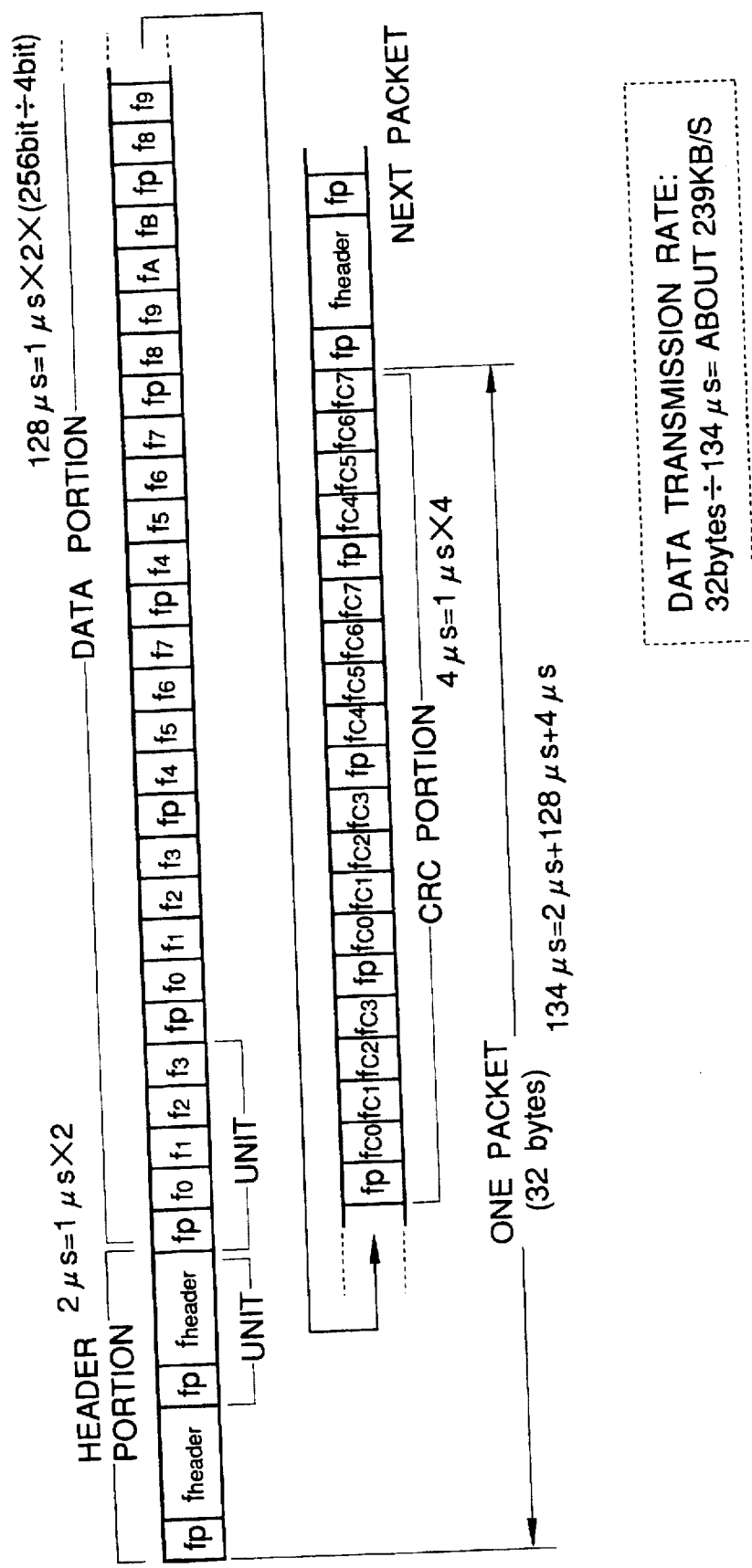
FIG. 11 is a schematic representation showing the overall configuration of information to be transmitted.

With reference to FIGS. 11 to 13, the configurations of a transmission signal and transmission information sent from the wireless coordinate indicator S1 will be described. Throughout the following description, the transmission signal may be made as a result of coupling of electromagnetic signals, optical signals, or other signals to each other. Here, the transmission signal means the physical form of a signal such as a waveform, whereas the transmission information means information represented by the transmission signal.

FIG. 11 is a schematic representation showing the overall configuration of the transmission information, and the transmission information is transmitted packet by packet. Each packet is made up of a header portion, a data portion, and a CRC portion which detects errors. Further, each packet is made up of a plurality of units, and each unit is made of five sub-units. Each sub-unit has the same predetermined time length (200 ns), and a sub-unit of a synchronization signal fp is always added to the head of each sub-unit. To reduce transmission errors, the same unit is repeatedly sent twice.

FIG. 12 is a schematic representation showing the detailed configuration of the unit of the header portion. This header unit is also made up of five sub-units as previously mentioned. In other words, the header unit is made up of one sub-unit representing the synchronization signal fp, one sub-unit representing a header mark, and three sub-units representing a sequence number.

The synchronization signal fp is a frequency of 15 MHz with a phase difference of 0. This synchronization signal fp is the same as all of the synchronization signals fp included in the transmission information. The header mark is 180 degrees out of phase with the synchronization signal fp. As a result of this, it is possible to recognize the header. The sequence number is made of three bits. When the bits are 1, a frequency of 10 MHz with a phase difference of 0 is transmitted. When the bits are 0, a frequency of 5 MHz with a phase difference of 0 is transmitted.

As previously mentioned, the unit is repeatedly transmitted twice, and the header portion consists of two identical header units.

FIG. 13 is a schematic representation showing the detailed configuration of the data portion unit. This header unit is also made up of five sub-units. In other words, the header unit consists of one sub-unit representing the synchronization signal fp, and four sub-units respectively representing bits of data contents. The synchronization signal fp is the same as the synchronization signal fp of the header portion, whilst the other four sub-units are the same as the sub-units of the sequence number of the header portion. Specifically, when the bits of the other four sub-units are 1, a frequency of 10 MHz with a phase difference of 0 is transmitted. On the other hands, the bits are 0, a frequency of 5 MHz with a phase difference of 0 is transmitted. Like the header unit, the data unit is also repeatedly transmitted twice.

The configuration of the CRC unit is the same as that of the data unit.

As previously mentioned, the overall sub-units have a length of 200 ns, and hence each sub-unit, as a whole, has a length of 1 µs. Accordingly, the header portion is made of two continuous header units, and hence the length of the header portion becomes 2 µs(=1 µs×2). If the data volume of the information is 32 bytes, that is, 256 bits, the length of the data portion becomes 128 µs (=1 µs×2×(256 bit/4 bit)), because each data unit has four bits. Since the CRC portion has eight bits of information, and hence the length of the CRC portion becomes 4 µs(=1 µs×2×2). As a result of this, the length of the transmission information for a packet unit becomes 134 µs (=2 µs+128 µs+4 µs) as a result of the total of the lengths of the header portion, the data portion, and the CRC portion. Therefore, the data transmission rate becomes 239 Kbyte/s (=32 byte/134µs).

Figure 14:
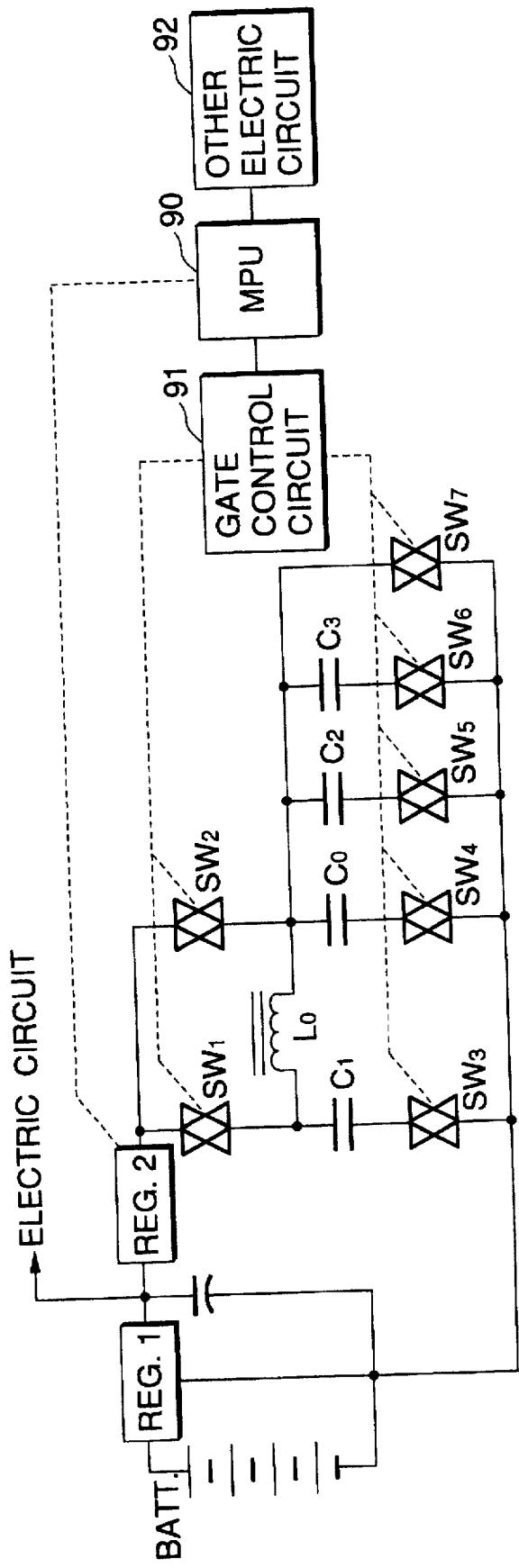
FIG. 14 is a circuit diagram showing a circuit for generating an electromagnetic signal (a transmission signal) of the electromagnetic stylus pen.

With reference to FIG. 14, the configuration of a circuit for generating an electromagnetic signal (a transmission signal) of the electromagnetic stylus pen will be described.

In FIG. 14, a power source is fed from the power supply BATT corresponding to the battery 75. The voltage of this power source is stabilized by means of a power source stabilizer Reg1, and the thus stabilized source voltage is fed to each part of the circuit. A voltage regulator Reg2 transmits a pressed state of a pen, which will be described later, and a pressed state of a control button 78. A microprocessing unit (MPU) 90 controls the overall electromagnetic stylus pen, but the generation of an electromagnetic signal is directly controlled by a gate control circuit 91 under control of the MPU 90. Switches SW1 to SW7 are semiconductor switches and turn on and off a current under control of the gate control circuit 91. An oscillation circuit of an electromagnetic signal is made up of capacitors C0–C3 and a coil L0 with a magnetic core.

The generation of an electromagnetic signal will be specifically explained. For example, when the synchronization signal fp, that is, an electromagnetic signal having a frequency of 15 MHz and a phase difference of 0 is generated, the gate control circuit 91 turns on the switches SW1 and SW4e but turns off the other switches under an instruction from the MPU 90. In this case, a resonance circuit is established between the coil L0 and the capacitor C0, and a resonance frequency f0 of this resonance circuit becomes f0=1/{2 π* SQRT(L0*C0)}. Here, the SQRT(X) means the square root of X. Hence, as a result of the setting of the coil L0 and the capacitor C0 in such a way that the resonance frequency f0 becomes 15 MHz, the coil L0 generates an electromagnetic signal of the synchronization signal fp. Moreover, when an electromagnetic signal having a frequency of 15 MHz and a phase difference of 180 degrees is generated by the header mark, the gate control circuit 91 turns on the switches SW2 and SW3 but turns off the other switches under an instruction from the MPU 90. In this case, a resonance circuit is established between the coil L0 and the capacitor C1, and a resonance frequency f1 of that resonance circuit becomes f1=1/{2 π* SQRT(L0*C1)}. Therefore, as a result of the setting of the coil L0 and the capacitor C1 in such a way that the resonance frequency f1 becomes 15 MHz, the coil L0 generates an electromagnetic signal associated with the header mark. Similarly, when an electromagnetic signal with a binary data (bit data) 0, that is, an electromagnetic signal having a frequency of 5 MHz with a frequency difference of 0 is generated, the switches SW1 and SW6 are turned on, and the other switches are turned off. As a result of the setting of the coil L0 and the capacitor C3 in such a way that the resonance frequency f2=1/{2 π*SQRT (L0*C3)} becomes 5 MHz, the coil L0 generates an electromagnetic signal associated with the bit data 0. Further, when an electromagnetic signal with a bit data 1, that is, an electromagnetic signal having a frequency of 10 MHz and a phase difference of 0 is generated, the switches SW1 and SW5 are turned on, but the other switches are turned off. As a result of the setting of the coil L0 and the capacitor C2 in such a way that the resonance frequency f3=1/{2 π* SQRT (L0*C2)} becomes 10 MHz, the coil L0 generates an electromagnetic signal associated with a bit data 1. It becomes possible to initialize the waveform of an electromagnetic signal by turning the switches SW1, SW2, and SW7 on, and by rendering the voltage across the coil L0 constant.

Figure 15:
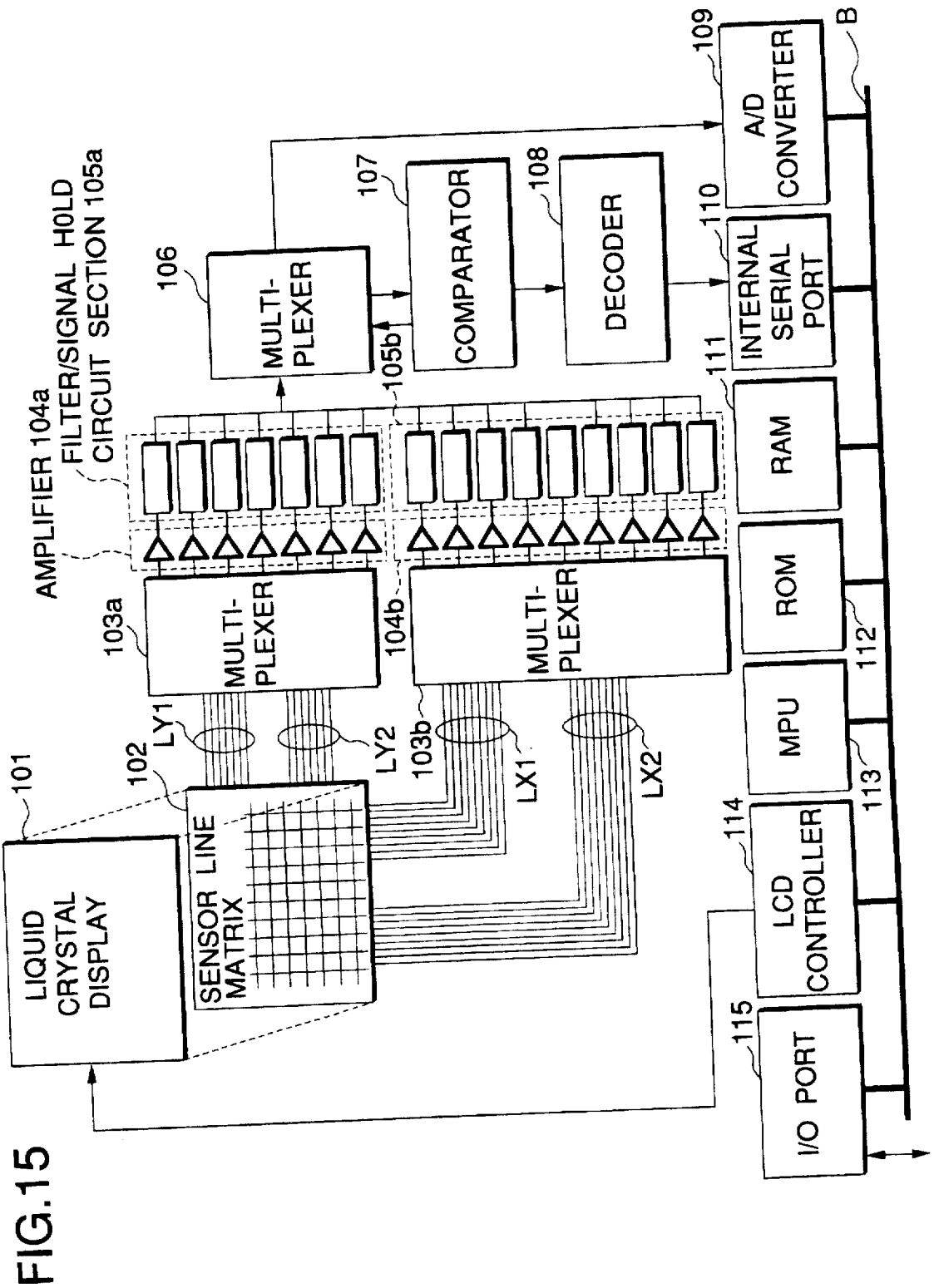
FIG. 15 is a circuit diagram showing the configuration of an information processing device T1 according to the first embodiment.

With reference to FIG. 15, the configuration of the information processing device T1 and the detailed configuration of the display/position detection section 20 of the first embodiment will be described.

In FIG. 15, the liquid crystal display 101 which acts as a display section and a sensor line matrix 102 which acts as a position detection section are assembled into one unit. Specifically, the liquid crystal display 101 is integrally laid on the sensor line matrix 102 in such a way that display coordinates of the liquid crystal display 101 uniquely correspond to indication coordinates of the sensor line matrix 102. The sensor line matrix 102 is made up of sensor lines for X coordinate use and sensor lines for Y coordinate use, and the combination of the sensor lines constitutes a matrix structure. These sensor lines are connected to X-coordinate sensor lines LX1 and LX2 and Y-coordinate sensor lines LY1 and LY2 in order to draw a signal obtained as a result of the detection of position. The X-coordinate sensor lines LX1 and LX2 and the Y-coordinate sensor lines LY1 and LY2 are connected to multiplexers 103a and 103b, respectively. These multiplexers 103a and 103b are further connected to amplifying sections 104a and 104b, respectively. The amplifying sections 104a and 104b parallel amplify a switched signal by means of amplifiers connected in parallel. The signal amplified by the amplifying sections 104a and 104b is subjected to waveform-shaping by means of filter/signal hold circuit sections 105a and 105b which have filter/signal hold circuits connected corresponding to the amplifiers connected in parallel. To compensate for a delay difference resulting from switching between the multiplexers 103a and 103b, the waveform-shaped signal is temporarily held by the filter/signal hold circuit sections. The division of the X-coordinate sensor line and the Y-coordinate sensor line respectively into the sensor lines LX1 and LX2 and the sensor lines LY1 and LY2 is intended to reduce the number of amplifiers which amplify a signal detected by the sensor line matrix section 102. In this embodiment, the number of amplifiers is reduced to half the original number of the amplifies by the use of the multiplexers 103a and 103b.

The signal subjected to waveform shaping of the filter/ signal hold circuit sections 105a and 105b is input to a multiplexer 106. A comparator 107 compares signals input to the multiplexer 106 and selectively extract only a signal suitable for extracting the coded information from the input signals. The signal selected by the comparator 107 is decoded by a decoder 108, and the thus decoded information is input to an internal serial port 110. Further, the aforementioned signal selected by the comparator 107 is input, as a signal for position detection purposes, also to an analog-to-digital converter 109, and the signal is digitized by the analog-to-digital converter 109.

The internal serial port 110 and the analog-to-digital converter 109 are connected to a bus B. An MPU 113, a ROM 112, a RAM 111, an LCD controller 114, and an I/O port 115 execute the interpretation of coded information input through the internal serial port 110 and the analog-to-digital converter 109 and the calculation of object information, for example, a coordinate position based on digital information associated with the position detection signal. The display processing of the liquid crystal display 101 is executed through the LCD controller 114. Furthermore, communication processing such as transmission between the current information processing device and another information processing section is carried out through the I/O port 115.

The detailed configuration of the decoder 108 shown in FIG. 15 will be described.

Figure 16:
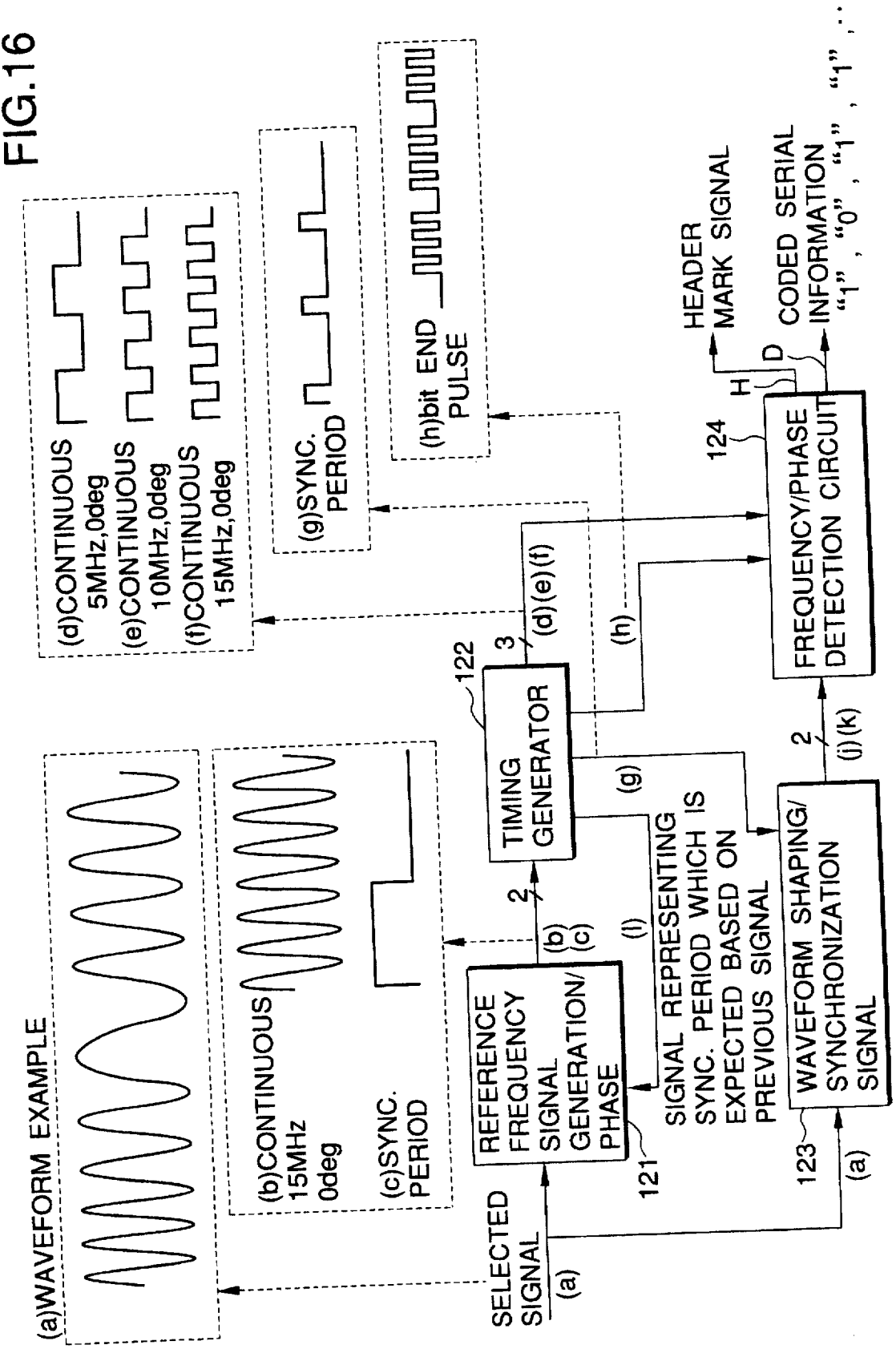
FIG. 16 is a circuit diagram showing the detailed configuration of a decoder 108 shown in FIG. 15.

FIG. 16 is a circuit diagram showing the detailed configuration of the decoder 108 shown in FIG. 15. The decoder 108 is made up of a reference frequency signal generation/ phase synchronization circuit 121, a timing generator 122, a waveform shaping/synchronization signal elimination circuit 123, and a frequency/phase detection circuit 124.

Figure 17:
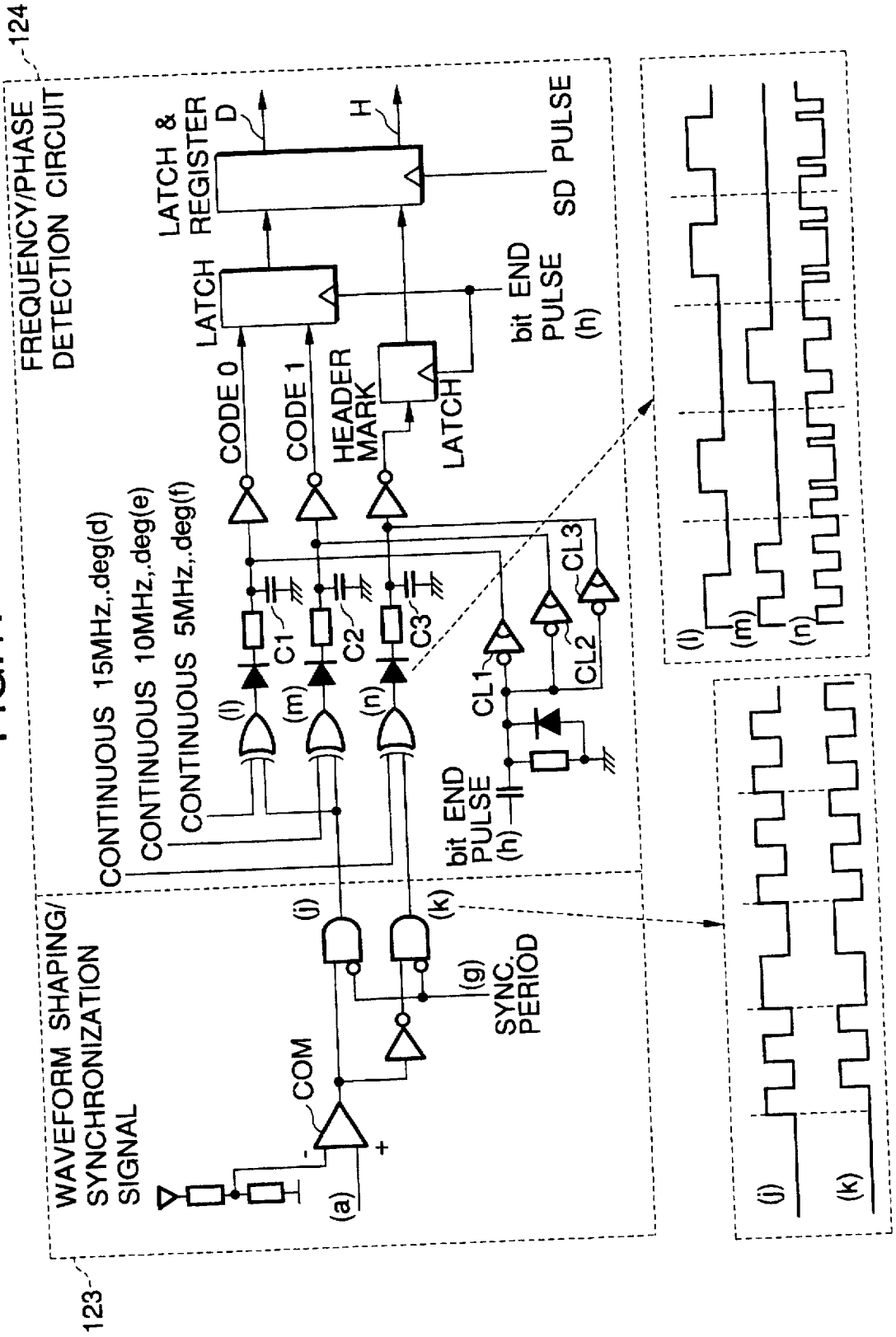
FIG. 17 is a circuit diagram showing the detailed circuit configurations of a waveform shaping/synchronizing signal elimination circuit 123 and a frequency/phase detection circuit 124 included in the decoder 108.

FIG. 17 is a circuit diagram showing the detailed configurations of the waveform shaping/synchronization signal elimination circuit 123 and the frequency/phase detection circuit 124.

In FIGS. 16 and 17, a signal (a) selected by the relative operation circuit 107 is input to the reference frequency signal generation/phase synchronization circuit 121. The reference frequency signal generation/phase synchronization circuit 121 generates a continuous sine wave signal (b) having a phase difference of 0 and a frequency of 15 MHz and a signal (c) which represents a period of synchronization. These signals (b) and (c) are input to the timing generator 122. At this time, the reference frequency signal generation/phase synchronization circuit 121 receives a signal (i), which represents a period of synchronization expected on the basis of the signals received so far, from the timing generator 122. The frequency of the continuous sine wave signal (b) is fine adjusted corresponding to a timing lag between the signals (c) and (i).

The timing generator 122 outputs a signal (g) which represents a period of synchronization to the waveform shaping/synchronization signal elimination circuit 123, and generates a bit-end-pulse signal (h) which represents the end of each bit. The thus generated bit-end-pulse signal (h) is output to a frequency/phase detection circuit 124. The timing generator 122 generates three continuous reference rectangular signals in the form of a waveform which might be included as an object signal to be coded; namely, a continuous reference rectangular signal (d) having a frequency of 5 MHz and a phase difference of 0, (e) a continuous reference rectangular signal having a frequency of 10 MHz and a phase difference of 0; and a continuous reference rectangular signal having a frequency of 15 MHz and a phase difference of 0. These three continuous reference rectangular signals (d), (e), and (f) are output to the frequency/phase detection circuit 124.

The waveformshaping/synchronization signal elimination circuit 123 subjects the selected signal (a) to waveform shaping by inputting the selected signal (a) to a comparator COM. The waveform associated with the synchronization signal is eliminated by use of a signal (g) which represents a period of synchronization. Eliminated signals (j) and (k) are input to the frequency/phase detection circuit 124. The reason the signal (k) which is the inverse of the signal (j) is generated is that the header mark signal is inverted 180 degrees with respect to the synchronization signal.

The frequency/phase detection circuit 124 EXCLUSIVE ORs the continuous reference rectangular signal (e) and the signal (j), the continuous reference rectangular signal (f) and the signal (j), and the continuous reference rectangular signal (d) and the signal (k) input from the timing generator 122, whereby signals (l), (m), and (n) are generated. These signals (l), (m), and (n) are integrated for a period of one bit, that is, a period of 200 ns. If the result of that integration is less than a certain level, the result is judged as logical true. A value of bit 0, a value of bit 1, and a header mark are determined for each of the signals (l), (m), and (n), and coded information and header mark information, which are serial and consist of bits 0 and 1, are output. Open collectors CL1 to CL3 discharge electric charges which the capacitors C1 to C3 obtained as a result of integration one bit period corresponding to the bit-end-pulse (h).

A displaying state of the display 21 associated with specific operation of an operator is shown, and the transmission of data from the wireless coordinate indicator S1 to the information processing device T1 will be described.

Figure 18A:
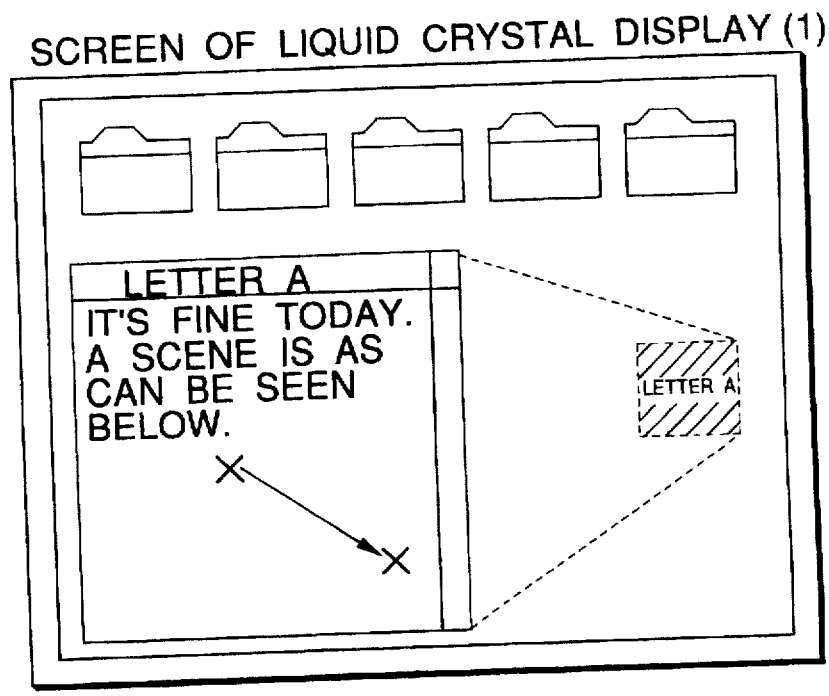
FIGS. 18(a) and 18(b) are schematic representations showing an indicating state of an indicator 21 when image data temporarily stored in the wireless coordinate indicator S1 are transmitted to the information processing device T1.
Figure 18B:
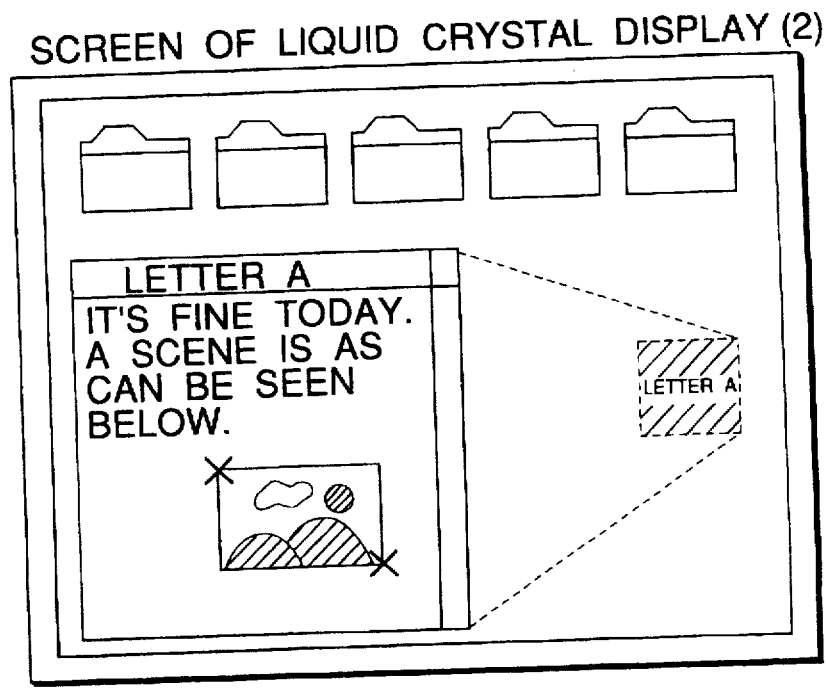

FIGS. 18a and 18b show a displaying state of the display 21 when image data temporarily stored in the wireless coordinate indicator S1 are transferred to the information processing device T1. The wireless coordinate indicator S1 temporarily stores image data associated with coordinate indicating points which the wireless coordinate indicator S1 indicates on the display screen of the display 21.

In FIGS. 18a and 18b, X represents a position in the display screen of the liquid crystal display against which the pen tip of the wireless coordinate indicator S1 is pressed. X→X shows the wireless coordinate indicator S1 with its pen tip touched to the display screen is dragged from one X to the other X.

In FIG. 18a, a document "Letter-A" is selected and displayed on the display screen of the liquid crystal display. In other words, the document "Letter-A" is opened. If the image data temporarily stored in the wireless coordinate indicator S1 are put into the document "Letter-A", it is necessary to specify the location and range to which the image data are fitted. In this case, as shown in FIG. 18a, the pen tip of the wireless coordinate indicator S1 indicates a diagonal line as a result of dragging action, whereby the position and range to which the image data are fitted are specified.

The image data are fetched while the wireless coordinate indicator S1 is being dragged, and therefore the operator with the wireless coordinate indicator S1 in his hand can check the progress of the transmission of data from the image appeared on the display screen as required. The operator can identify the completion of the transmission of data. If the operator detaches the indicator S1 wireless coordinate indicator S1 from the display screen at this moment, the dragging of the wireless coordinate indicator is completed.

On the other hand, while fetching the image data transmitted from the wireless coordinate indicator S1, that is, the data of a landscape image as shown in FIG. 18b, the information processing device T1 sequentially generates data by controlling a scale factor of the image in such a way that the landscape image fits into the specified rectangular window. The thus generated data are sequentially displayed and output to the location specified by the wireless coordinate indicator S1.

In this way, in the practical data transmission, the coordinate indicating point indicated by the wireless coordinate indicator S1 and the transmitted and processed code information are closely relevant to each other.

One example of the transmission of text information will be described.

Figure 19:
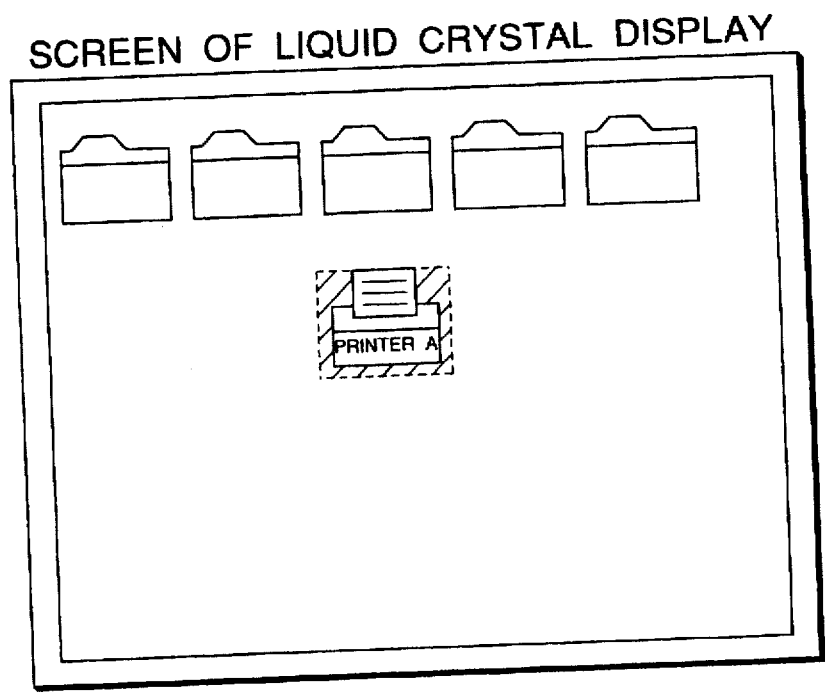
FIG. 19 is a schematic representation showing an indicating state of the indicator 21 when text information temporarily stored in the wireless coordinate indicator S1 is printed on a printer by transmitting the text information to a printer connected to the information processing device T1.

FIG. 19 is a schematic representation showing a displaying state of the display 21 when text information temporarily stored in the wireless coordinate indicator S1 is output to a printer by transferring the text information to a printer connected to the information processing device T1. In FIG. 19, X designates the position in the display screen of the liquid crystal display against which the wireless coordinate indicator S1 is pressed in the same manner as in FIG. 18.

A printer icon "Printer A" representing a printer to which the text information is transferred and output is displayed in the display screen shown in FIG. 19 in response to the pressing action of the pen tip of the wireless coordinate indicator S1 by an operator. In response to this operator's instruction, the information processing device T1 fetches text information temporarily stored in the wireless coordinate indicator, and outputs the text information to a printer indicated by the printer icon by transmitting a printing instruction and associated coded information to that printer.

With reference to FIGS. 20a to 20d, the method of transmission of the pressed states of the pen tip and a control button of the wireless coordinate indicator will be described hereunder.

FIGS. 20a to 20d are waveforms showing variations in transmission signal caused by the transmission method, particularly, variations in synchronization signal. Rectangurally designated portions represent the presence of waveforms other than the synchronization signal.

Waveforms which satisfy the following conditions are produced in the synchronization signal in the wireless coordinate indicator S1.

1) The amplitude of the synchronization signal remains unchanged unless the pen tip of the wireless coordinate indicator S1 is pressed;
2) The amplitude of the synchronization signal is reduced to half its original size every other one in such a way as to recur 50%, 100%, 50%, 100% ..., provided that a larger amplitude is taken as 100%;
3) A larger amplitude of the synchronization signal is made equal to an amplitude of another signal unless a control button is pressed; and
4) A larger amplitude of a synchronization signal is made twice as large as the amplitude of another signal when the control button is pressed.

Figure 20:
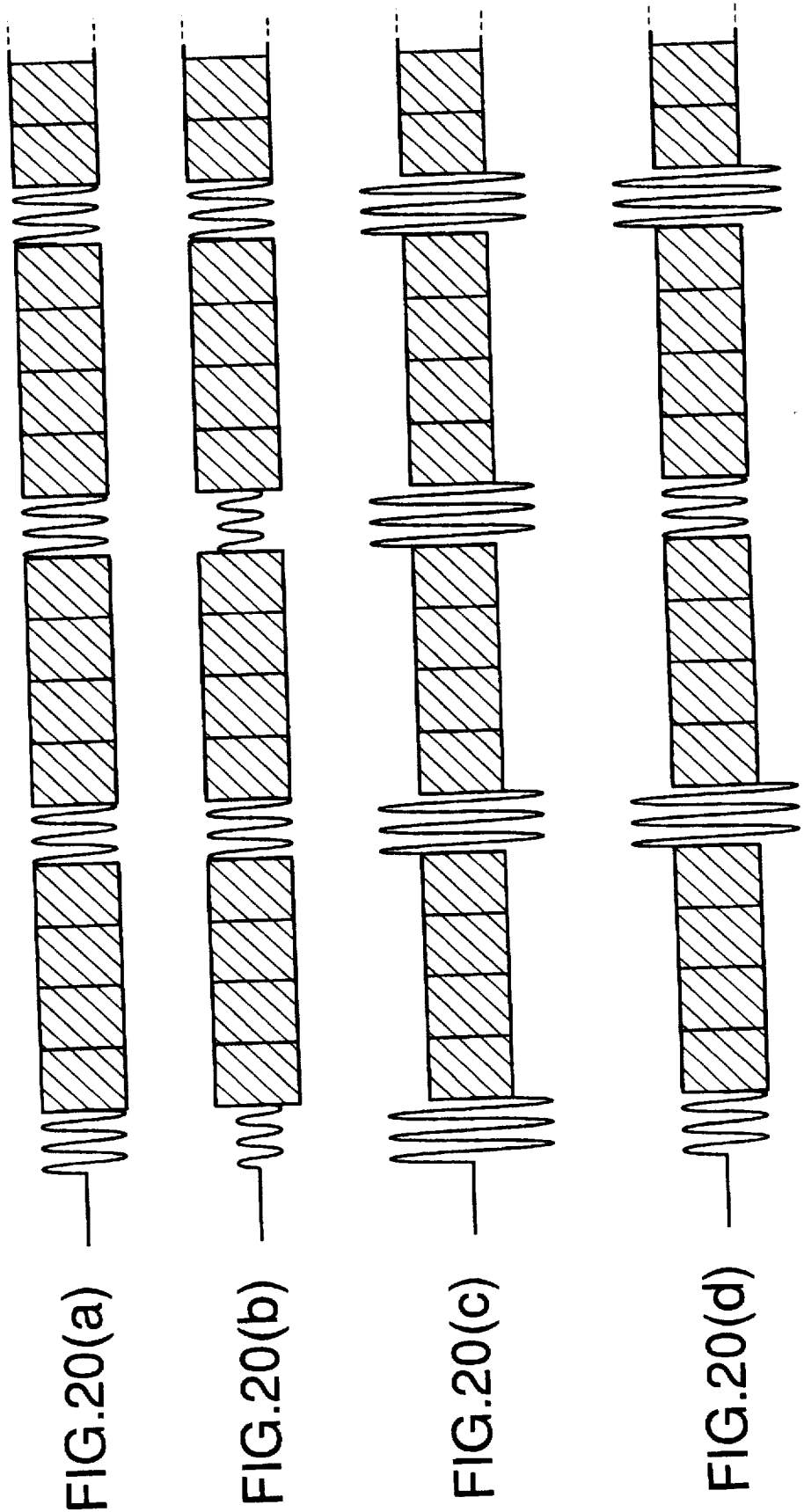
FIGS. 20(a) to 20(d) are schematic representations showing the method of transmission of pressed states of the wireless coordinate indicator and a control button to the information processing device.

Upon detection of the combination of the waveforms of the synchronization signal shown in FIG. 20 that satisfies the above mentioned conditions, the information processing device T1 can identify the pressed states of the pen tip and the control button of the wireless coordinate indicator S1.

Specifically, in FIG. 20a, the amplitude of the synchronization signal is constant and the same as the amplitude of another signal, and therefore the information processing device T1 can determined that the pen tip and the control button of the wireless coordinate indicator S1 are not pressed.

In FIG. 20b, the amplitude of the synchronization signal is reduced every other one, and the larger amplitude is the same as the amplitude of another signal. Based on this fact, the information processing device T1 can determine that the pen tip of the wireless coordinate indicator S1 is pressed but the control button is not pressed yet.

In FIG. 20c, the amplitude of the synchronization signal is constant and twice as large as the amplitude of another signal. Based on this fact, the information processing device T1 can determine that the pen tip of the wireless coordinate indicator S1 is not pressed but the control button is pressed.

In FIG. 20d, the amplitude of the synchronization signal is reduced every other one, and the larger amplitude is twice as large as the amplitude of another signal. Based on this fact, the information processing device T1 can determine that the pen tip of the wireless coordinate indicator S1 and the control button are pressed.

In this way, a signal which represents the pressed states of the pen tip and the control button is superimposed on the synchronization signal by varying the synchronization signal corresponding to the pressing action of the pen tip and the control button as required.

The second embodiment of the present invention associated with the basic form 2) will be described in detail. This basic form 2) is intended to transmit information from the information processing device to the wireless coordinate indicator as previously mentioned.

Figure 21:
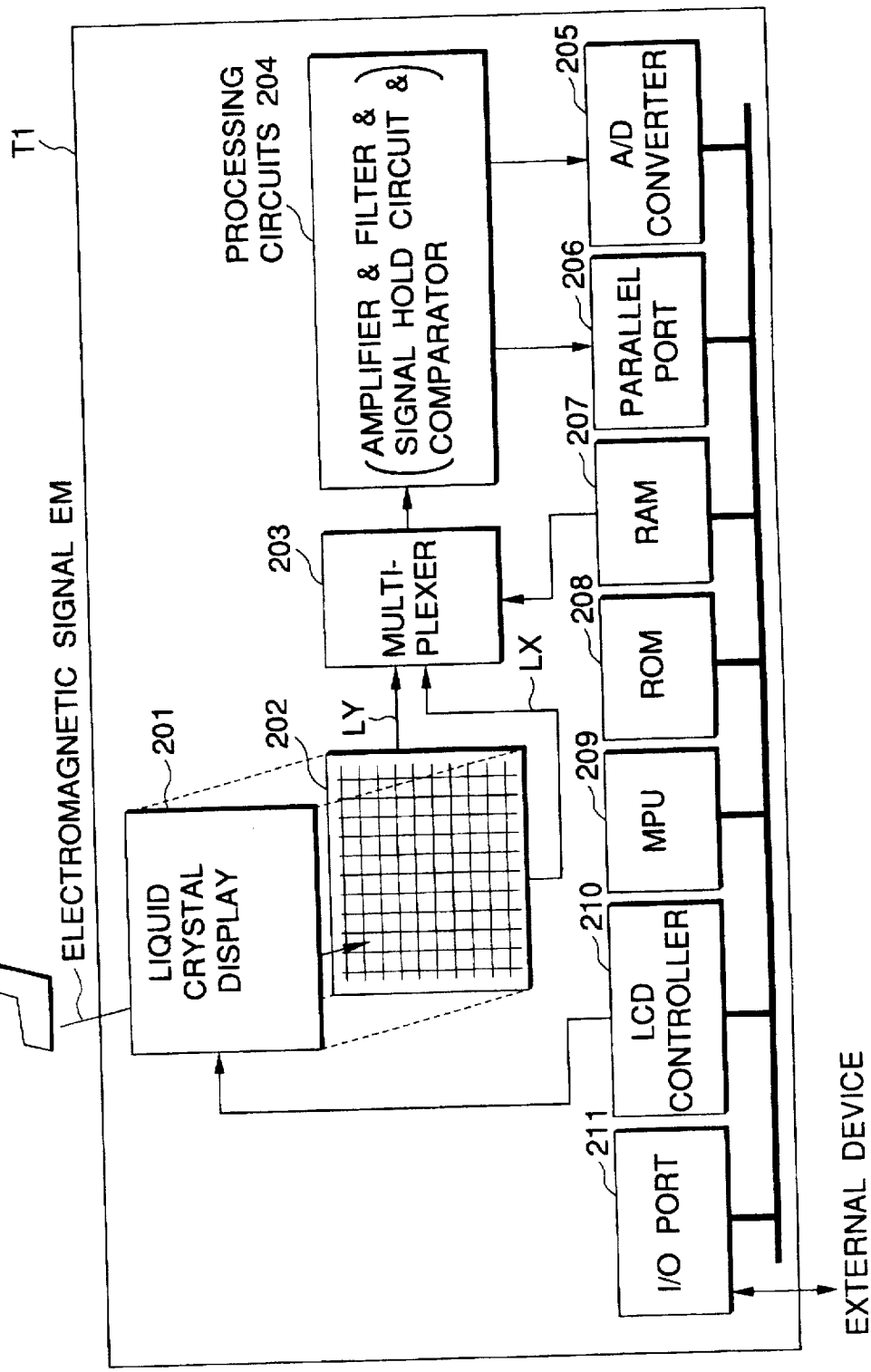
FIG. 21 is a schematic diagram showing the configuration of an information processing device T2 according to a second embodiment of the present invention.

FIG. 21 is a circuit diagram showing the configuration of the information processing device T2. In FIG. 21, a liquid crystal display 201 is laid on a sensor line matrix 202 in the same manner as in the first embodiment, and the display positions of the liquid crystal display 201 and the detection coordinate positions of the sensor line matrix 202 correspond to each other. The sensor line matrix 202 receives an electromagnetic signal EM for detecting position and pressing action of the end of an indication which is emitted from an electromagnetic wireless coordinate indicator S2 with a one-dimensional image sensor which will be described later. The received electromagnetic signal is input to the multiplexer 203 via the X-coordinate sensor line LX and the Y-coordinate sensor line LY. The multiplexer 203 is controlled by an MPU209 via a parallel port 206. The multiplexer 203 selects the detected signal and delivers the thus selected signal to processing circuits 204 consisting of an amplifier, a filter, a signal hold circuit, and a relative operation circuit. The processing circuits 204 deliver analog signals of the first and second largest (intensive) amplitudes at each coordinate calculated by the relative operation circuit to an analog-to-digital converter 205. Further, the processing circuits 204 detect whether or not the electromagnetic wireless coordinate indicator S2 pressed the end of the indication utilizing variations in the frequency of the electromagnetic signal EM. The result of the detection is output to the parallel port 206 as an indication-end press code signal. The analog-to-digital converter 205 converts the input analog signal to a digital signal, and the MPU 209 performs calculation based on this converted digital signal to obtain the accurate position of an indicated point. The MPU 209 obtains object information and associated coded information on the basis of the indication-end press code signal, and executes various types of control of the overall information processing device T1. The ROM 208 holds instructions and data which the MPU 209 executes and refers to, and the RAM 207 temporarily holds instructions and various types of data or stores data. An LCD controller 210 processes an image to be displayed on the liquid crystal display 201 under control of the MPU 209. An I/O port 211 exchanges data between the outside and the information processing section under control of the MPU 209. Coded information is transmitted to the electromagnetic wireless coordinate indicator S2 by displaying a part of the image, which is to be displayed on the liquid crystal display 201, in a modulated way.

Figure 22:
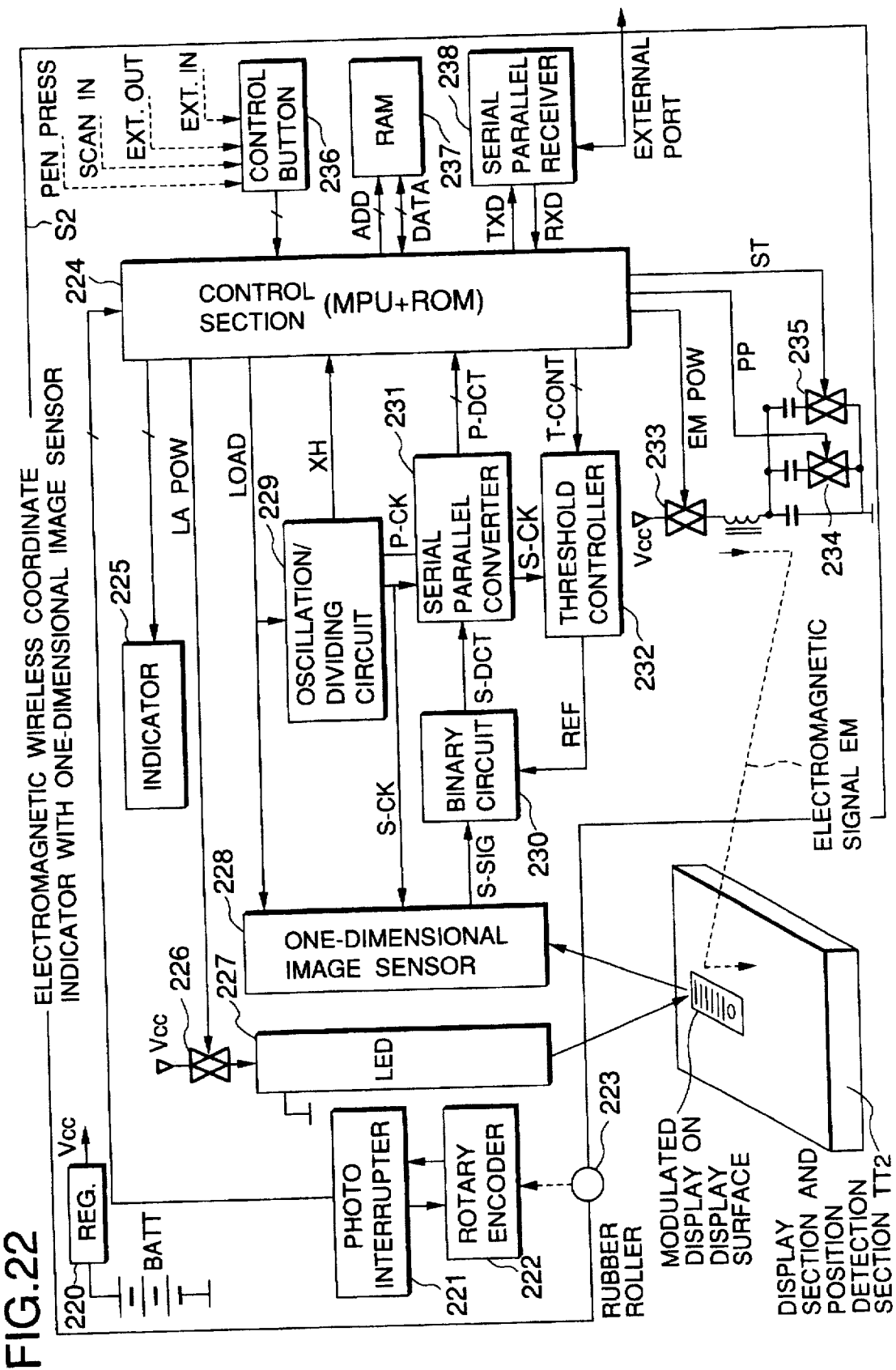
FIG. 22 is a circuit diagram showing the configuration of an electromagnetic wireless coordinate indicator S2 with a one dimensional image sensor.

With reference to FIG. 22, the configuration of the electromagnetic wireless coordinate indicator S2 with a one-dimensional image sensor will be described.

In FIG. 22, a control section 224 controls the overall electromagnetic wireless coordinate indicator S2, and the control section 224 is made up of an MPU and a ROM. The power of the overall electromagnetic wireless coordinate indicator S2 is fed from the battery BATT through a regulator 220.

When a plane image printed on paper is read, an LED array 227 illuminates the plane image. Light reflected from the plane image is read by the one-dimensional image sensor, and the thus read light information is converted into an electric signal. At this time, the activation of the LED array 227 is controlled by switching a switch 226 using an LED array power control signal LApow output from the control section 224. Timing for reading the image is controlled by a one-dimensional image sensor 228 using a load signal Load output from the control section 224. The amount of scanning of the image is read in the form of the amount of rotation of a rotary encoder 222, which is directly coupled to a rubber roller 223, through a photo interrupter 221, and the thus read amount of scanning is delivered to the control section 224.

The reading of an image as set forth above applies to the reading of a modulated display on a display screen of the information processing device.

Light read by the one-dimensional image sensor 228 is converted to an electric signal, and this electric signal is further converted to serial binary data by a binary circuit 230. The serial data is input to a serial/parallel converter 231 and is converted to parallel data by the same. The thus converted parallel data are delivered to the control section 224. At this time, the conversion of data into binary data carried out in the binary circuit 230 is effected with reference to a reference signal Ref output from a threshold controller 232. The reference signal Ref is generated in the threshold controller 232 based on the serial signal clock SCK output from the serial/parallel converter 231 and a threshold control signal TCont output from the control section 224. This threshold control signal TCont is output from the control section 224 for the purpose of controlling the overall brightness of the display screen, correcting variations in the characteristics of a light-sensitive element, and dithering. The serial/parallel converter 231 operates based on a serial signal clock SCK and a parallel signal clock PCK output from an oscillation/dividing circuit 229. The parallel signal clock PCK generated by the oscillation/dividing circuit 229 is initialized by a Load signal output from the control section 224. This parallel signal clock PCK is generated by dividing the serial signal clock SCK. The oscillation/dividing circuit 229 generates a system clock Xin and outputs this system clock Xin to the control section 224.

Upon receipt of the parallel data, the control section 224 temporarily stores the parallel data in the RAM 237. The control section 224 compresses or processes the data, or transmits the data through a serial driver/receiver 238 and an external port in response to an instruction input from the operator.

The instruction from the operator is input to the control section 224 from the control button 236. The instructions input by the operator through the control button 236 comprise a Pen Press, a Scan In, an Ext. Out, and Ext. in. Operating states based on these instructions are appeared on an indicator 225 under control of the control section 224, and the operator can know the operating state.

When the operator presses the wireless coordinate indicator S2 against the display of the information processing device T2 to indicate a coordinate, variations in a pen-press detection signal are output to the control section 224. The control section 224 activates a switch 234 for transmitting the pressed state of the pen by changing a pen-press output signal PP. The indication of the coordinate is notified to the information processing device T2 by changing the frequency of the electromagnetic signal EM. Similarly, to read a modulated display on the display screen of the information processing device T2, the control section 224 changes a scan-in output signal SI corresponding to variations in a scan-in detection signal, so that a switch 235 is activated. As a result of this, the frequency of the electromagnetic signal EM is changed to another frequency, whereby the initiation of modulated display is notified to the information processing device T2.

One example of display processing of the wireless coordinate indicator and the information processing device associated with operation according to the second embodiment will be described.

Figure 23:
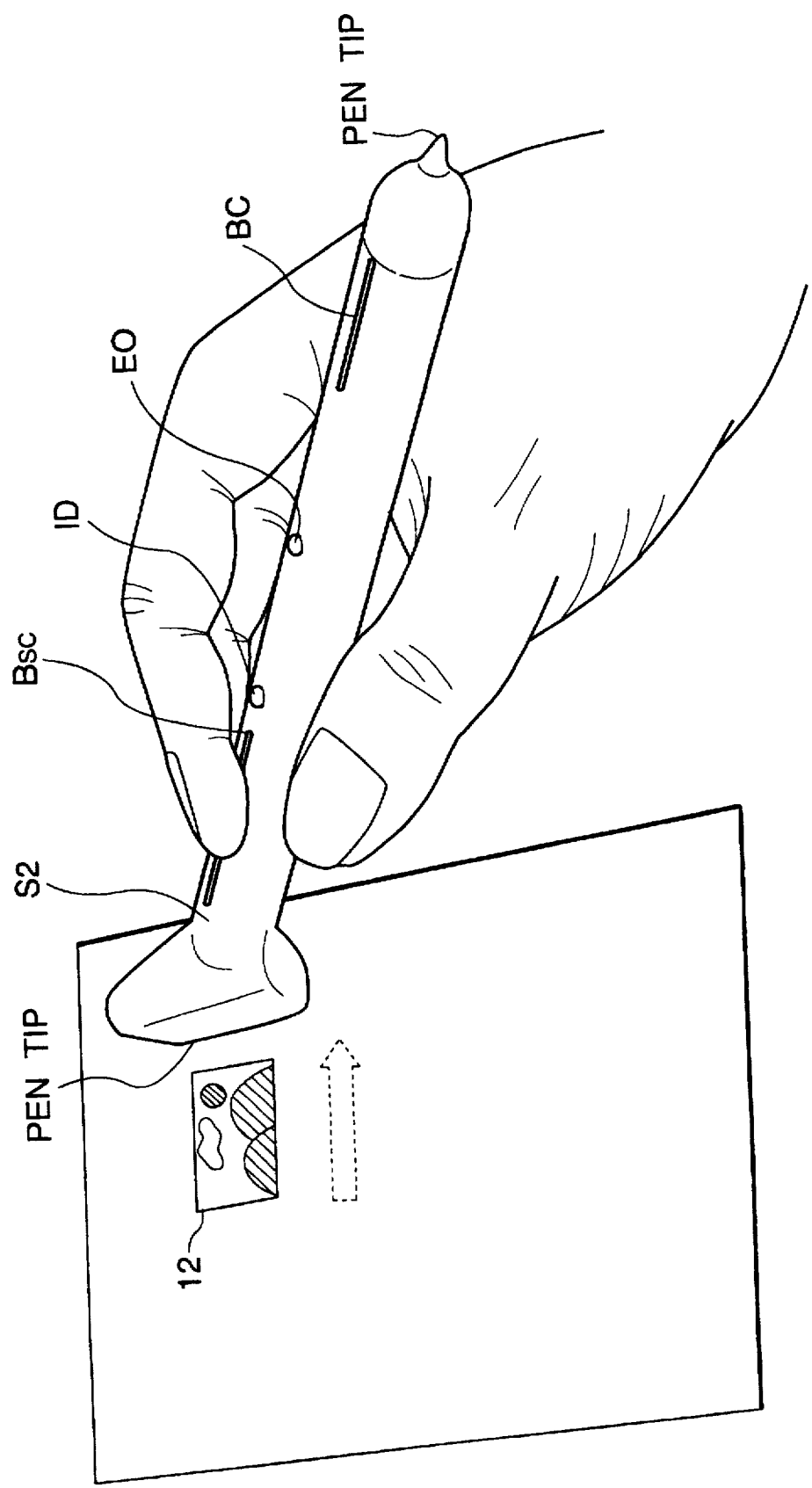
FIG. 23 is a schematic representation showing operation for reading an image drawn on paper.

FIG. 23 shows the reading of a landscape image which is painted on paper and includes mountains, clouds, and sun. The operator presses the one-dimensional image sensor against at the position slightly outside of the left end of of a landscape photograph I2 and presses a scan button Bsc. The operator keeps pressing the button Bsc. Thereafter, the operator slowly shifts the one-dimensional sensor rightwards while bringing the same pressed against the landscape photograph. When the one-dimensional image sensor goes slightly outside of the right end of the landscape photograph I2, the operator releases the scan button Bsc. A rubber roller rotates associated with this movement of the one-dimensional image sensor, and the amount of scanning is detected. In this case, if any read errors arise as a result of fast scanning of the photograph I2, a scan indicator Id illuminates red. On the other hand, if the reading of the photograph succeeded, the scan indicator Id illuminates green. Then, the operator takes the one-dimensional image sensor off from the paper, and performs operation for the next step. For example, the read image information is transmitted to another device via the external output terminal EO. When the transmission is completed, the scan indicator turns yellow from green. The change of color to yellow represents that the read image information is still retained in the wireless coordinate indicator S2. Therefore, it is possible to transmit the same image information to still another device. The scan indicator Id temporarily turns green at the same time the image information is transmitted. If the transmission succeeded, the scan indicator turns yellow. If the operator wants to discard the image information held in the wireless coordinate indicator S2, the operator clicks the scan button Bsc in the air so as not to rotate the rubber roller. As a result of this, the scan indicator Id turns off, and the image information is discarded.

Figure 24:
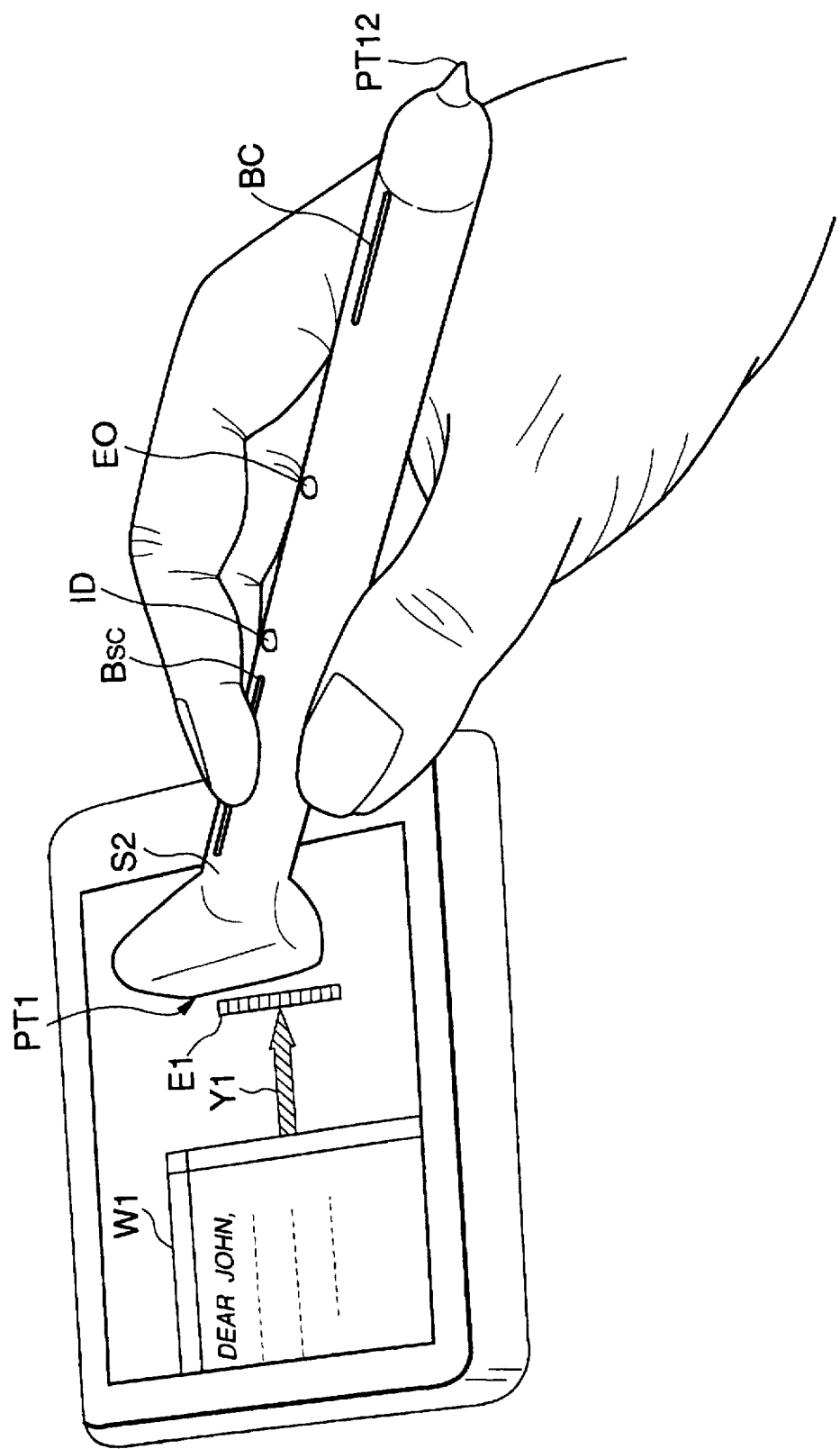
FIG. 24 is a schematic representation showing display processing of the wireless coordinate indicator S2 and the information processing device T2 when coded information is received from the information processing device T2 associated with the wireless coordinate indicator S2.

With reference to FIG. 24, the display processing of the wireless coordinate indicator S2 and the information processing device T2, when coded information is received from the information processing device T2 associated with the wireless coordinate indicator S2, will be described.

In FIG. 24, in addition to the pen tip PT1 which carries the one-dimensional image sensor, the wireless coordinate indicator S2 has another sharp-pointed pen tip PT2 at the other end of the indicator with respect to PT1. This second pen tip PT2 is usually used to select a menu or perform handwriting operation in relation to the information processing device T2.

In FIG. 24, a document which beings with "Dear John, . . ." is opened in the form of a window W1 on the display screen of the information processing device T2. Arrow Y1 is displayed so as to oriented towards the outside from the window W1. A display region E1, which is displayed in a modulated way to allow transmission of coded information, is displayed at the leading end of the arrow Y1. The operator presses the one-dimensional image sensor of the wireless coordinate indicator S2 against the display region E1. If the one-dimensional sense sensor is positioned, the operator presses the scan button Bsc. Then, the operator releases the scan button Bsc when the arrow Y1 blinks. In other words, the blinking of the arrow allows the operator to know the completion of the transmission of the coded information. Even if the one-dimensional image sensor of the wireless coordinate indicator S2 is not correctly in line with the display region E1, the information processing device T2 moves the display region E1 in alignment with the indicated coordinate point.

The information processing device T2 displays information of a document in the window W1 in the form of coded information in a modulated manner at the same time the arrow Y1 blinks. When the transmission of this coded information is completed, the blinking of the arrow Y1 stops.

When the receipt of the coded information succeeded, the wireless coordinate indicator S2 blinks the scan indicator Id green. On the other hand, when the receipt of the coded information failed, the wireless coordinate indicator S2 blinks the scan indicator Id red. Further, to issue a retransmission request, the operator issues a retransmission request and repeats the previously mentioned operation again. The received document information is temporarily stored in a storage section of the wireless coordinate indicator S2, and processing similar to the previously mentioned processing of the image information is carried out.

The configuration of coded information transmitted from the information processing device T2 to the wireless coordinate indicator S2 will be described.

Figure 25:
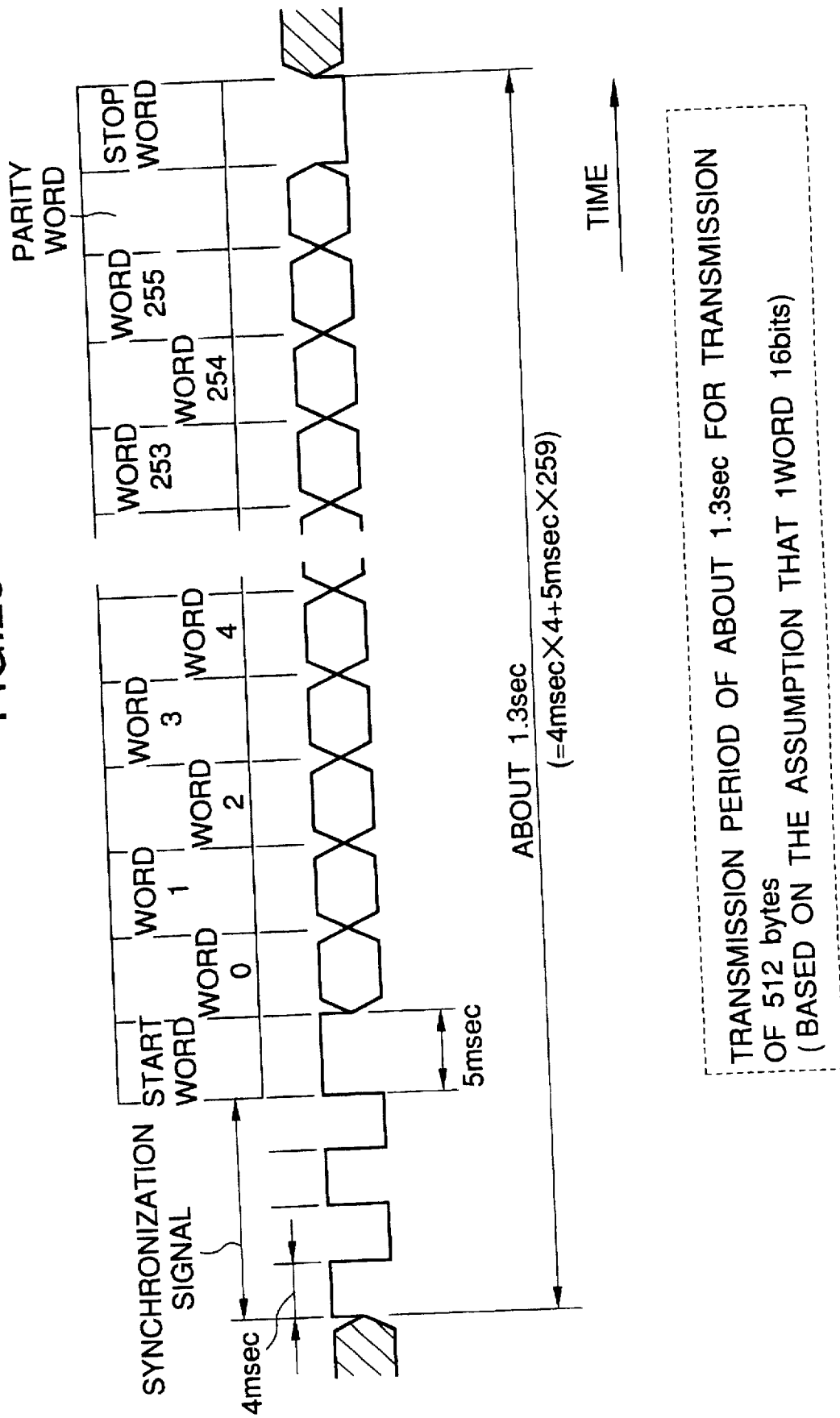
FIG. 25 is a schematic representation showing the configuration of coded information to be transmitted when the information is serially transmitted (with a lapse of time)
Figure 26:
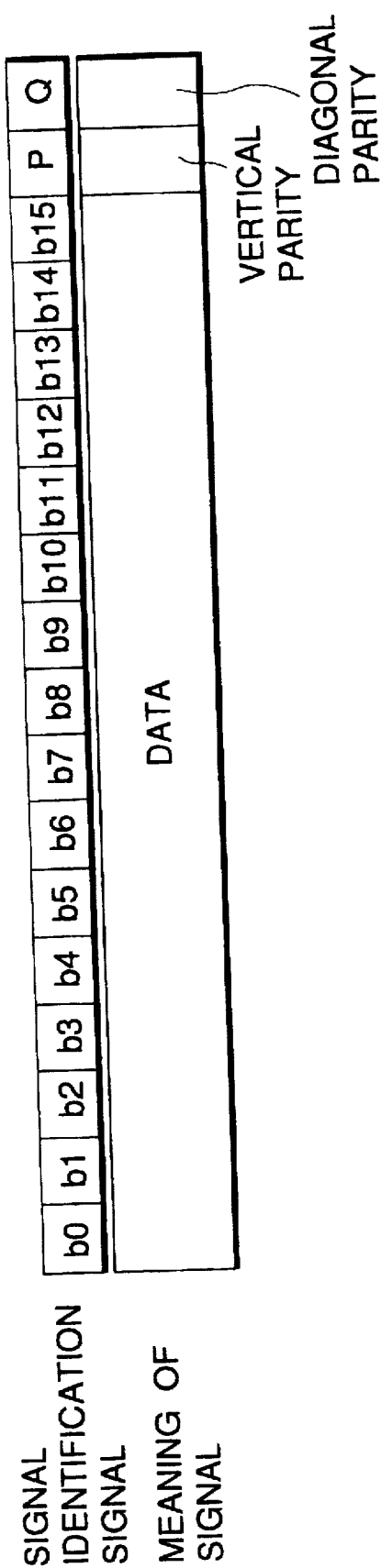
FIG. 26 is a schematic representation showing the configuration of the coded information to be transmitted when the information is transmitted parallel (at the same time)

FIG. 25 shows the configuration of coded information sent by serial transmission (with a lapse of time), whereas FIG. 26 shows the configuration of coded information sent by parallel transmission (at the same time). The coded information is displayed by modulating the display screen of the information processing device T2, namely, by changing light and dark of a display. The conversion of the light and dark of the display will be described by uniquely associating light and dark with signals L and H logic levels.

The configuration of the coded information which is sent by serial transmission will be described with reference to FIG. 25. The information processing device T2 outputs a signal in which a set of an array of bits with a period of 4 msec. consisting of parallel bits all set to a logic high level, and an array of bits with a period of 4 msec. consisting of parallel bits all set to a logic low level is repeated twice. This signal is a synchronization signal.

Thereafter, the information processing device T2 outputs an array of bits with a period of 5 msec. consisting of parallel bits all set to a logical high level. This signal is a start word.

The information processing device T2 outputs signals, each of which corresponds to each of parallel bits forming word 0, for 5 msec. by setting a logic level to high or low depending on the value of each bit. The wireless coordinate indicator S2 interprets this information as the word 0 and stores the information. At the same time, the wireless coordinate indicator S2 checks errors in the word 0, which will be described later.

The information processing device T2 sends the word 0, and outputs signals for 5 msec. each for word 1, word 2, . . ., word 255. The wireless coordinate indicator S2 interprets each of these information items as each word, and checks errors in each word. As a result of this, 256 words are transmitted as one block, and the wireless coordinate indicator S2 receives the block.

After the transmission of 255 words, the information processing device T2 produces a horizontal parity word by caluculating exclusive OR of the same bits as each word, and outputs the thus generated horizontal parity word for 5 msec. The wireless coordinate indicator S2 checks errors by comparing this horizontal parity bit with the horizontal parity bits received so far.

After completion of the transmission of the horizontal parity word, the information processing device T2 outputs an array of bits for 5 msec. consisting of parallel bits all set to a logic low level. The wireless coordinate indicator S2 interprets this signal as a stop word. At the same time, the wireless coordinate indicator S2 notifies the operator whether or not the sequence includes errors by the use of error information means such as a scan indicator or the like depending on the timing of the synchronization signal, the start word, and the stop word, the result of the check of a signal level, and the result of the check of data errors detected by each parity.

It takes about 1.3 sec. to transmit one block which was previously mentioned, and the amount of coded information to be transmitted is 512 bytes on the assumption that one word fully comprises 16 bits. Therefore, the transmission rate is about 3000 bits/sec.

With reference to FIG. 26, the configuration of the coded information which is sent by parallel transmission will be described.

In FIG. 26, one word comprises 16 bits of data, and a signal level of each of bits b0–b15 is independently set. Bits having adjoining numbers physically adjoin, and the bits are arrayed in a line.

A vertical parity P is adjacent to the bit b15, and a diagonal parity Q is adjacent to the vertical parity P. These parities are also arrayed in a line.

The vertical parity P is obtained by calculating exclusive OR of all 16 bits output to the same point, and by inverting that result.

The diagonal parity Q is obtained by calculating exclusive OR of a total of 17 bits; namely, b0 which is 16 words ahead of the vertical parity P, b1 which is 15 words ahead of the same, b2 which is 14 words ahead of the same, . . . , b15 which is one word ahead of the same, and the vertical parity word P which is the same word. Words are rotated within a block and referred. A bit number −1 is read as word 255, −2 as word 254, . . . , −16 as word 240.

For the synchronization signal, the start word, and the stop word, a total of 18 signals, that is, all of the bits b0–b15, the vertical parity bit P, and the diagonal parity Q, are set to the same signal level.

The wireless coordinate indicator S2' with a printer will be described.

Figure 27:
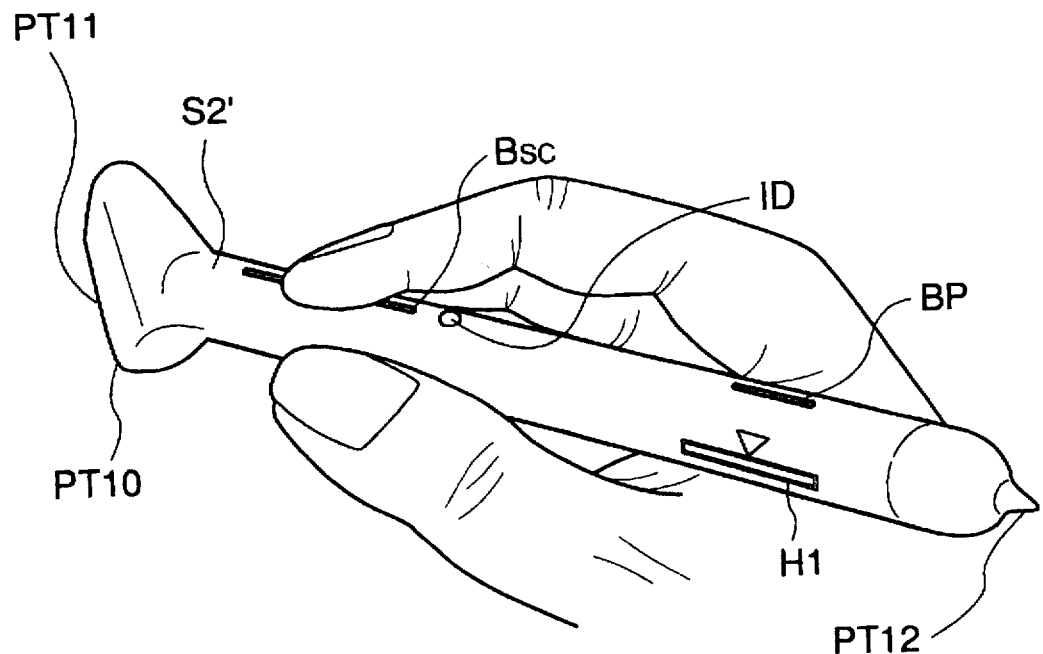
FIG. 27 is an external view of a wireless coordinate indicator S2' with a printer.

FIG. 27 is an external view of the wireless coordinate indicator S2' with a printer. This wireless coordinate indicator S2' is the same as the previously described wireless coordinate indicator S2 except that it has a printer.

In FIG. 27, as with the wireless coordinate indicator S2, the wireless coordinate indicator S2' is provided with the scan button Bsc, the scan indicator Id, a one-dimensional image sensor PT11, a coordinate indicating end PT10 which indicates a coordinate indicating point, and a pressure-sensitive pen tip PT12 for position detection. In addition to them, the wireless coordinate indicator S2' is also provided with a print button BP for issuing a printing request, and a record paper insertion slot H1 through which record paper is inserted.

Figure 28:
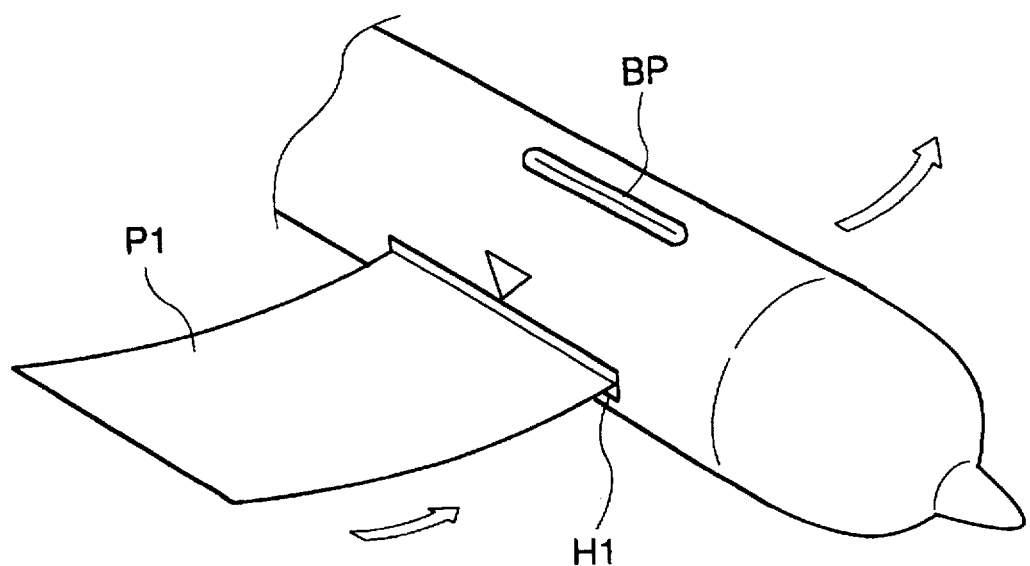
FIG. 28 is a schematic representation showing a printing state of the wireless coordinate indicator S2'.

FIG. 28 shows the wireless coordinate indicator S2' when it is printing information on record paper. Record paper P1 is inserted into the record paper insertion slot H1, and printing is started as a result of pressing of the print button BP. The record paper is fed step by step and is discharged from a record paper exit H2 (not shown) on the opposite end with respect to the insertion slot H1. A built-in printer is of a heat sensitive type.

With reference to FIGS. 29a to 29d, the detailed configuration of the printer of the wireless coordinate indicator S2' will be described.

FIG. 29a is a cross-sectional view of the printer of the wireless coordinate indicator S2', and FIGS. 29b, 29c, and 29d are cross-sectional views taken along lines a–a', b–b', and c–c' shown in FIG. 29a.

The record paper P1 is inserted into the record paper insertion slot H1, and the print button BP is pressed. As a result of this, a switch SWP is turned on, and information input through wiring boards 240 and 243 is sequentially output to a thermal head as bit information. A rubber roller 246 rotates by drive torque transmitted from a motor 241 via a gear section 242. The record paper P1 is sequentially fed by the rotation of this rubber roller. The printed record paper P1 is discharged step by step from the record paper exit H2.

The use of this wireless coordinate indicator S2' with a printer allows immediate printing of information collected from the information processing device T2.

The third embodiment corresponding to the basic form 3) will be described. In this third embodiment, it is possible to bidirectionally transmit information between the wireless coordinate indicator S3 and the information processing device T3.

Figure 30:
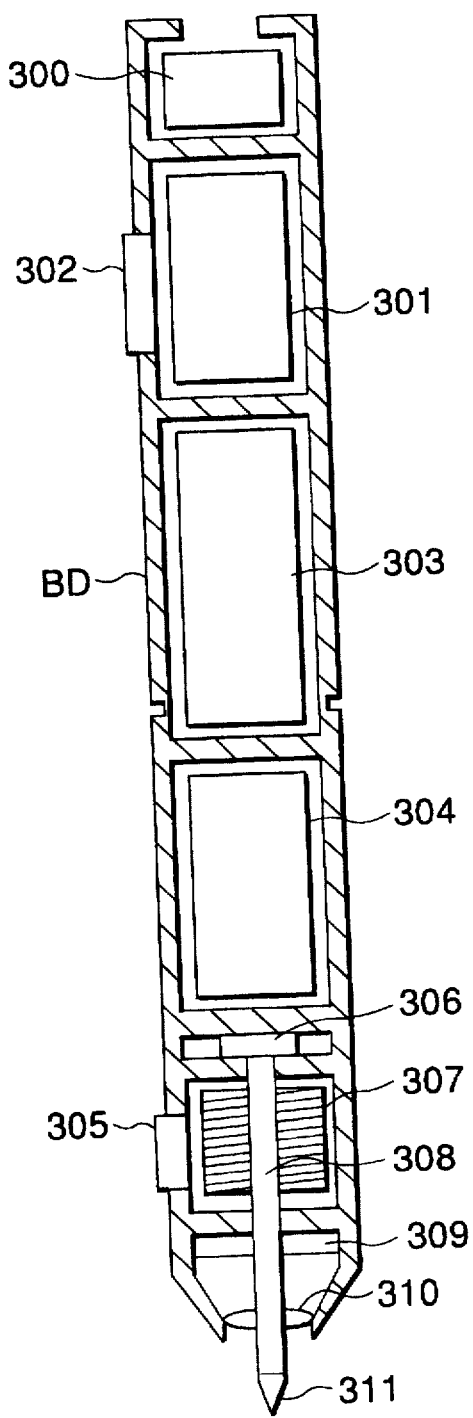
FIG. 30 is a cross-sectional view showing the configuration of an electromagnetic stylus pen with an information collecting section which is one example of the wireless coordinate indicator S3.

FIG. 30 shows the configuration of an electromagnetic stylus pen with an information collecting section which is one example of the wireless coordinate indicator S3. In FIG. 30, an information collecting section 300 collects, for example, sound and converts the thus collected sound information into an electric signal. A first electric circuit 301 has an analog-to-digital converter which digitizes collected information and memory for temporarily storing the converted information. Control buttons 302 are used for controlling the information collection operation of the information collecting section 300 and controlling the memory. A battery 303 is a power source of the electromagnetic stylus pen. A tool force switch 306 is a switch for detecting that the pen tip is pressed. A control button 305 is to manually transmit selected conditions to the information processing device T3. A coil 307 and a magnetic core 308 transmit an electromagnetic signal for transmitting coded information as well as an electromagnetic signal for indicating coordinates to the information processing device T3. A contact surface smoothing member 311 is attached to the tip end of the magnetic core 308 in order to make contact smooth. A lens 310 and a photosensor 309 obtain focus on a display on the display section of the opposed information processing device T3 and sense the display. The thus sensed display information is converted into an electric signal. A second electric circuit 304 comprises a circuit for driving the coil 307 and a circuit for amplifying an output of the photosensor 309. An outer/internal frame body BD supports and protects the previously mentioned constituent elements.

Figure 31:
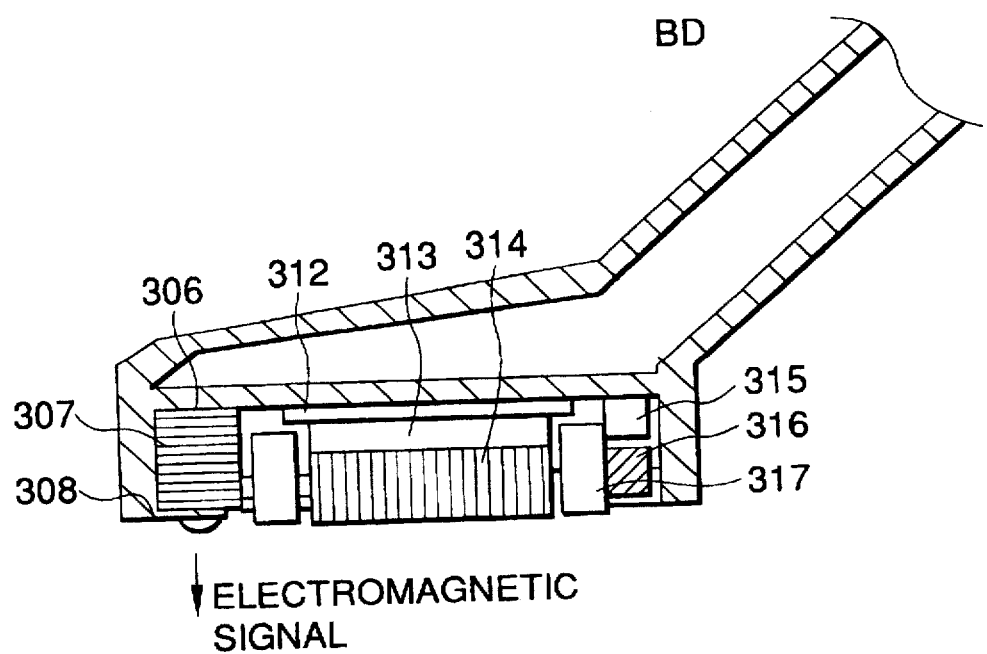
FIG. 31 is a schematic representation showing the detailed configuration of a modified example of an information collecting section 300 shown in FIG. 30.

FIG. 31 is a schematic representation showing the detailed configuration of a modified example of the information collecting section 300 shown in FIG. 30. This information collecting section 300 is positioned at the opposite end with respect to the end of the pen tip which includes the magnetic core 308 and emits an electromagnetic signal. The information collecting section 300 collects an image drawn on a plane surface such as paper. The image on the plane surface which was illuminated by an LED array 312 is focused on the one-dimensional image sensor 313 through a gradient index lens 314 (for example, Selfoc lens; product name of Nippon Sheet Glass Co., Ltd.). The thus focused image is captured as image information and is converted into an electric signal. The rubber roller 317 pressed by the operator against the plane which includes the image rotates in response to the scanning action of the operator when the image is scanned. A rotary encoder 316 directly coupled to the rubber roller 317 also rotates. The amount of scanning of the image is represented by the amount of rotation, and the amount of rotation is read by a reflection type photo interrupter. The image information converted into the electric signal and the amount of rotation are sent to the first electric circuit 301, and they are controlled and processed in the same.

The configuration of information (a transmission signal) transmitted from the wireless coordinate indicator S3 to the information processing device T3 will be described with reference to FIGS. 32 to 35.

Figure 35:
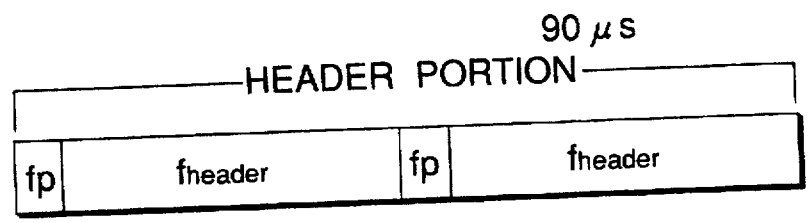
FIG. 35 is a schematic representation of information to be transmitted which only comprises a header portion consisting of two units when no data are transmitted.

FIG. 32 shows the overall configuration of one packet of transmission information. Packet transmission method is employed as the transmission method. One packet is made up of a header portion, a data portion, and a CRC portion. 512 bytes of data are transmitted by one packet. However, as shown in FIG. 35, in some case, only the header portion forms one packet. In such a case, only the message is transmitted.

In FIG. 32, all of the header portion, the data portion, and the CRC portion are made of units. Each unit comprises a synchronization signal fp having a predetermined period of time, and eight signals each of which has the same period of time as the synchronization signal. The signal fp for detecting position is also used as the synchronization signal fp.

One bit has a period of 5 μsec which is the same as the period of time of the synchronization signal fp, and therefore the period of time of one unit is 45 μsec.

The header portion is made of two units, the data portion is made of b 512units, and the CRC portion is made of units. Accordingly, one packet comprises 516 units. The CRC section has 16 bits of information and checks errors for 512 bytes of data.

The period of time of one packet is hence 23.22 msec, and the data transmission rate becomes about 22 Kbytes/sec.

If no data are transmitted as shown in FIG. 35, the packet is made of only the header portion which includes two units.

FIG. 33 shows the detailed configuration of the header portion, and the header portion is made of two units as set forth above.

A header mark has twice the length of the synchronization signal fp. An identification symbol b2 next to the header mark is a bit which represents whether the packet is transmitted or received. If this symbol is logical 0, sequence numbers of b3 to b7 show that the packet is transmitted. If this symbol is logical 1, the sequence numbers of b3 to b7 show that the packet is received. Thus, the identification symbols b3 to b7 are sandwiched between the synchronization signals fp, and other identification symbols b8 to b11 represent a 4-bit message.

The meaning of this 4-bit message differs depending on the value of the identification symbol b2. The meaning of the 4-bit message will be explained for each of the cases in which b2=0 and in which b2=1.

1) b2=0

When the value of the message is 0, the message means the data transmission. When the value of the message is 1, the message means a status transmission request. When the value of the message is 2, the message means data transmission and the correction of light sensitivity. When the value of the message is 3, the message means the correction of light sensitivity. When the value of the message is other than 0, 1, 2, and 3, the message means a reservation code. When the value of the message is 0 or 2, the packet becomes the same packet as shown in FIG. 32. However, if the value takes the other values, the packet will be shorter as shown in FIG. 35, that is, a shorter packet consisting of only a header portion.

2) b2=1

When the value of the message is 0, it means that the packet is in a normal status. When the value of the message is 1, the packet has synchronization errors. When the value of the message is 2, the packet has header errors. When the value of the message is 3, the packet has data parity errors. When the value of the message is other than 0, 1, 2, and 3, the message means a reservation code. In any of these cases, the packet will become shorter as shown in FIG. 35.

Identification symbols b12 to b15 are error correction codes (ECC) for the identification symbols b2 to b11. Here, a hamming code is used as the ECC.

The identification symbols having smaller values represent lower order bits. For example, when b3=0, b4=1, b5=0, b6=0, and b7=0, the sequence number becomes #*2.

Figure 34:
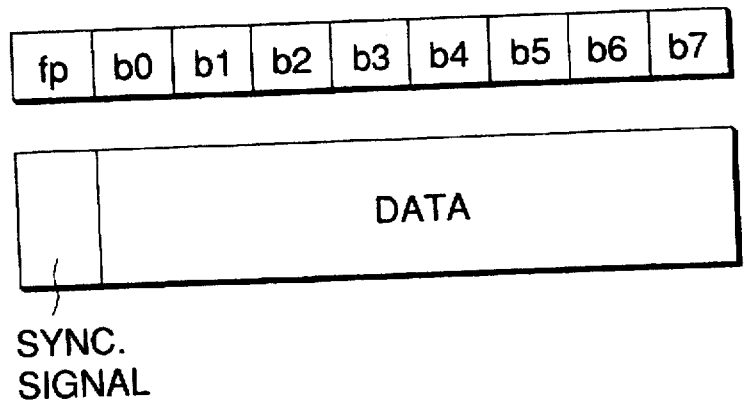
FIG. 34 is a schematic representation showing the configurations of a data portion and a CRC portion, for one unit, shown in FIG. 32.

FIG. 34 shows the the configuration of one unit in the data portion and the CRC portion. The identification symbols having smaller values represent lower order bits.

The configuration of a circuit for generating an electromagnetic signal of the electromagnetic stylus pen of the third embodiment is the same as the circuit configuration of the first embodiment shown in FIG. 14. The operation of the circuit is also the same as that of the circuit of the first embodiment, and hence the explanation thereof will be omitted here for brevity.

The information processing device T3 of the third embodiment is also the same in Configuration and operation as that of the information processing device shown in FIG. 15, and hence the explanation thereof will be omitted here for brevity.

Figure 36:
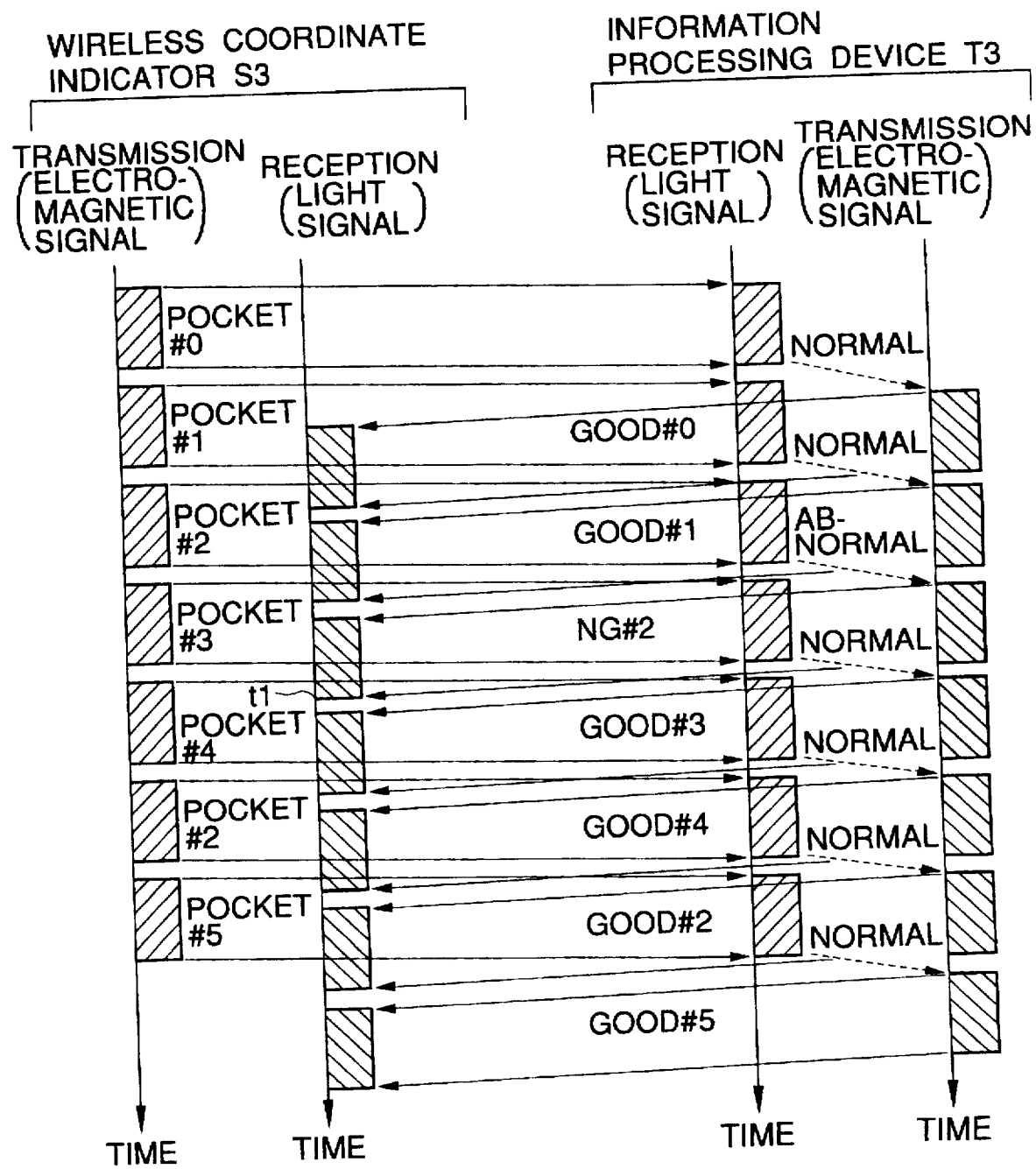
FIG. 36 is a timing chart for illustrating communication timing between the wireless coordinate indicator S3 and the information processing device T3.

FIG. 36 is a timing chart for illustrating communication timing between the wireless coordinate indicator S3 and the information processing device T3, and an explanation will be given of the communication timing including the case where transmission errors arise in communication. In FIG. 36, time lapses toward a lower portion of the drawing. This timing chart shows timing for the transmission of an electromagnetic signal and the receipt of a light signal at the wireless coordinate indicator S3 and the receipt of the electromagnetic signal and the transmission of the light signal at the information processing device T3. The coded information transmitted from the wireless coordinate indicator S3 has six packets #0–#5. These packets are transmitted utilizing an electromagnetic signal. When the packet #0 is transmitted from the wireless coordinate indicator S3, the information processing device T3 normally receives this packet. To notify the wireless coordinate indicator S3 of this normal receiving of the packet, a replay packet "GOOD#0" which represents the normal receipt of the packet #0 is sent in the form of a light signal. The wireless coordinate indicator S3 receives this replay packet. Similarly, a packet #1 is also normally received. However, a packet #2 is not normally received, and the information processing device T3 judges that the receipt of the packet #2 was abnormal. The information processing device T3 sends a replay packet "NG#2" which represents the abnormal receipt of the packet #2 in the form of a light signal toward the wireless coordinate indicator S3. In response to this, the wireless coordinate indicator S3 receives this replay packet. At a point t1 when the replay packet was received by the wireless coordinate indicator S3, the transmission of a packet #3 has already been completed, and the transmission of a packet #4 is being transmitted. Hence the packet #2 is retransmitted after the completion of the transmission of the packet #4. This resent packet #2 is normally received, and a replay packet "GOOD#2" is received by the wireless coordinate indicator If a packet #5 is also normally received, the wireless coordinate indicator S3 terminates the transmission of the coded information.

The retransmission of the packet #2 explained with reference to FIG. 36 was also carried out by bidirectional transmission. If the retransmission is not necessary, it is possible to easily understand that bidirectional transmission, that is, the transmission of a coded information from the wireless coordinate indictor S3 to the information processing device T3 and the transmission of another coded information from the information processing device T3 to the wireless coordinate indicator S3, is feasible.

Communication processing, including general automatic retransmission, between the wireless coordinate indicator S3 and the information processing device T3 will be described later.

Figure 37:
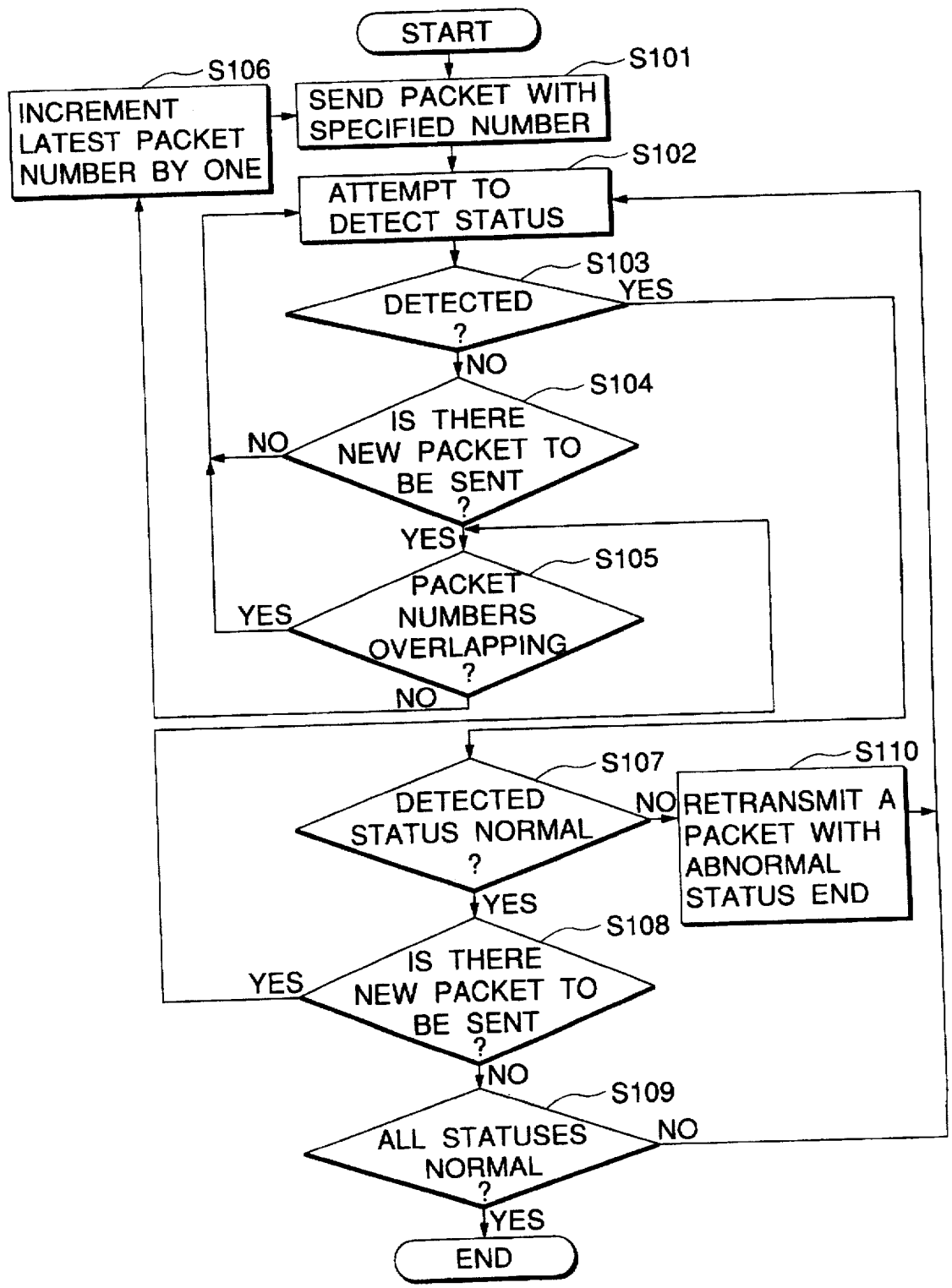
FIG. 37 is a flowchart showing communication processing procedures executed in the wireless coordinate indicator S3.

FIG. 37 is a flowchart showing communication processing procedures in the wireless coordinate indicator S3. Assume that the wireless coordinate indicator S3 itself keeps track of the overall coded information to be transmitted, and that transmission of the coded information in a divided form is previously scheduled. The wireless coordinate indicator S3 starts the transmission of a packet having a specified number (step S101). Presume that the wireless coordinate indicator is not waiting for the completion of the transmission of a packet which takes a predetermined period of time, but proceeds to subsequent processing. Specifically, the wireless coordinate indicator attempts to detect the status of a packet as the next processing (step S102). This status of the packet is not limited to a status associated with the immediately previously transmitted packet, but may be associated with all of the packets which were previously transmitted. A packet number is circulated, and hence the status of the packet is limited to previously transmitted 16 packets including the currently transmitted packet, provided that the packet is made of. for example, 4 bits. Subsequently, the wireless coordinate indicator determines whether or not the status was detected step S103). If it was possible to detect the status, the wireless coordinate indicator proceeds to step S107.

However, if the wireless coordinate indicator failed to detect the status in step S103, it determines whether or not there is another new packet to be sent (step S104). if there is not a new packet to be sent, the wireless coordinate indicator proceeds to step S102. Contrary to this, if there is another new packet to be sent, the wireless coordinate indicator determines whether or not the packet has an overlapping packet number (step S105). If the new packet has the overlapping packet number, the wireless coordinate indicator proceeds to step S102. However, if the new packet has no overlapping packet number, the wireless coordinate indicator proceeds to step S106 and increments the latest packet number by one. Thereafter, the wireless coordinate indicator proceeds to step S101.

In step S107, the wireless coordinate indicator determines whether or not the detected status is normal. If the status is not normal, the packet is retransmitted (step S110) and proceeds to step S102. On the other hand, if the status detected in step S107 is normal, the wireless coordinate indicator determines whether or not there is another new packet to be sent (step S108). If there is a new packet to be sent, the wireless coordinate indicator proceeds to step S105. On the other hand, if there is no new packet to be sent in step S108, the wireless coordinate indicator determines whether or not all statuses are normal (step S109). If not all of the statues are normal, the processing proceeds to step S102. If all of the statuses become normal as a result of the repetition of the above mentioned processing, the present processing will be terminated.

The communication processing of the information processing device will be described.

Figure 38:
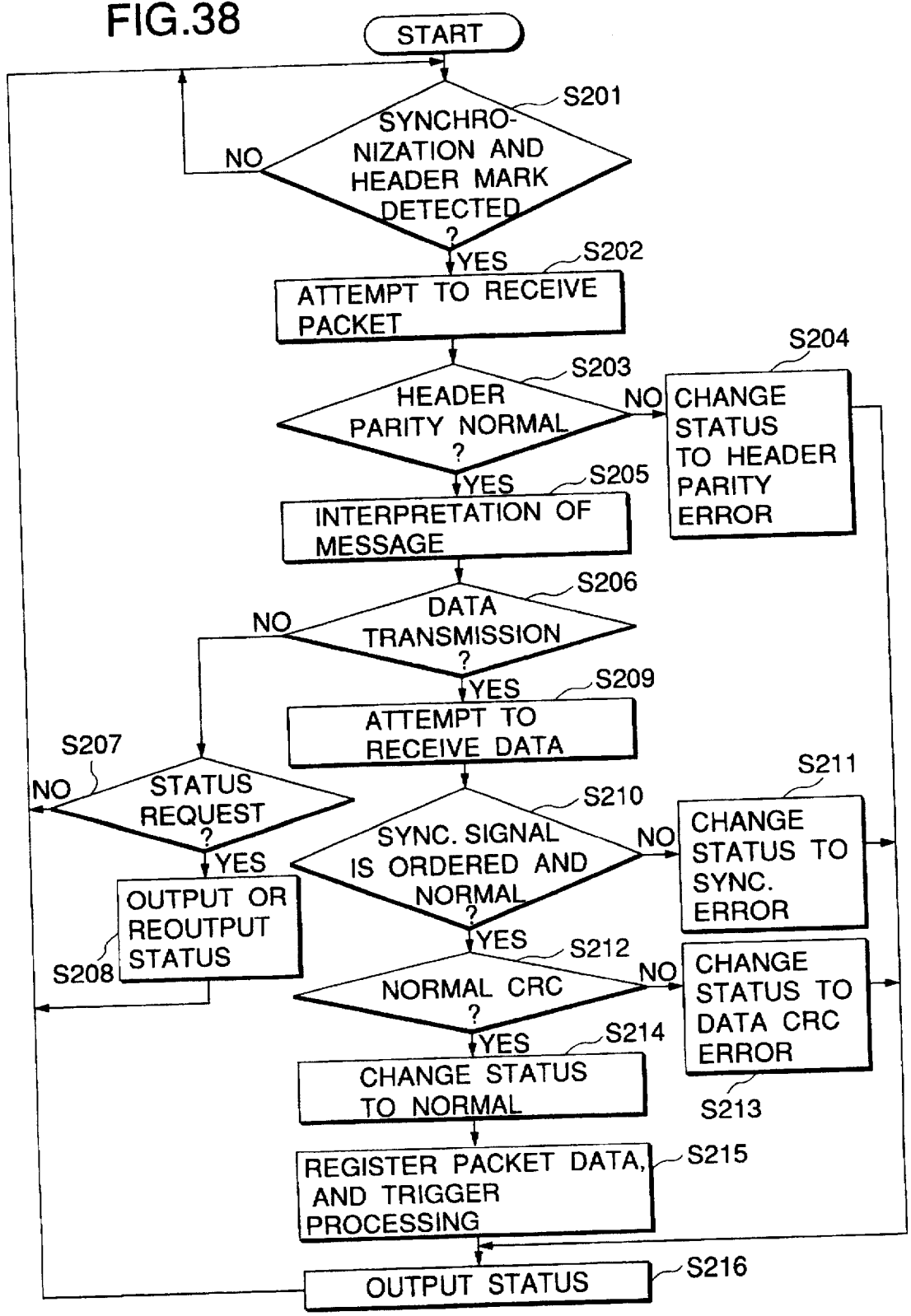
FIG. 38 is a flowchart showing communication processing procedures of the information processing device T3.

FIG. 38 is a flowchart showing communication processing procedures of the information processing device T3. in FIG. 38, assume that the information processing device T3 itself does not keep track of the overall coded information to be sent at the first time but grasps the overall coded information from the first packet transmitted from the wireless coordinate indicator. The information processing device, as a whole, operates in a passive manner. The arrival of a signal transmitted from the wireless coordinate indicator S3 results in the start of the processing of the information processing device. For this reason, the flow of the information processing device T3 has an endless structure.

Upon receipt of an electromagnetic signal emitted from the wireless coordinate indicator S3, the information processing device determines whether or not the combination of a synchronization signal and a header mark included in the signal was detected (step S201). If the combination was detected in step S201, the information processing device receives that packet (step S202) The packet inevitably includes a header at its head, and it is determined whether subsequent data are transmitted or no data follow on the basis of a message included in the header. In step S203, it is determined whether or not a parity, which is the final bit in the header, is normal. If the parity is not normal, the status of the packet is set to an head parity error (step S204), and the processing proceeds to step S216. On the other hand, if the parity is normal, all of the information items of the header are judged as being correct. The information processing device recognizes a received packet number, and interprets the message (step S205). It is then judged whether or not the message is data transmission (step S206). If the message is not data transmission, it is further judged whether or not the message is a status request (step S207). If the message is not the status request, the processing proceeds to step S201. However, if the message is the status request, the status is output or reoutput (step S208). Thereafter, the processing proceeds to step S201.

On the other hand, if the message was judged as data transmission in step S206, the information processing device receives data while monitoring a synchronization signal transmitted together with the data until it completely receives a predetermined amount of data (step S209). It is judged whether or not the monitored synchronization signal is ordered and normal (step S210). If the synchronization signal is not normal, the status of the data is set to a synchronization error (step S211), and the processing proceeds to step S216. However, if the synchronization signal was judged as being normal in step S210, it is further checked whether or not the CRC which is finally received is normal (S212). If the CRC is judged as being abnormal, the status of the data is set to a data CRC error, and the processing proceeds to step S216. On the other hand, if the CRC was judged as being normal in step S212, the status of the data is set to normal (step S214). After the data of the packet have been registered and processing has been triggered (step S215), the information processing device proceeds to step S216.

In step 216, the set status is output, and the processing proceeds to step S201.

Transmission of coded information from the information processing device T3 to the wireless coordinate indicator S3 can be effected in the similar way.

The configuration of a light signal and an electric signal, when information is transmitted from the information processing device T3 to the wireless coordinate indicator S3 by the use of a display, will be described.

Figure 39:
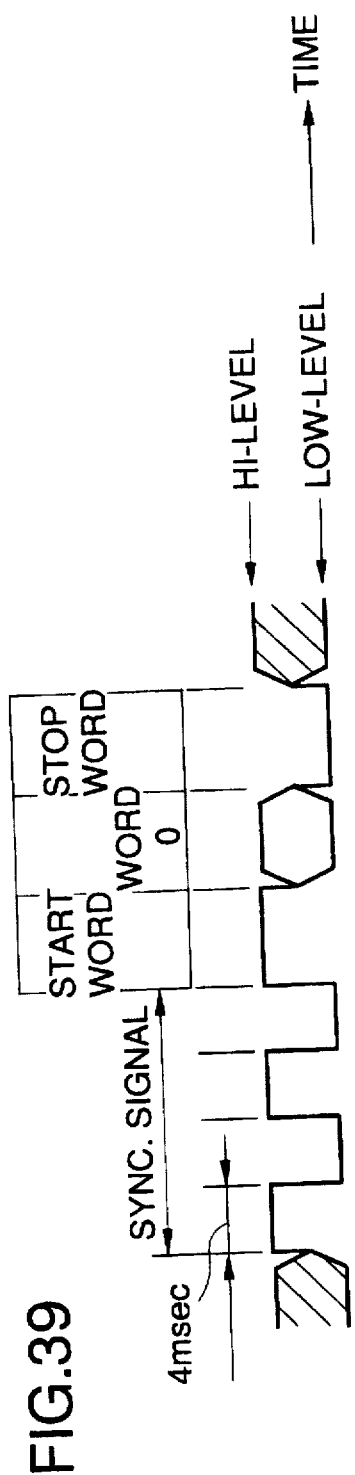
FIG. 39 is a schematic representation showing the configuration of a signal to be transmitted when one word is transmitted.
Figure 40:
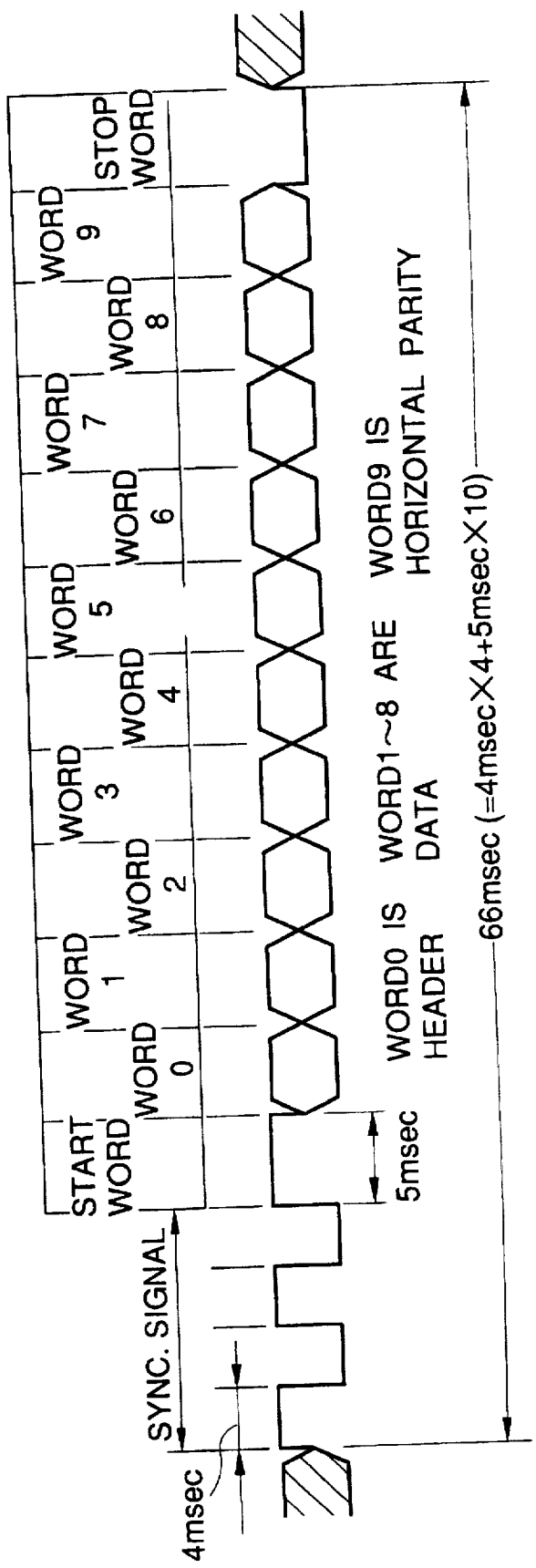
FIG. 40 is a schematic representation showing the configuration of the signal to be transmitted when ten words are transmitted.
Figure 42:
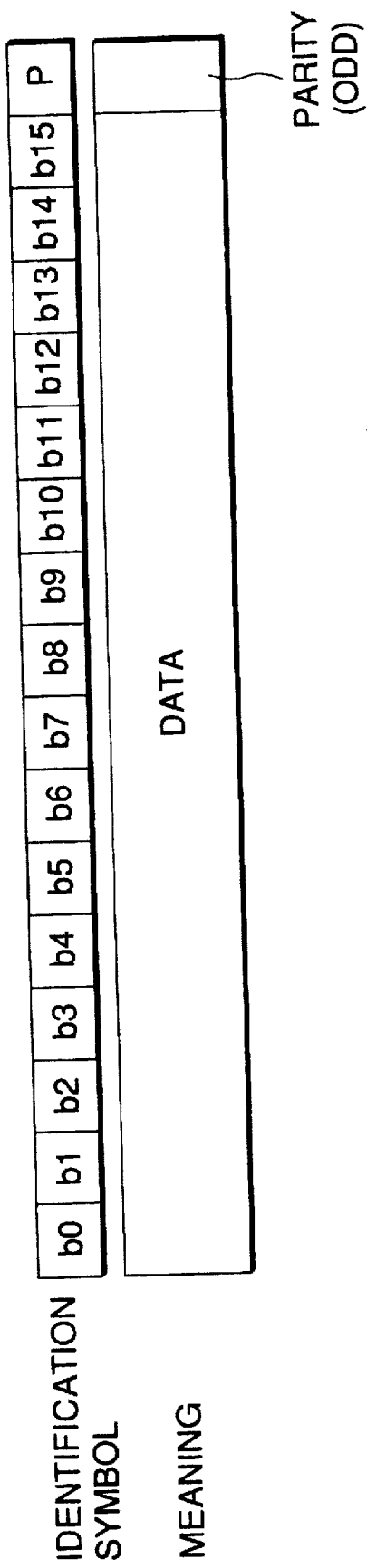
FIG. 42 is a schematic representation showing the configurations of the data portion and the CRC portion.

FIG. 39 shows the configuration of a transmission signal when one word is transmitted. FIG. 40 shows the configuration of a transmission signal when 10 words are transmitted. FIG. 41 shows the configuration of a header portion, that is, a word 0. FIG. 42 shows the configurations of a data portion and a CRC portion. Here, the coded information is serially transmitted using 16-bit parallel transmission.

As shown in FIG. 42, one word is made of 16 bits which are transmitted parallel and one parity bit. Further, as shown in FIG. 41, the header does not use a parity bit.

With reference to FIG. 41, low order bit b0 to high order bit b15 will be explained one by one.

Identification symbols b0 and b1 are dummy signals, and the values of these signals are 0. Identification symbol b2 is a bit which represents receipt or transmission of a packet. When the value of this symbol b2 is 0, sequence numbers of the identification symbols b3 to b7 represent a transmission packet. On the other hand, when the value of the symbol b2 is 1, the sequence numbers of the identification symbols b3 to b7 represent a receipt packet. Five bits, that is, the identification symbols b3 to b7, represent sequence numbers. Four bits, that is, identification symbols b8 to b11 represent a message. The meaning of this message depends on the value of the identification symbol b2.

1) b2=0

When the value of the message is 0, the message represents data transmission. When the value is 1, the message represents a status transmission request. When the value is 2, the message represents data transmission and the correction of an electromagnetic sensitivity. When the value is 3, the message represents the correction of the electromagnetic sensitivity. If the value is other than 0, 1, 2, and 3, the message represents a reservation code. When the value of the message is 0 or 2, the message has the configuration of data as shown in FIG. 40. However, when the value is other than 0 or 2, the message takes the configuration of data as shown in FIG. 39; namely, the message takes the configuration of data which has only one word 0.

2) b2=1

When the value of the message is 0, the message represents that the status of the packet is normal. When the value is 1, the message represents that the packet has synchronization errors. When the value is 2, the message represents that the packet has header errors. When the value is 3, the message represents that the packet has CRC errors. If the value is other than 0, 1, 2, and 3, the message represents a reservation code. In these cases, all of the configurations of the data becomes the configuration of data as shown in FIG. 39 which has only one word 0.

Subsequent four identification symbols b12 to b15 represent error correction codes (ECC) for 10 bits from the identification symbols b2 to b11.

FIG. 42 shows the configuration of one word for the data portion and a horizontal parity portion. The identification symbols having smaller values represent lower order bits. Further, this word has an odd parity bit P for bit 0 (identification symbol b0) to bit 15 (identification symbol b15).

In FIGS. 39 and 40, a transmission signal is serially sent. In the drawings, the horizontal axis shows the time axis, and time lapses toward the right of the drawing. Hatched portions of the packet represent that the levels of the hatched portions of the signal are not material. The configuration of this transmission signal changes depending on whether or not data are transmitted. If the data are not transmitted, the transmission signal takes the same configuration as shown in FIG. 39. If the data are transmitted, the transmission signal takes the same configuration as shown in FIG. 40.

If the data are not transmitted, the transmission signal takes the same configuration as shown in FIG. 39, and a set of a logic-high-level signal having a period of 4 msec. and a logic-low-level signal having a period of 4 msec. is initially issued twice as the synchronization signal. Subsequently, a logic-high-level signal is output for 5 msec. as a start word which represents the start of the packet. Thereafter, one word 0 which includes a sequence number and a message is output for 5 msec. A logic-low-level signal is then output for 5 msec. as a stop word which represents the end of the packet.

On the other hand, when data are transmitted, the transmission signal takes the configuration as shown in FIG. 40. As with the case where the data are not first transmitted, a set of a logic-high-level signal having a period of 4 msec.

and a logic-low-level signal having a period of 4 msec. is output twice. Subsequently, a logic-high-level signal is output for 5 msec. as a start word which represents the start of the packet. Thereafter, word 0 which includes a sequence number and a message is output for 5 msec, and each of words 1 to 8 which are eight data words is output for 5 msec. Finally, horizontal parity word is output for one word as word 9 for 5 msec. Each of bits of the horizontal parity word is the same as each of bits of words 0 to 8, that is, an odd parity. Then, a logic-low-level signal is output for one word for 5 msec. as a stop word which represents the end of the packet.

By virtue of these configurations, data can be transmitted parallel.

A signal for correcting the sensitivity of the light signal to be transmitted from the information processing device T3 to the wireless coordinate indicator S3 will be described.

Figure 43:
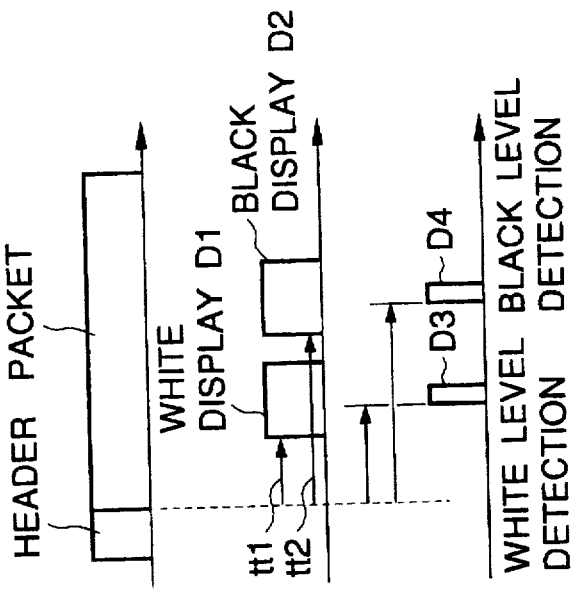
FIG. 43 is a timing chart of three signals for correcting the sensitivity of an optical signal.

FIG. 43 is a timing chart for three signals used for correcting light sensitivity of a light signal. In FIG. 43, a header is provided at the head of a packet transmitted from the wireless coordinate indicator S3. Upon receipt of this header signal, the information processing device T3 displays a white display D1 and a black display D2, one after another, after preset periods of time tt1 and tt2 have passed respectively. The wireless coordinate indicator S3 detects the intensity of light while each of the displays D1 and D2 is being displayed, so that a white level D3 and a black level D4 for correction purposes are respectively obtained. This operation is not constantly performed but is carried out only when the wireless coordinate indicator received a light sensitivity correction instruction or a data transmission and light sensitivity correction instruction through the message included in the header. For example, this operation is used when transmission errors continuously arise in the head packet of a series of packets.

Figure 44:
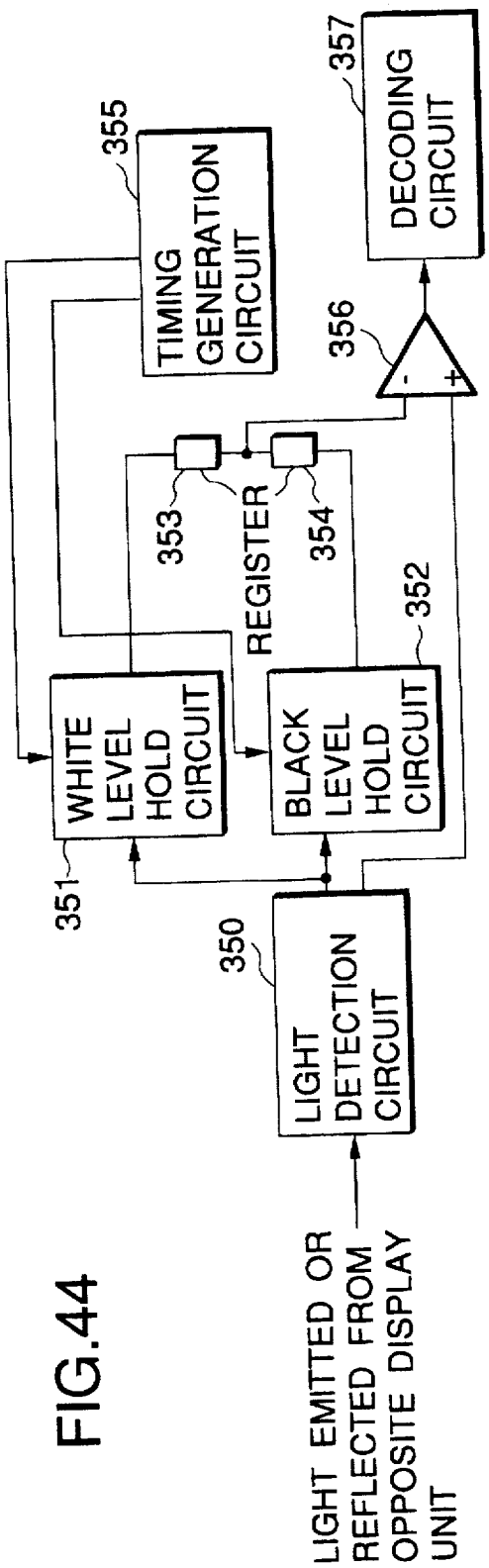
FIG. 44 is a circuit diagram showing the configuration of a light sensitivity correction circuit disposed in the wireless coordinate indicator S3.

With reference to FIG. 44, the configuration of a light sensitivity correction circuit in the wireless coordinate indicator S3 will be described.

In FIG. 44, a light detection circuit 350 receives light emitted or reflected from the display which is opposite to the wireless coordinate indicator S3, and converts the received light into an electric signal. The thus converted electric signal is delivered to a white level hold circuit 351, a black level hold circuit 352, and a positive input terminal of a relative operation circuit 356. A timing generation circuit 355 under control of the MPU is housed in the wireless coordinate indicator S3. After a predetermined period of time tt1 has passed since the header signal was output, a white level hold control signal is fed to the white level hold circuit 351. Thereafter, after a predetermined period of time tt2 has passed since the header signal was output, a black level hold control signal is fed to a black level hold circuit 352. Upon receipt of the white level hold control signal, the white level hold circuit 351 holds an electric signal voltage which represents a white level, and outputs the voltage to a threshold generation resistor 353. On the other hand, upon receipt of the black level hold control signal, the black level hold circuit 352 holds an electric signal voltage which represents a black level, and outputs the voltage to a threshold generation resistor 354. The voltage divided by these two threshold generation resistors 353 and 354 is applied to a negative input terminal of the relative operation circuit 356. The relative operation circuits 356 compares the signal voltages received at the positive and negative input terminals thereof with each other, and the result of the comparison is converted into a binary signal, and the binary signal is output to a decode circuit 357.

A read error and the correction of that read error caused by the image sensors shown in FIGS. 10 and 30 for use with the wireless coordinate indicator S3 will be described. in the following image sensors, not a single sensor but a plurality of sensors are provided so as to detect a plurality of locations around an indicated point.

Figure 45:
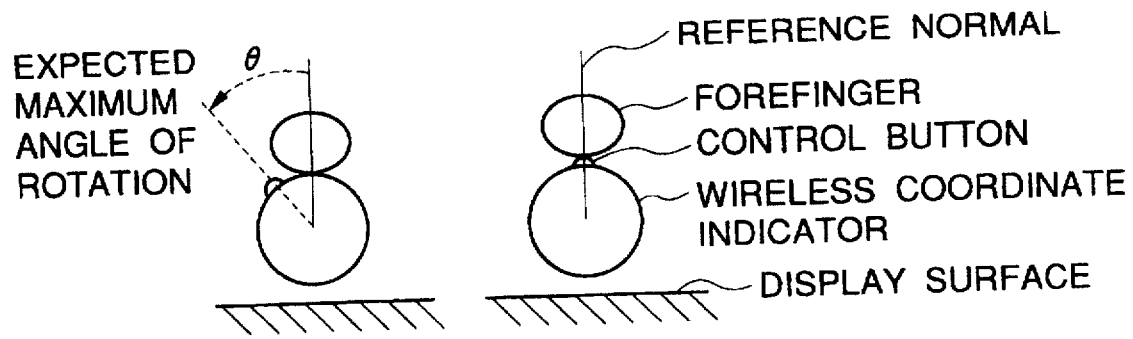
FIG. 45 is a schematic representation illustrating the range of the position of a forefinger which is one element of a relative angle of rotation of the wireless coordinate indicator S3 with respect to a display screen.

FIG. 45 is a schematic representation illustrating one element of a relative angle of rotation of the wireless coordinate indicator S3 with respect to the display screen, that is, the range in which the operator's forefinger is positioned. It is possible to reduce the expected maximum rotational angle θ by providing the user with an operation instruction reading "Place the forefinger nearby the thumb when you do not press a control button".

Another element of the relative angle of rotation of the wireless coordinate indicator S3 (not shown in FIG. 45) with respect to the display is an inclination of the axis of the wireless coordinate indicator with respect to the display surface. This inclination is ascribed to an inclination of a wrist, a degree of inclination of a pen, and the rotation of the display section. However, even in the case of this element, it is possible to suppress the expected maximum angle of rotation by providing the operator with an operation instruction reading "Set a display section straight up or hold the display section upright. Hold a stylus pen as easily as possible in the same way as usually holding a pen". In this way, after variations in the relative angle of rotation have been suppressed, the absolute amount of the center of variations in relative rotation is registered in the information processing device T3 in a manner similar to software. As a result of this, it becomes possible to set a display modulation range associated with a relative angle of rotation which provides great possibility that the wireless coordinate indicator S3 operated by the operator may exist.

Figure 46:
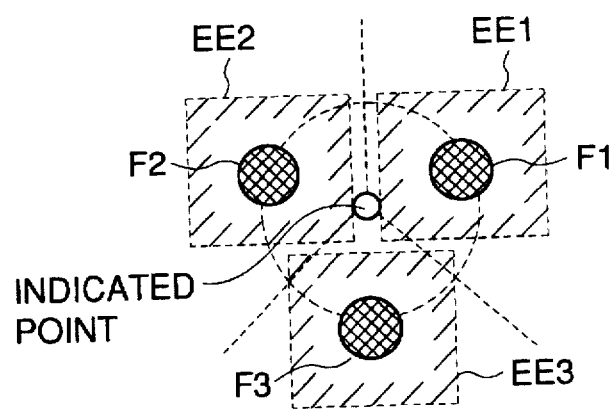
FIG. 46 is a schematic representation showing an example of the setting of the division of a display modulation range.

FIG. 46 is an example of the setting of display modulation range segments. This example is based on the assumption that it is easy to suppress a total of expected maximum angles of rotation within 120 degrees. In other words, the example is based on the presumption that the expected maximum angle of rotation θ is sufficiently smaller than 120 degrees. It is presumed that this assumption may be feasible. The wireless coordinate indicator S3 has three photosensitive elements, and these elements are spaced 120 degrees apart from each other about the axis of the wireless coordinate indicator S3. Each element is set so as to form focus at the display screen of the opposite display section. It is not necessary to rigidly determine the depth of the focus, and it is possible to set the focus so as to slightly spread out. Similarly, the focal points F1 to F3 are spaced 120 degrees apart from each other about a coordinate point indicated by the wireless coordinate indicator S3. Rectangular ranges EE1 to EE3, in which a display is modulated, are defined on the display section in such a way that the focal points F1 to F3 are respectively centered at the ranges F1 to F3. These three ranges are activated independently of each other.

Although the above descriptions are directed to right-hand operation, the same descriptions are also applicable to left-hand operation. Moreover, a changeover switch may be provided to switch between right-hand operation and left-hand operation.

Figure 47:
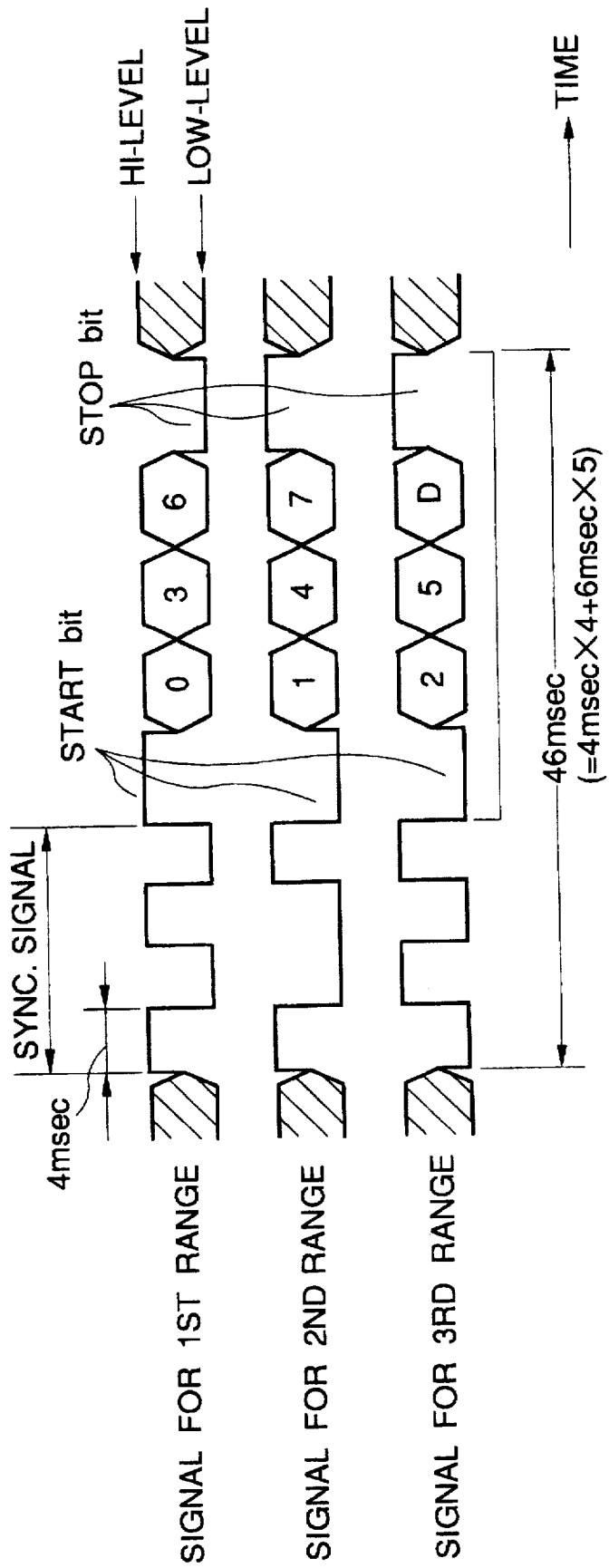
FIG. 47 is a schematic representation of a waveform when a code, representing normality, is transmitted from the information processing device T3 to the wireless coordinate indicator S3 while being divided into three ranges EE1 to EE3.

FIG. 47 is a waveform diagram showing a normality code when it is transmitted from the information processing device T3 to the wireless coordinate indicator S3 while divided corresponding to the three ranges EE1 to EE3. The use of the three segmented ranges EE1 to EE3 allows 3-bit parallel transmission of coded information.

In FIG. 47, principal switching timing between a logic high level and a logic low level of a synchronization signal is 4 msec. Waveforms for the three ranges are made different from each other, and the duration of a pulse is made shorter. A signal for the first range has logic levels in the order of H, L, H, and L; a signal for the second range has logic levels in the order of H, L, L, and H; and a signal for the third range has logic levels in the order of L, H, L, and H. By virtue of the short pulse duration, the chance of erroneous detection of extraneous light as a synchronization signal is reduced further. To accurately detect switching timing between the synchronization signal and a start bit, a start bit of the first range signal is set to a logic high level, and start bits of the second and third range signals are set to a logic low level. Furthermore, to prevent the chance of erroneous detection of extraneous light, the polarities of stop bits of the signals are inverted with respect to the start bits. Each of the signals has three intermediate bits, and these intermediate bits are respectively assigned bit numbers. Here, a intermediate bit D included in the signal for the third range represents a dummy bit. A bit 7 is used as a parity bit, and another parity bit is made by combination of the dummy bit with another bit. For instance, it is possible to set the value of the dummy bit so that a total number of logical 1s included in bits 0, 2, 4, 6, and D become odd. As a result of this, it is possible to realize the transmission of coded information with a further improved reliability. The coded information is transmitted by 3-bit parallel transmission, and therefore it takes only 46 msec. to transmit coded information. Compared with serial transmission, it is possible to transmit coded information within ⅓ to ½ a period of time.

Figure 48:
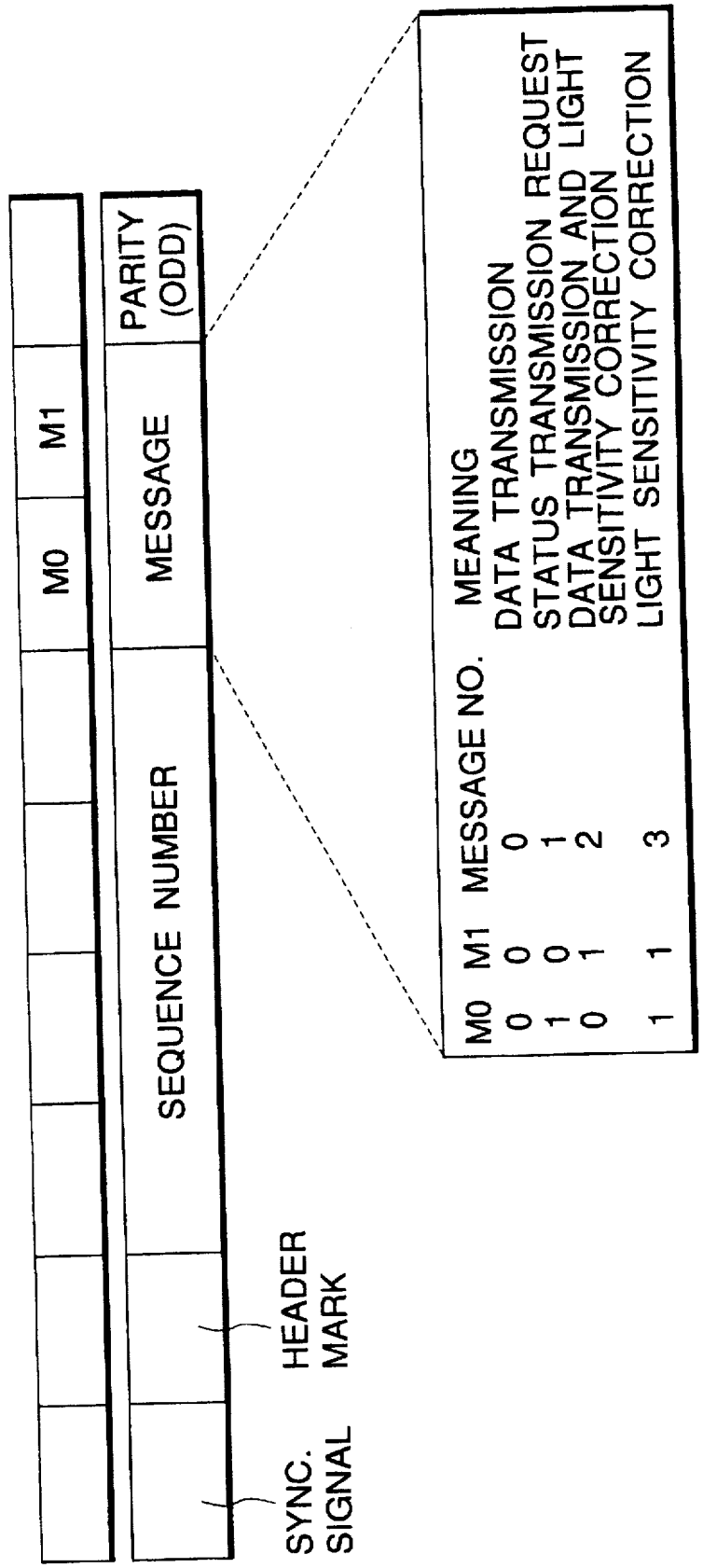
FIG. 48 is a schematic representation showing logical meanings of messages included in a header of a packet which is transmitted from the wireless coordinate indicator S3 to the information processing device T3 by means of 3-bit parallel transmission.

FIG. 48 is a schematic representation showing the logical meaning of a message included in a header of a packet transmitted from the wireless coordinate indicator S3 to the information processing device T3 by means of the 3-bit parallel transmission shown in FIG. 47. The message is made of two bits M0 and M1. There are four types of message, and the messages are assigned numbers from 0 to 3. A message 0 signifies data transmission; a message 1 signifies a status transmission request; a message 2 signifies data transmission and light sensitivity correction; and a message 3 signifies light sensitivity correction.

Embodiments common to the preceding first to third embodiments will now be described.

In the case of the second embodiment as shown in, for example, FIG. 24, coded information which designates a document is read by pressing the pen tip PT1 with the one-dimensional image sensor of the wireless coordinate indicator S2 against the display region E1 in the display screen of the information processing device T2. In a fourth embodiment, to prevent read errors resulting from rotational displacements of the wireless coordinate indicator S2, bits to be parallel transmitted are substantially concentrically displayed in a modulated way about the indicated coordinate.

Figure 49:
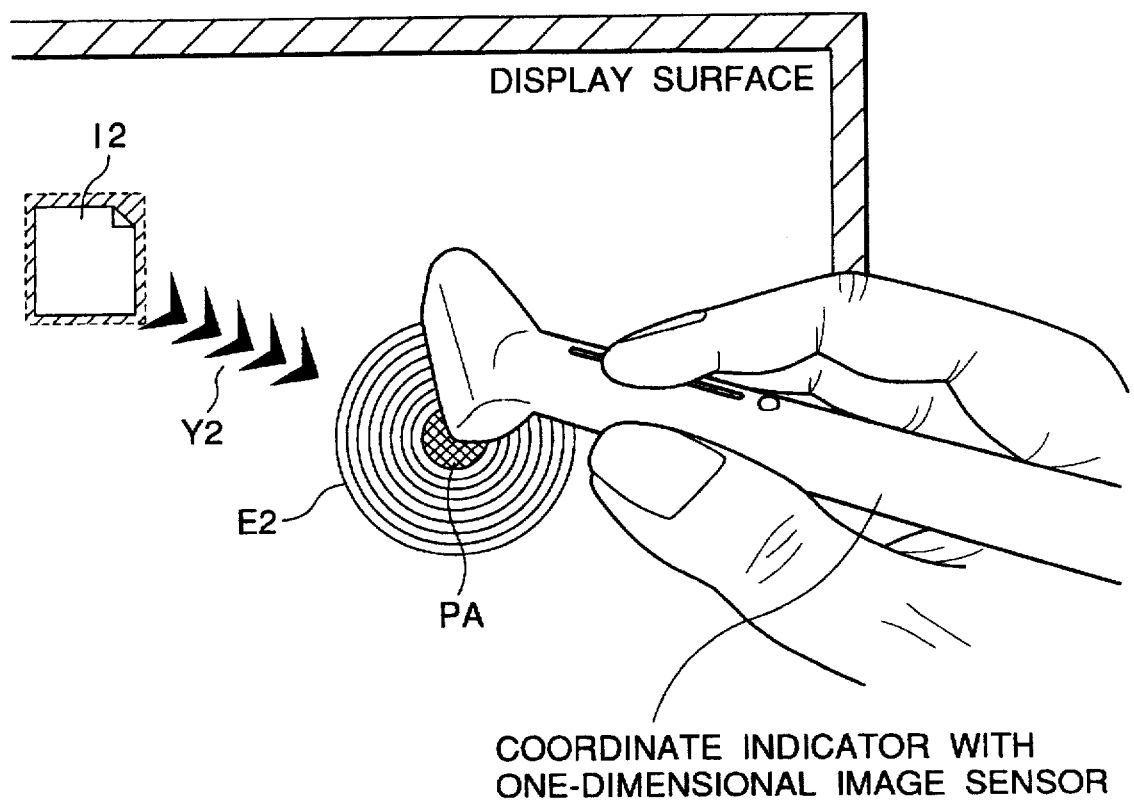
FIG. 49 is a schematic representation showing a display screen of the information processing device which is substantially concentrically displayed around a coordinate indicating point in a modulated way according to a fourth embodiment of the present invention.

FIG. 49 shows a display screen of an information processing device, according to the fourth embodiment, in which bits are substantially concentrically displayed in a modulated way about an indicated coordinate. FIG. 49 shows a display region E2 in which bits to be parallel transmitted are substantially concentrically displayed in a modulated way about an indicated coordinate PA. The modulated indication of the display region E2 in a substantially concentrically circular pattern makes it easy for the operator to place the pen tip at the indicated coordinate PA even when the display screen of the information processing device is rotated to a certain extent in relation to the operator. Therefore, transmission errors resulting from positional displacements are reduced.

Figure 50:
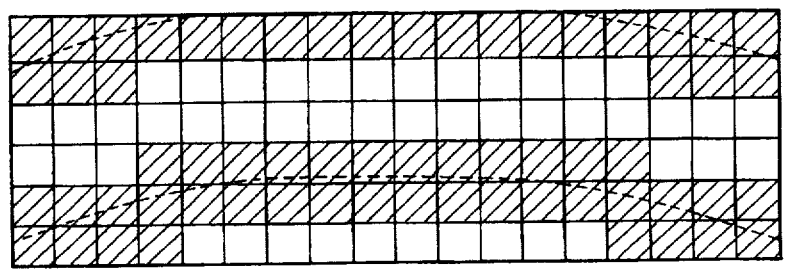
FIG. 50 is a schematic representation showing one example of active pixels which form the substantial concentric pattern.

Practically, in the display region E2 in a substantially concentrically circular pattern associated with the bits, the display screen is quantized. In this case, active pixels which form a substantially concentrically circular pattern, as shown in FIG. 50, are specified within the display screen consisting of square pixels. In principle, if the size of a pixel is considerably small compared with the size of the modulation display region, it will be possible to read the same information even when the wireless coordinate indicator is rotated in any way.

With reference to a flowchart shown in FIG. 51, the determination of active pixels which form the substantially concentrically circular pattern shown in FIG. 50 will be described.

Figure 51:
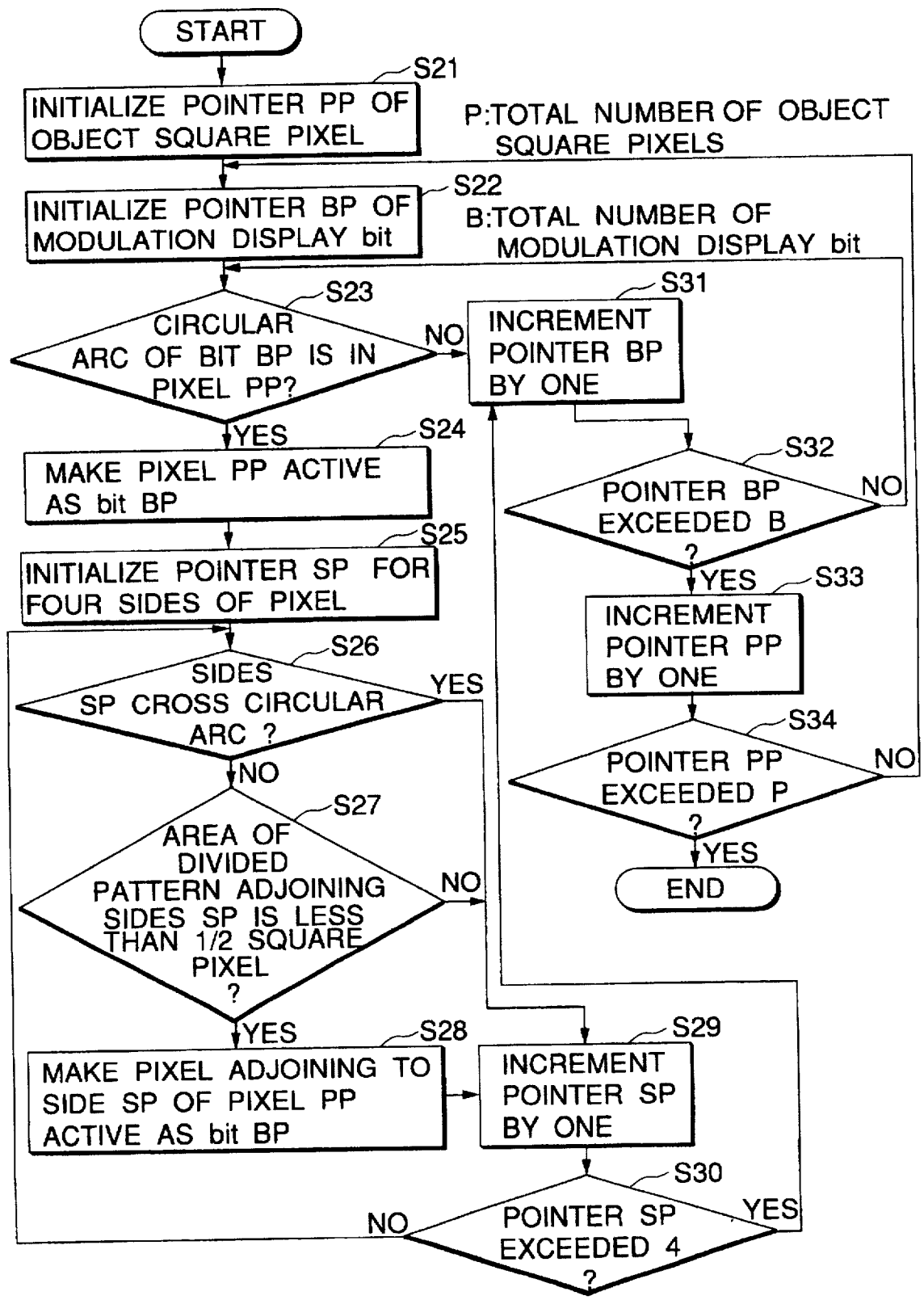
FIG. 51 is a flowchart showing procedures for deciding the active pixels arranged in a substantial concentric pattern as shown in FIG. 50.

In FIG. 51, a geometrically accurate concentric circle about the indicated coordinate PA is previously drawn in relation to bits aligned in a row. A point PP of a square pixel to be specified is initialized to 1 (step S21), and a pointer BP of the modulation display bit is initialized to 1 (step S22). It is judged whether or not a circular arc made of the bit BP designated by the pointer BP are present in a pixel PP designated by the pointer PP (step S23). If the circular arc made of the bit BP does not exist in the pixel PP, the processing proceeds to step S31, and the pointer BP is incremented by one.

On the other hand, if the circular arc made of the bit BP exists in the pixel PP in step S23, the pixel PP is activated as one pixel which represent the bit BP (step S24), and a pointer SP designating four sides of the pixel PP is initialized to 1 (step S25). It is then judged whether or not sides SP designated by the pointer SP cross the circular arc (step S26). If the sides SP cross the circular arc, the processing proceeds to step S29, and the pointer SP is incremented by one. However, if the sides SP do not cross the circular arc, the square pixel is divided into two patterns. The processing then proceeds to step S27, and it is judged whether or not the area of a divided pattern being in contact with the sides SP is less than half the area of the square pixel. If it is judged that the area of the pattern is not less than half the area of the square pixel, the processing proceeds to step S29, and the pointer SP is incremented by one. On the other hand, if it is judged that the area of the pattern is less than half the area of the square pixel, the only one pixel being in contact with the sides SP of the pixel PP is activated as the bit BP (step S28). The processing proceeds to step S29, and the pointer SP is incremented by one. After the completion of the processing in step S29, it is judged whether or not the pointer SP exceeded 4 (step S30). If the pointer SP did not exceed 4, the processing proceeds to step S26, and the previously mentioned processing is repeated. However, if the pointer SP exceeded 4, the processing proceeds to step S31, and the pointer BP is incremented by one. Thereafter, the processing proceeds to step S32.

In steps S32, it is judged whether or not the value of the pointer BP was in excess of a total number B of modulation display bits. If the value of the pointer BP was not in excess of the total bit number B, the processing proceeds to step S23, and the above mentioned processing is repeated. On the other hand, if the value of the pointer BP was in excess of the total bit number B, the pointer PP is incremented by one (step S33). It is further judged whether or not the value of the pointer PP was in excess of a total number P of square pixels to be specified (step S34). if the value of the pointer PP was not in excess of the total pixel number P, the processing proceeds to step S22, and the above mentioned processing is repeated. However, if the value of the pointer PP was in excess of the total pixel number P, the processing will be terminated.

As a result of this, the display region of active pixels in a substantially concentrically circular pattern as shown in FIG. 50 is determined. These active pixels are displayed in a modulated manner, and coded information is transmitted.

Figure 52:
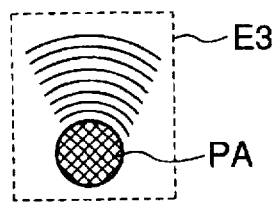
FIG. 52 is a schematic representation showing the case in which, of areas in a display region E2 which is substantially concentric and displayed in a modulated manner as shown in FIG. 49, only the area defined through a predetermined angle about a coordinate display point PA is taken as a display region E3.

FIG. 52 shows an example wherein only a predetermined region, which is defined through a predetermined angle about the indicated coordinate PA within the substantially concentric and modulatedly displayed region E2 shown in FIG. 49, is displayed as a display region E3 in a modulated way. In the example shown in FIG. 52, a display region for providing a modulated display is symmetrically defined in a fan shape through an angle of about 60 degrees about the indicated coordinate PA in the upward direction of the same. This pattern is determined on the assumption that the maximum rotational displacement occurring when the operator ordinarily operates the wireless coordinate indicator is about 60 degrees.

Figure 53:
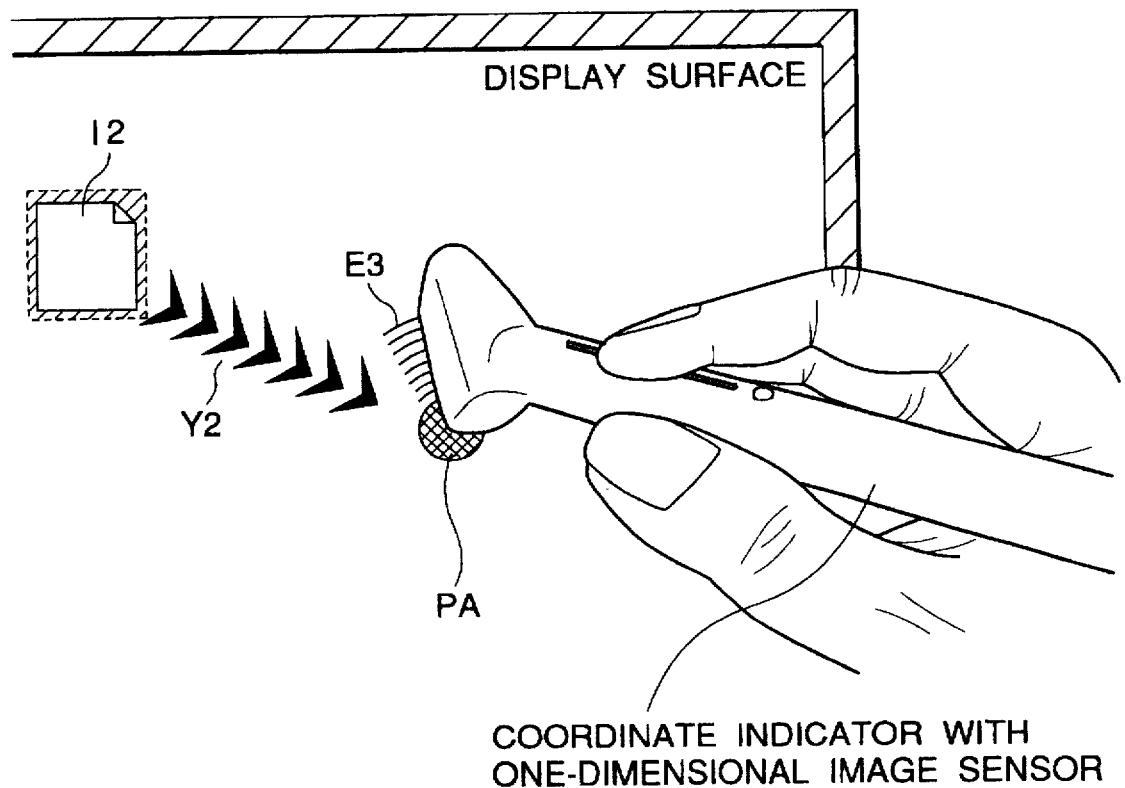
FIG. 53 is a schematic representation showing a situation in which information is read utilizing the modulation display region shown in FIG. 52.

FIG. 53 shows the reading of information when the modulated display region shown in FIG. 52 is employed.

By virtue of this modulated display region, it is possible to reduce transmission errors resulting from rotational displacements with smaller power consumption.

In the fourth embodiment, the position of the indicated coordinate PA is fixed in the display screen. However, this coordinate indication point may be moved together with the movement of the wireless coordinate indicator, and the display region for modulated display purposes may be also moved.

Figure 54:
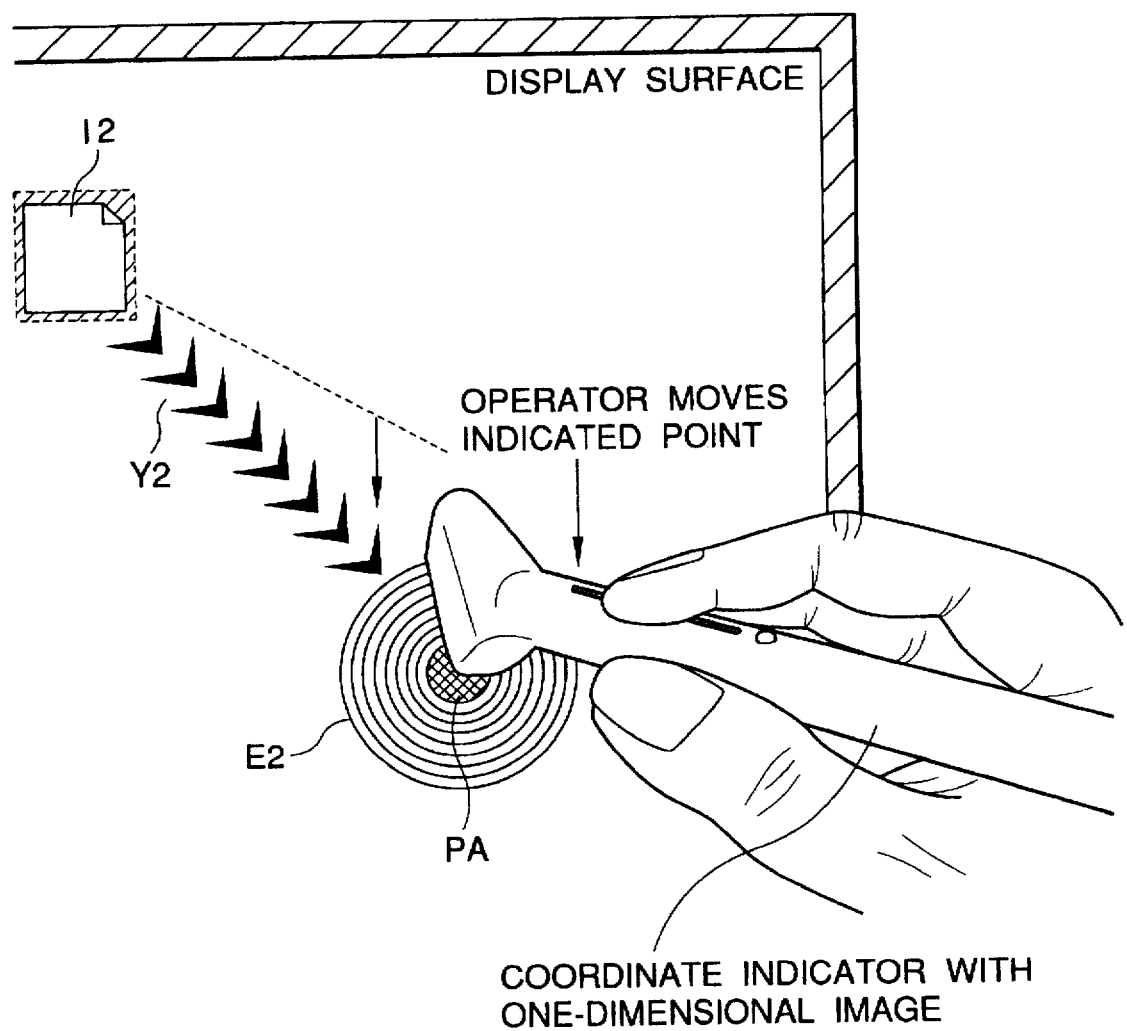
FIG. 54 is a schematic representation showing the state of a display screen when the wireless coordinate indicator, which is in the sate as shown in FIG. 49, is moved downwards.

FIG. 54 shows the display screen when the wireless coordinate indicator in the state shown in FIG. 49 is moved downward. As can be seen from FIG. 54, when the wireless coordinate indicator is moved downward, the information processing device simultaneously moves the indicated coordinate PA as well as the display region E2 for modulated display purposes. Further, the information processing device moves arrow Y2 designating a direction from a document icon I2, which stores information to be read, toward the indicated coordinate PA together with the movement of the wireless coordinate indicator. This arrow Y2 designates the direction from the icon I2 toward the indicated coordinate PA as well as a direction in which information is to be transmitted.

The display region E2 for modulated display purposes is moved together with the movement of the indicated coordinate PA. As a result of this, where the amount of coded information to be transmitted is massive, it is not necessary for the operator to stationarily hold the wireless coordinate indicator at the fixed position, thereby mitigating operator's burden. In this case, it is possible for the operator to transmit coded information by moving the indicated coordinate to an arbitrary position on the display screen. As a matter of course, this is applicable to the case where coded information is being transmitted.

A fifth embodiment of the present invention will be described. This fifth embodiment is characterized in that the active pixels are specified in such a way that the display modulation density of the display screen of the information processing device becomes maximum in order to transmit coded information as rapid as possible.

Specifically, the active pixels are specified, in such a way that the display modulation density of the display screen becomes maximum, by modulatedly displaying each information bit using two pixel widths, and by providing a non-modulated area having a one pixel width between modulated displays. Usually, the positional relationship between the indicated coordinate and the one-dimensional sensor of the wireless coordinate indicator is structurally fixed, and this relationship is substantially constant. However, the information processing device have position detection errors and quantization errors which occur when pixels to be modulatedly displayed are determined. Hence, composite errors mainly comprising these two errors superimposed one over the other arise in the one-dimensional image sensor of the wireless coordinate indicator and pixels to be modulatedly displayed. If the image sensor and the pixels are corrected at this time, the position detection error is usually reduced to ±0.1 mm or less. However, the quantization error is a maximum of ±0.5 pixel pitch, and it has no room for improvement. In the case of a liquid crystal display, the position detection error is usually ±0.1 mm or more. So long as the active pixels are specified in the display section of the information processing device based on these facts, it is possible to inevitably detect a modulated display at the enter of error widths occurring as a result of the superimposition of errors on each other, in other words, a position relatively defined by the indicated coordinate on the assumption that there are no errors. More specifically, it is possible to detect a display only by the use of one sensor located at a unique position in the one-dimensional image sensor which is defined with respect to each information bit.

In addition to the reflection type electromagnetic coupling method as shown in FIG. 31, the coordinate indication method comprises several other methods.

Figure 55A:
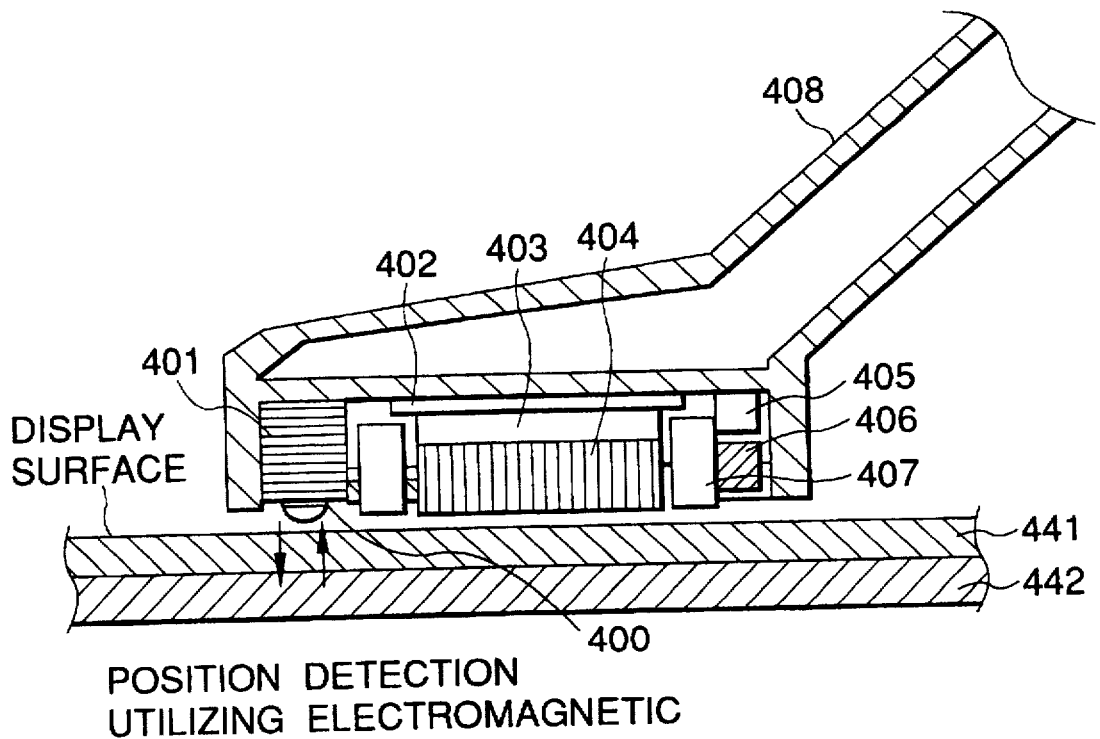
FIGS. 55(a) and 55(b) are cross-sectional views showing the structure of the wireless coordinate indicator around a one-dimensional image sensor thereof.
Figure 55B:
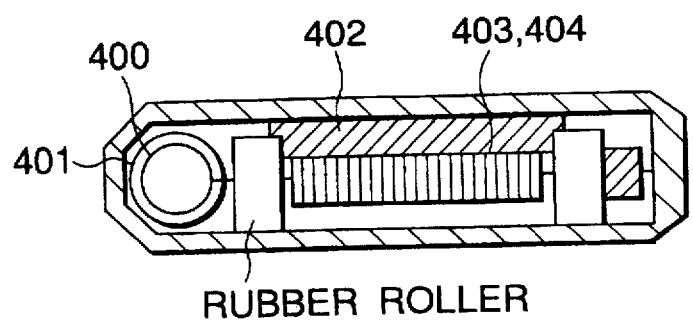

FIGS. 55a and 55b are schematic representations showing the structure of a part of the wireless coordinate indicator, which is the same as that shown in FIG. 31, around the one-dimensional image sensor. FIG. 55a is a side cross-sectional view of the one-dimensional image sensor and an associated area, and FIG. 55b is a cross-sectional plan view of the same. FIGS. 55a and 55b show the indication of a coordinate utilizing the reflection type electromagnetic coupling method, and position detection is effected by means of electromagnetic induction.

In FIGS. 55a and 55b, a magnetic core 400 vertically slides, and the magnetic core 400, a coil 401, and a capacitor (not shown) constitutes a resonance circuit. Pressing the wireless coordinate indicator against the display screen of a display section 441 causes the magnetic core 400 to slide, which in turn shifts the resonance frequency of the resonance circuit. This variation in the resonance frequency is detected by the information processing device by way of a coordinate position detection section 442. In the detection of an indicated coordinate, two adjacent ranges from which the most intensive electromagnetic signal is reflected are picked up, and an accurate position is obtained from a difference between the intensity of the two ranges. In FIGS. 55a and 55b, the coordinate position detection section 442 is disposed below the display section 441.

Figure 56:
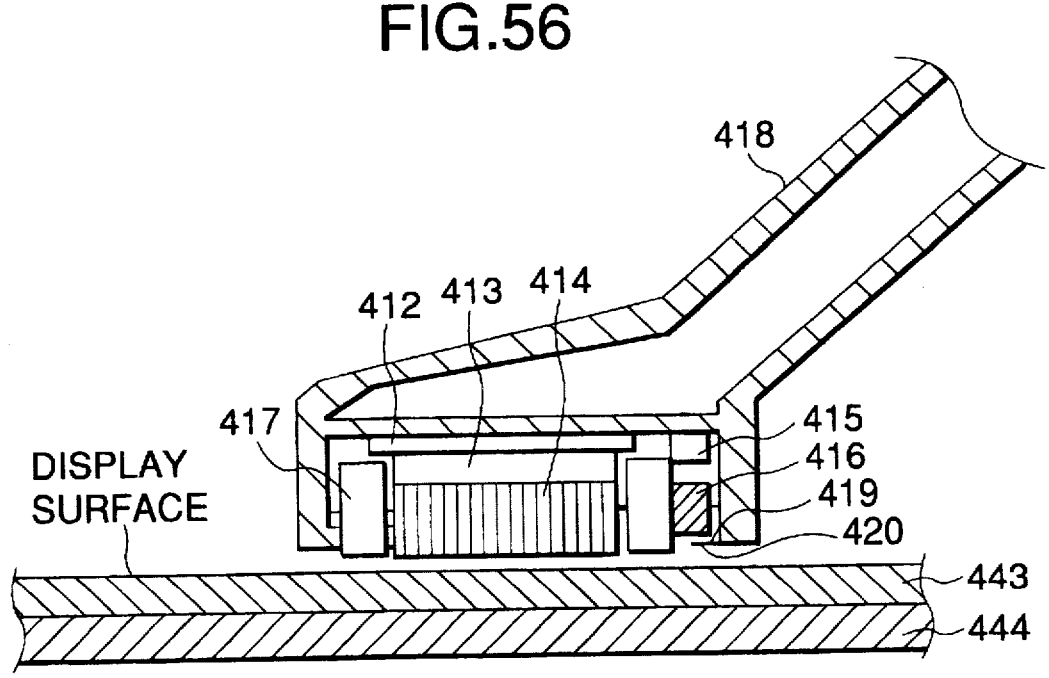
FIG. 56 is a cross-sectional view showing the structure of a pressure-sensitive wireless coordinate indicator around a one-dimensional image sensor thereof.

FIG. 56 shows the structure of a one-dimensional image sensor of a pressure-sensitive wireless coordinate indicator and an associated area thereof. In this pressure sensitive coordinate indicator, a projection of a pressure sensing coordinate indication end 420 provided below the end of a leaf spring 419. When the wireless coordinate indicator is pressed against a pressure sensing coordinate indication section 443 of the information processing device, a predetermined pressure is applied to the pressure sensing coordinate detection section 443 with a predetermined magnitude, whereby the position of the coordinate is detected. The pressure sensing coordinate detection section 443 is made of transparent material and is designed to permit the operator to visually observe a display of a display section 444.

Figure 57:
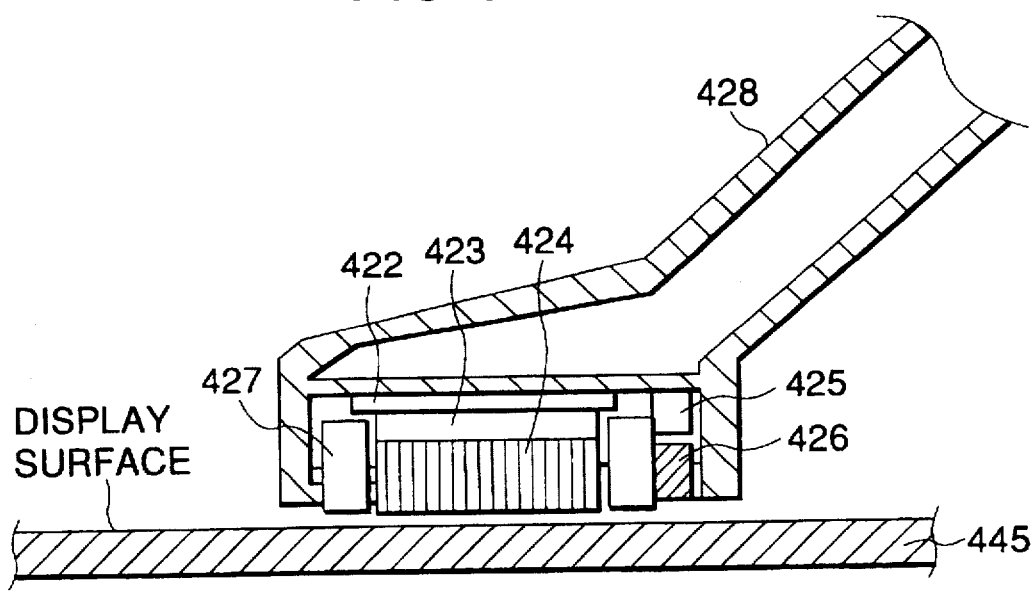
FIG. 57 is a cross-sectional view showing the structure of an optically coupled wireless coordinate indictor around a one-dimensional image sensor thereof.

FIG. 57 is a schematic representation showing the structure of a one-dimensional image sensor of an optically coupled type wireless coordinate indicator and an associated area thereof. The information processing device uses a display/detection section 445 having an optically coupled coordinate detection function and a display function. In other words, display/detection section 445 is made of a photosensitive element formed over a semiconductor formed surface of an active matrix liquid crystal display. In the indication of a coordinate according to an optically coupled method, a rubber roller 427 is pressed against the display screen, and a part of an LED array 422 emits light for a predetermined period of time when a small amount of movement is detected. The intensity of the emitted light is measured by photosensitive elements which are two dimensionally aligned, and the position of the coordinate is detected based on the thus obtained intensity.

The indication of a coordinate position and the detection of the coordinate position based on this indication are carried out by combination of these various types of coordinate indication method and coordinate position detection method.

The relationship between the indicated coordinate and the active pixels which effect modulated display will be described.

Figure 58:
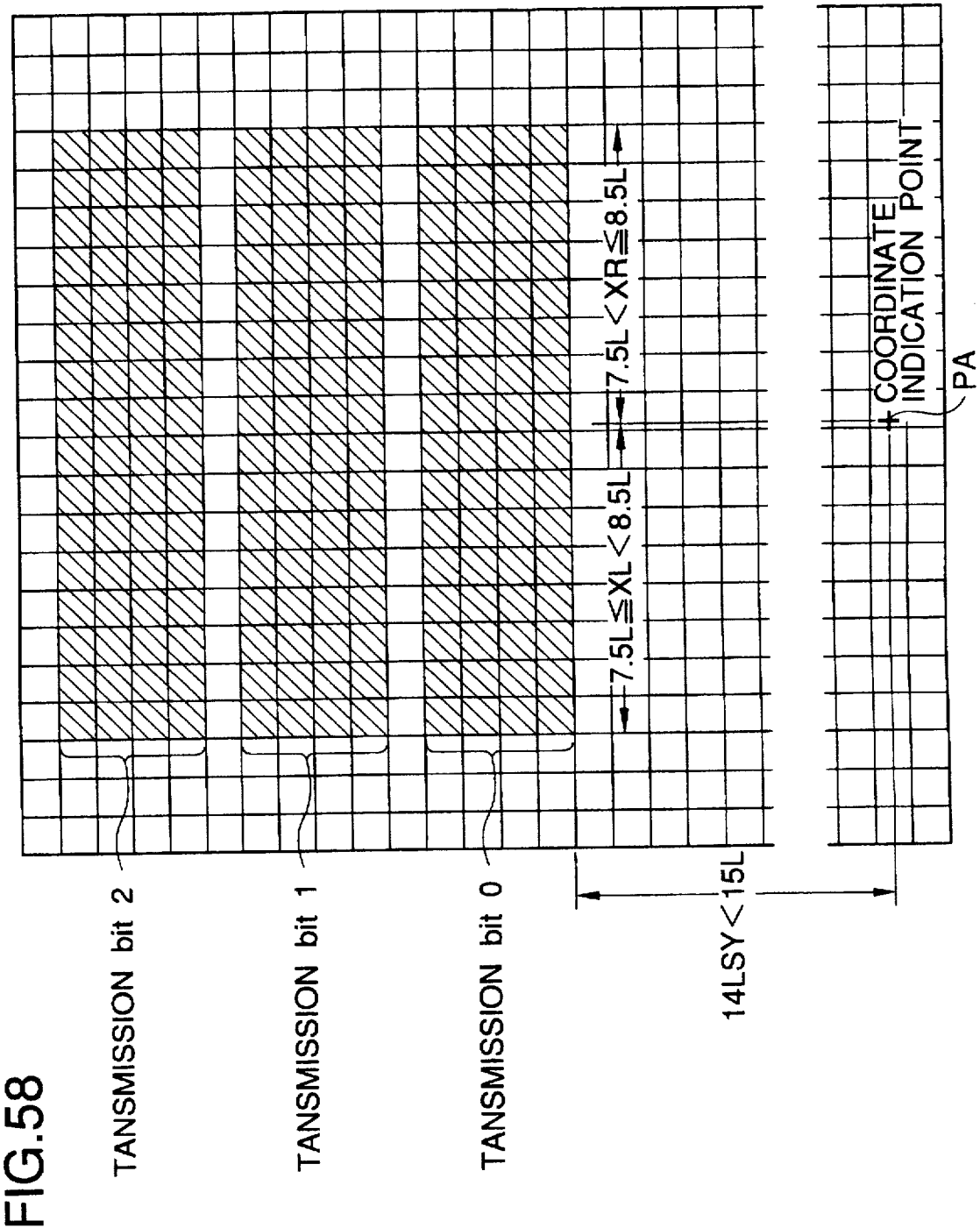
FIG. 58 is a matrix showing the relationship between coordinate indicating points and active pixels.

FIG. 58 is a diagram showing the relationship between an indicated coordinate and active pixels. As shown in, for example, FIG. 56, this description is based on the assumption that the one-dimensional image sensor is located away from the indicated coordinate. Further, assume that the distance between the indicated coordinate and the position where an image is readable is previously set and recognized by the wireless coordinate indicator and the information processing device.

In FIG. 58, the length of one side of each square pixel in the display section is designated by L and is set to 0.2 mm. Based on the detected and calculated indicated coordinate, the information processing device sets pixels aligned along a line in the Y-axis direction defined by $14L \leq Y < 15L$ as the lowermost end. The information processing device then sets pixels aligned in a line in the X-axis direction defined by $7.5L < XR \leq 8.5L$ as the leftmost end. The information processing device sets a region having a width of four pixels in the Y-axis direction as active pixels which are displayed in a modulated manner associated with a transmitted bit 0. Similarly, active and inactive pixels are alternatively and repeatedly arranged with respect to the other transmission bits.

In FIG. 58, four active pixels are arranged in the Y-axis direction for each transmission bit, and a line of inactive pixels are arranged between transmission bits. FIG. 58 shows one example of the arrangement of the active pixels and the inactive pixels. The number of active pixels and the number of inactive pixels are set to optimum values.

Figure 59:
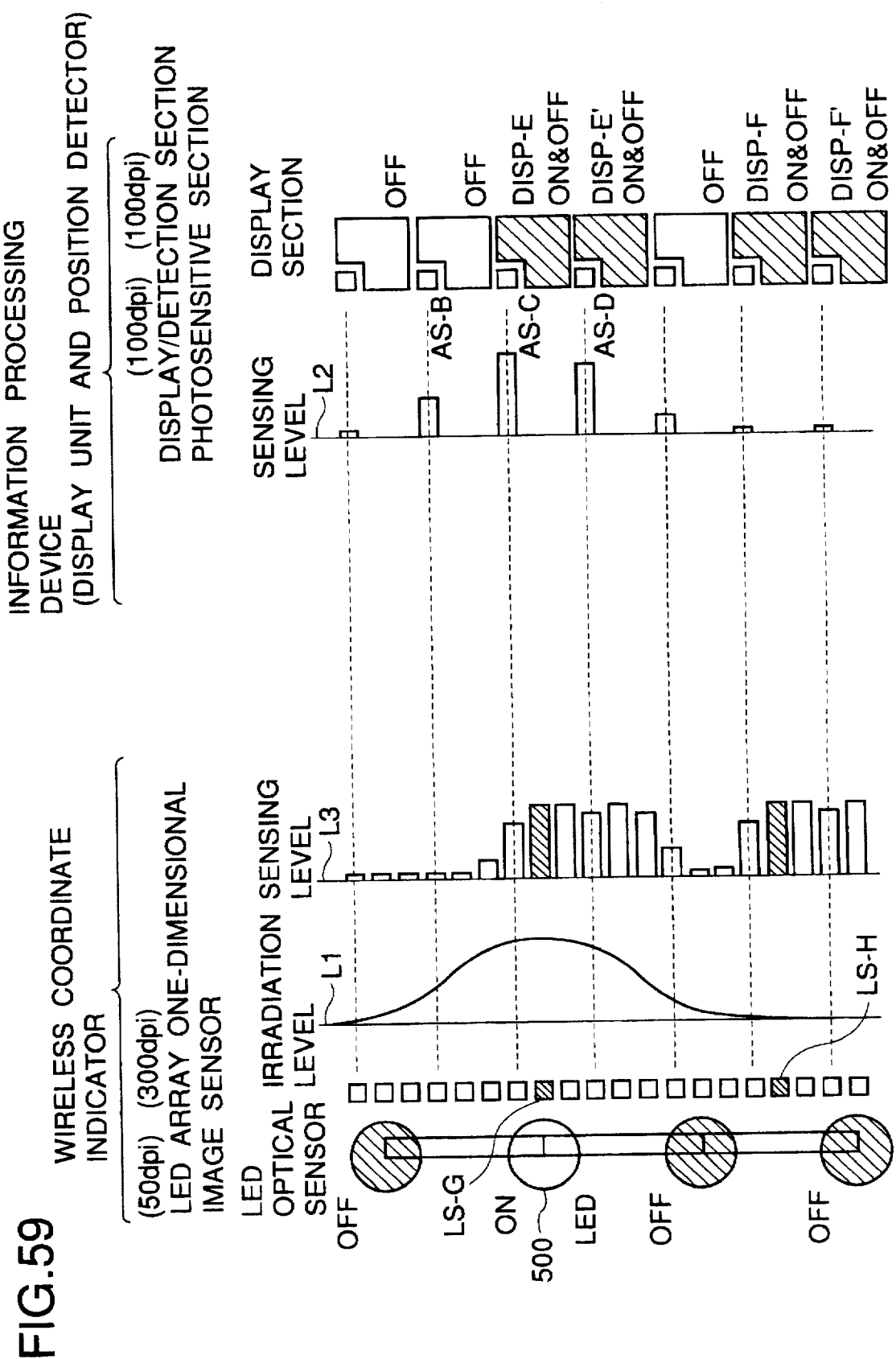
FIG. 59 is a diagram showing the transmission and detection of a signal transmitted between the optically coupled wireless coordinate indicator and the information processing device.
Figure 60A:
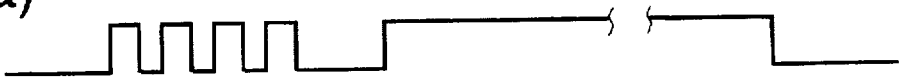
FIG. 60 is a timing chart showing the transmitted states of signals of an LED 500 which serve as the reference in an optically coupled method, other LEDs, active pixels, and inactive pixels.
Figure 60B:
Figure 60C:
Figure 60D:

With reference to FIGS. 59 and 60, the relationship between the indication of a coordinate and the detection of the coordinate using an optically coupled method will now be described. FIG. 59 is a schematic representation showing transmission/detection statuses of a signal transmitted between the wireless coordinate indicator and the information processing device according to the optically coupled method. Assume that constituent elements (LEDs, optical sensors, sensitive elements) in line with the longitudinal axis of constituents (the LED array 442, the one-dimensional image sensor 423, the display/detection section 445) are opposite with each other. In FIG. 59, the arrangement of an LED, an active state of the LED, the arrangement of a photosensor, an irradiation level L1 of the LED, and an sensing level L3 of the photosensor are shown, in that order from the left of the drawing, in the wireless coordinate indicator side. In the same drawing, a optical sensing level L2 of a photosensitive section of the optical element, the arrangement of the photosensitive section, the arrangement of the display/detection section, and an active state of the display/detection section are shown, in that order from the left of the drawing, in the information processing device side.

FIGS. 60a to 60d are timing charts showing the states of transmission of signals in an LED 500 which serves as the reference of an optically coupled method, other LEDs, active pixels, and inactive pixels.

To indicate a coordinate, the wireless coordinate indicator blinks the LED 500 at predetermined intervals as an optical signal for use in positioning. This operation corresponds to the leading half portion of the chart of FIG. 60a. The level of radiation when the LED is blinked is shown as the irradiation level L1. This irradiation level shows a symmetrical distribution (Gaussian distribution) with gentle slops on both sides in relation to the position of the LED 500.

When the photosensitive section of the information processing device detects the radiation of the LED 500, the optical sensing level L2 is obtained. This sensing level L2 is obtained by sampling the value of the irradiation level L1. The information processing device makes display pixels DISPE 15 and DISPE', which are closest to the two adjacent areas of the optical sensing level L2 showing the maximum intensity, active with respect to a bit 0. The infcrmation processing device also renders one of display pixels adjoining to the two pixels inactive. The information processing device further renders adjacent two display pixels DISPF and DISPF', which are next to the inactive pixel, active with respect to a bit 1. Similarly, a necessary number of sets of two active pixels and one inactive pixel are alternatively set and disposed. Upon receipt of the first optical signal for coordinate indication purposes from the LED 500, the information processing device illuminates the active display pixels in response to the value of an associated information bit after the passage of a predetermined period of time. Thereafter, the values of words are updated and output every predetermined period of time. The modulated display is terminated when a predetermined amount of output is produced.

After the first optical signal for coordinate indication purposes has been output from the LED 500, the wireless coordinate indicator illuminates all of the LEDs in the LED array to light up the opposed display screen at the moment at which a predetermined period of time passed. The period of the illumination of the LEDs, at this time, is set slightly longer than a period of modulated indication. The modulated indication is detected by the optical sensor (a one-dimensional image sensor) of the wireless coordinate indicator. A resultant sensing level is L3. The wireless coordinate indicator does not process sensing levels obtained from all of the optical sensors, but detects the level of modulated indication using an optical sensor LSG closest to the LED 500 for position sensing and an optical sensor LSH spaced three pixels away from the optical sensor LSG. The level detected by these optical sensors is converted into binary data.

During the decision of the active pixels based on the LED 500, the wireless coordinate indicator is basically presumed to be stationary. However, position detection is carried out as required, and therefore the period of time during which the wireless coordinate indicator is presumed to be stationary is very short, which does not substantially affect the processing time.

In this way, in the fifth embodiment, since the width of display pixel for modulation display is set to the width of two rows of pixels, it is possible to inevitably detect an active display of an associated bit at a measuring point fixed by the wireless coordinate indicator without the need of rigid position detection processing. Further, a line of pixels are provided as an inactive area, and therefore it is possible to suppress cross talk between adjacent bits even if the sensing level of an active display is low. In this embodiment, analog processing is unnecessary, and it is possible to convert detected information into binary data immediately. Hence, it is possible to attain improved processing speed and reduced power consumption.

A sixth embodiment of the present invention will be described.

The sixth embodiment is intended to facilitate the indication of a coordinate when a coordinate is indicated by a one-dimensional image sensor of a wireless coordinate indicator. In other words, this embodiment is intended to separate a coordinate point physically indicated by the wireless coordinate indicator and a logically indicated coordinate point from each other.

FIG. 61 is a schematic representation showing operation required to transmit document information from the information processing device to the wireless coordinate indicator and the state of indication at that time. In FIG. 61, a window W4 having a document which begins with "Dear John," is opened in the display screen of the information processing device. When document information held in this window W4 is copied to the wireless coordinate indicator, the operator indicates a coordinate using the one-dimensional image sensor of the wireless coordinate indicator, whereby an edit menu m1 of main menus is selectively instructed. In response to this selection, a pull-down menu m2 is displayed. The operator further selects a "copy" menu m3 from the pull-down menu m2 using the wireless coordinate indicator. As a result of this, a frame E4 for outputting information is displayed at an upper right area in the currently active window W4. The operator aligns the coordinate indicating point of the wireless coordinate indicator to an indicated coordinate in the frame and also to a substantially concentric modulated display, whereby the transmission of information is started.

As shown in FIG. 62, the tip end of the one-dimensional image sensor of the wireless coordinate indicator is thick, and therefore it is not easy to align the indicated coordinate PA into the menu display. In the sixth embodiment, as shown in FIG. 63, a coordinate point Pα physically indicated by the wireless coordinate indicator and a coordinate indicate point Pβ logically indicated by the information processing device are displayed separately from each other.

Figure 64:
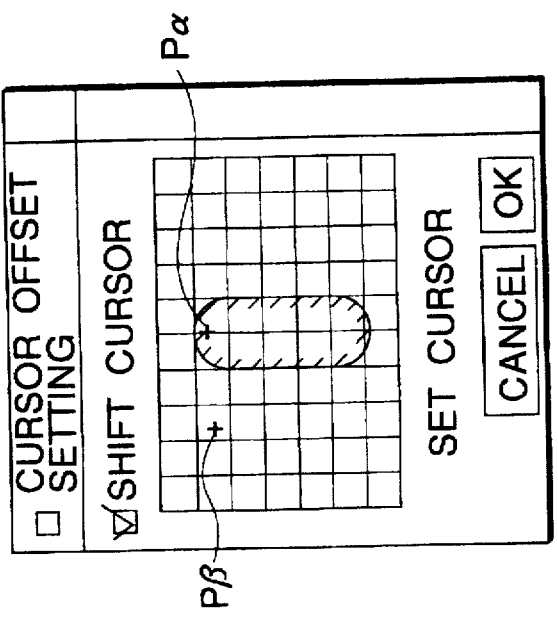
FIG. 64 is a schematic representation showing the offset relationship between the physical coordinate indicating point and the logical coordinate indicating point.

The relationship between the physically indicated coordinate Pα and the logically indicated coordinate Pβ, i.e., an offset relationship can be previously set, and this relationship can be changed as required. FIG. 64 shows a screen for setting this offset relationship. The use of this application screen allows the offset relationship to be set or changed as required.

Figure 65:
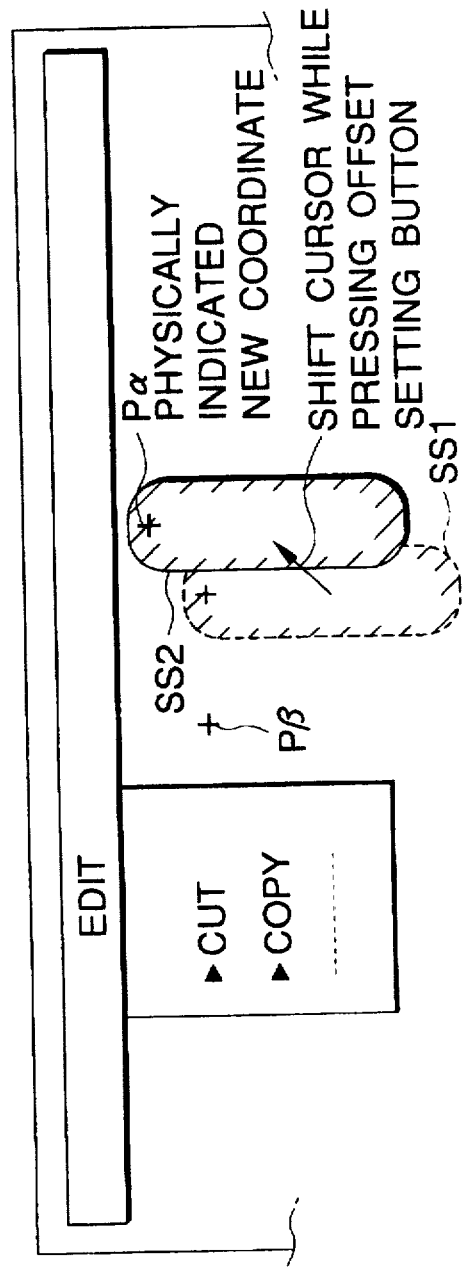
FIG. 65 is a schematic representation showing the modified offset relationship between the physical coordinate indicating point and the logical coordinate indicating point.

FIG. 65 shows the offset relationship when it is set or changed. While pressing an offset set button (not shown) of the wireless coordinate indicator, the operator moves the wireless coordinate indicator to a desired position. When the wireless coordinate indicator comes to the desired position, the operator releases the offset set button, as a result of which a new offset relationship is set. While the offset set button is being pressed, the logically indicated coordinate Pβ is fixed, but the physically indicated coordinate Pα moves. Based on this relative positional relationship between the logically indicated coordinate Pβ and the physically indicated coordinate Pα, the amount of new offset is set or the amount of offset is changed.

Figure 66:
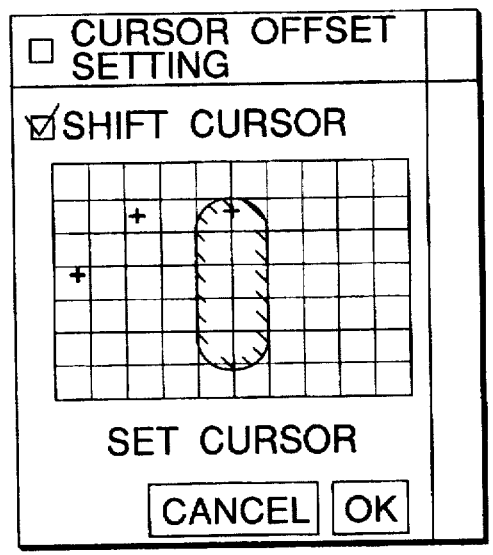
FIG. 66 is a schematic representation showing an offset setting window.

In this case, it is not necessary to execute offset setting by opening an offset setting window. If an offset setting window shown in FIG. 66 is opened, it becomes possible to check the change of the offset relationship set in FIG. 64 to an offset relationship shown in FIG. 66.

If the operator wants to indicate a coordinate indicating point in the periphery of the display section as shown in FIG. 67a, it may become impossible for the operator to select an icon in the peripheral region depending on the offset relationship. To prevent this, in the sixth embodiment, as the coordinate indicating point comes closer to the peripheral region of the display section, another offset relationship is set according to a preset rule, whereby a logically indicated coordinate Pβ1 can shift to a newly logically indicated coordinate Pβ2.

Figure 68:
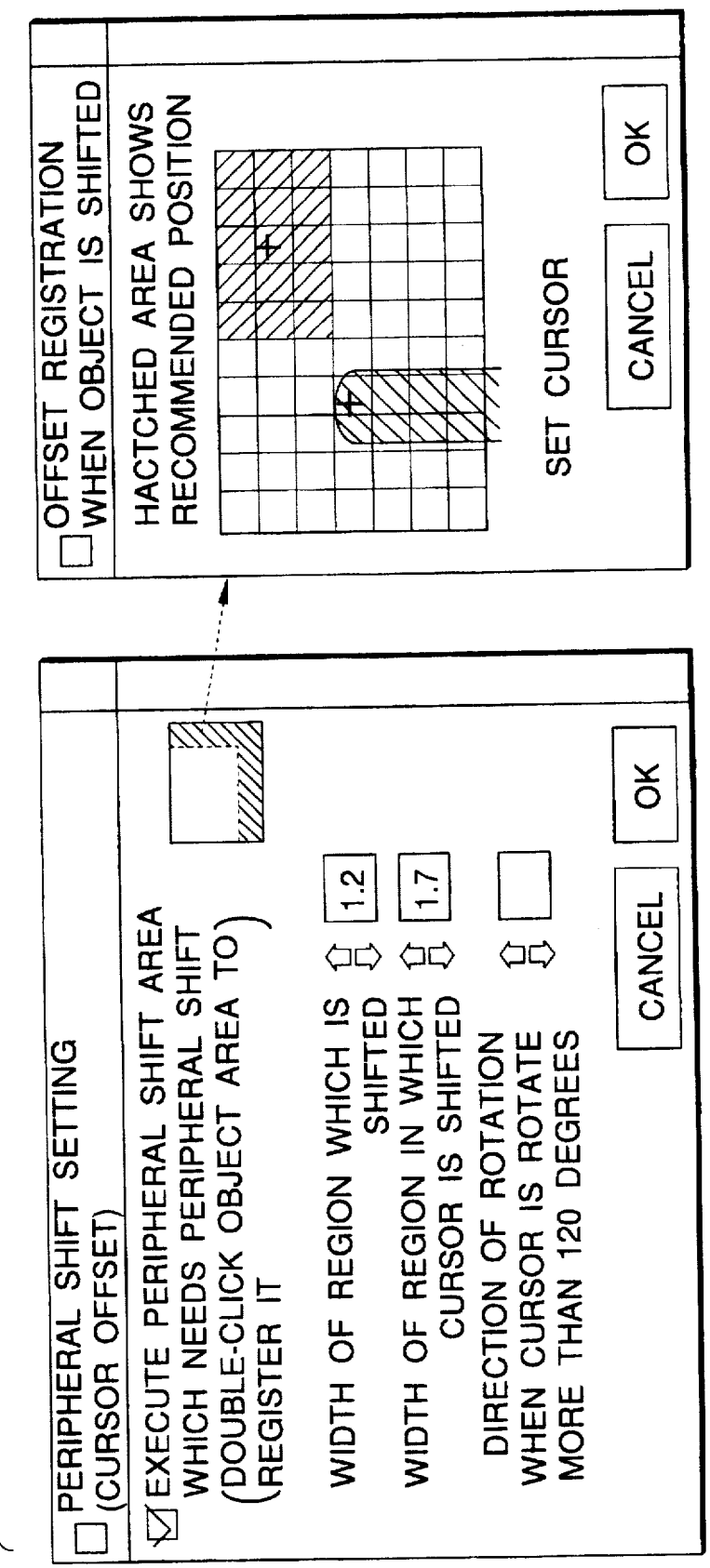
FIG. 68 is a schematic representation showing a peripheral shift setting window.

FIG. 68 shows a peripheral shift setting window. By virtue of this peripheral shift setting window, it is possible to register the on/off of peripheral shift, an offset at the time of the shift of a coordinate, the width of a region which is shifted, the width of a region in which the coordinate is shifted, and the direction of rotation of a coordinate indicating point when the angle of rotation of the coordinate indicating point is in excess of 120 degrees.

Figure 69A:
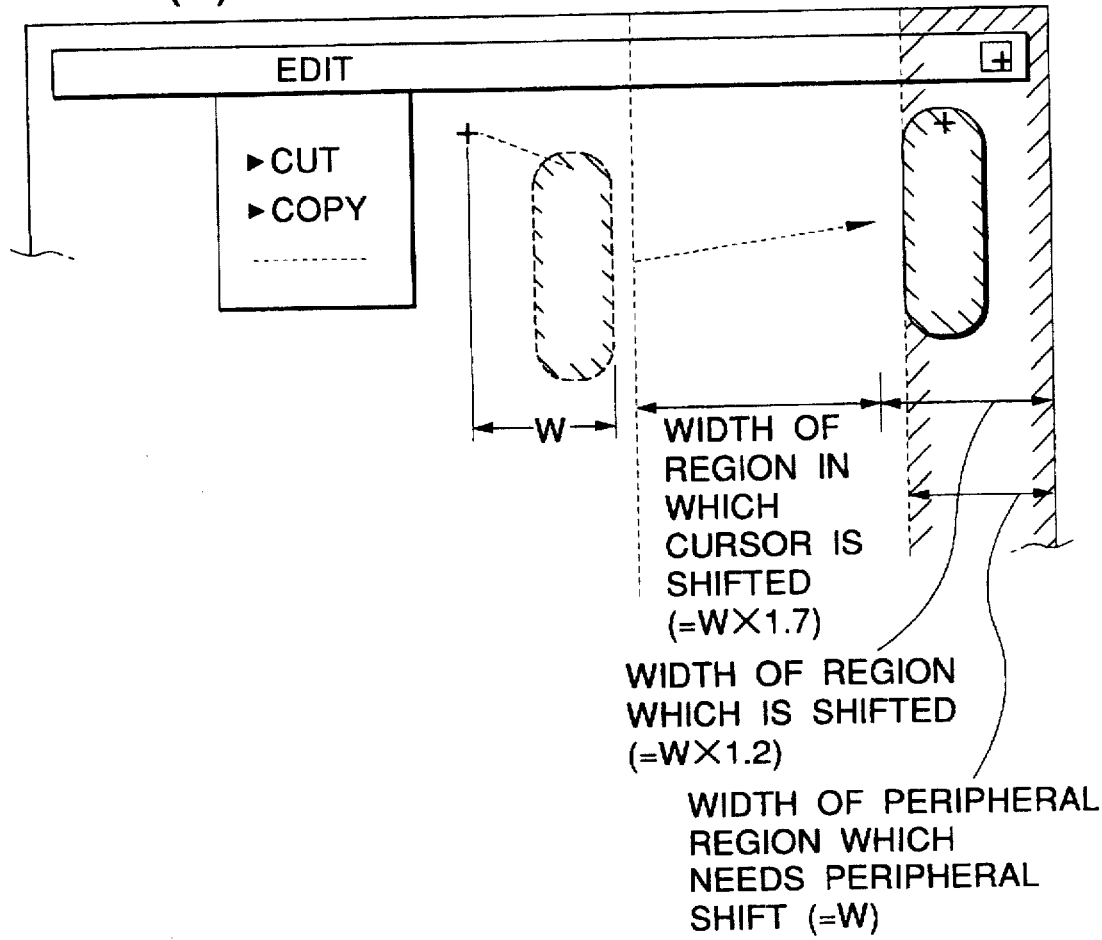
Figure 69B:
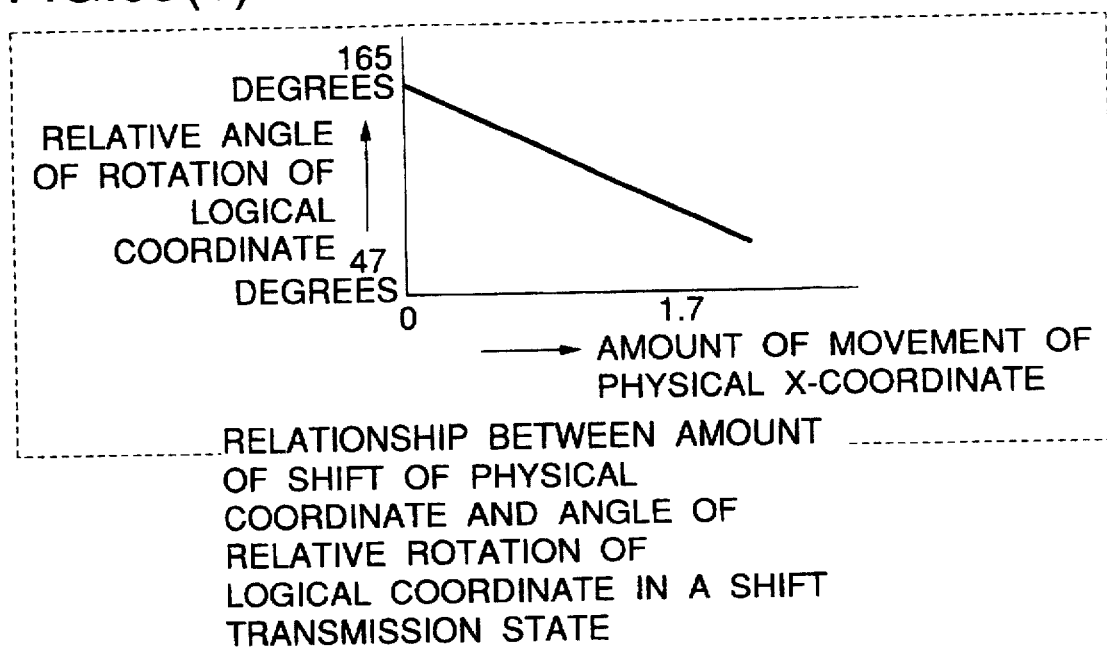

FIGS. 69a to 69c are schematic representations represent the meanings of values set by the use of the peripheral shift setting window. The width of a region which is shifted is set to 1.2 times an offset width W. The width of a region in which the coordinate is shifted is set to 1.7 times the offset width W. The direction of rotation of the coordinate indicating point when the angle of rotation of the coordinate indicating point is in excess of 120 degrees is set to a clockwise direction. Accordingly, if the angle of rotation of the coordinate indicating point is in excess of 120 degrees, the coordinate indicating point rotates clockwise as shown in an upper right part of FIG. 69c. The ordinary offset relationship shifts in accordance with the amount of movement of a physically indicated X coordinate, thereby resulting in a new offset relationship.

The above explanation was given of the shift of the coordinate indicating point in the X-axis direction. However, even in the case of the shift of the coordinate indicating point in the Y-axis direction, the coordinate indicating point can be similarly shifted.

In the above embodiments, only one coordinate indicating point is used. However, a plurality of coordinate indicating points may also be used.

Figure 70:
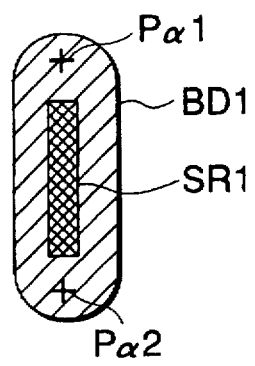
FIGS. 70(a1), 70(a2), 70(b1), and 70(b2) are schematic representations showing the positions of coordinate indicating points of the wireless coordinate indicator when two coordinate indicating points are provided, and the positional relationship between a modulation display region and coordinate indicating points in the information processing device.
Figure 70:
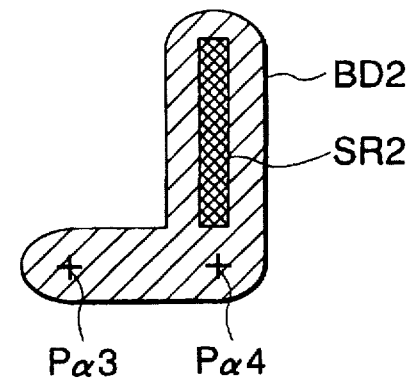
Figure 70:
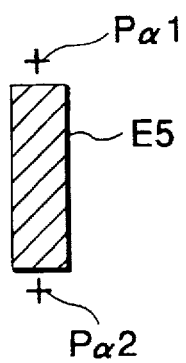
Figure 70:
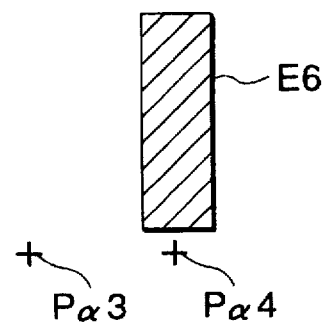

FIGS. 70(a1), 70(a2), 70(b1), and 70(b2) show the positional relationship between the coordinate indicating point of the wireless coordinate indicator, the modulated display region of the information processing device, and the coordinate indicating point. In FIG. 70(a1), the wireless coordinate indicator has two signal generation sections for generating signals which represent the positions of the signal generation sections. A one-dimensional image sensor SR1 is disposed in line with a line between two coordinate indicating points Pα1 and Pα2 designated by the two signal generation sections. When the two coordinate indicating points Pα1 and Pα2 are indicated by means of the wireless coordinate indicator as shown in FIG. 70(a2), the information processing device sets a modulation display region E5 associated with the one-dimensional image sensor SR1 based on these two coordinate indicating points Pα1 and Pα2. BD1 shows the outline of the wireless coordinate indicator.

As with the wireless coordinate indicator shown in FIG. 70(a1), a wireless coordinate indicator shown in FIG. 70(b1)

also has two signal generation sections which generate signals representing the positions of the signal generation sections. A one-dimensional image sensor SR2 is disposed in line with a line passing through a coordinate indicating point Pα4 and crossing at right angles to a line connecting between two coordinate indicating points Pα3 and Pα4 indicated by the two signal generation sections. When the two coordinate indicating points Pα3 and Pα4 are indicated by means of the wireless coordinate indicator as shown in FIG. 70(b2), the information processing device sets a modulation display region E6 associated with the one-dimensional image sensor SR2 based on the two coordinate indicating points Pα3 and Pα4. Here, BD2 designates the outline of the wireless coordinate indicator.

As previously mentioned, the physically indicated coordinate and the logically indicated coordinate may be display separately from each other.

A seventh embodiment of the present invention will be described.

In the seventh embodiment, the fact that the indicated coordinate is an exit for information is notified by the contents and motion of displayed images in the display section.

Figure 71:
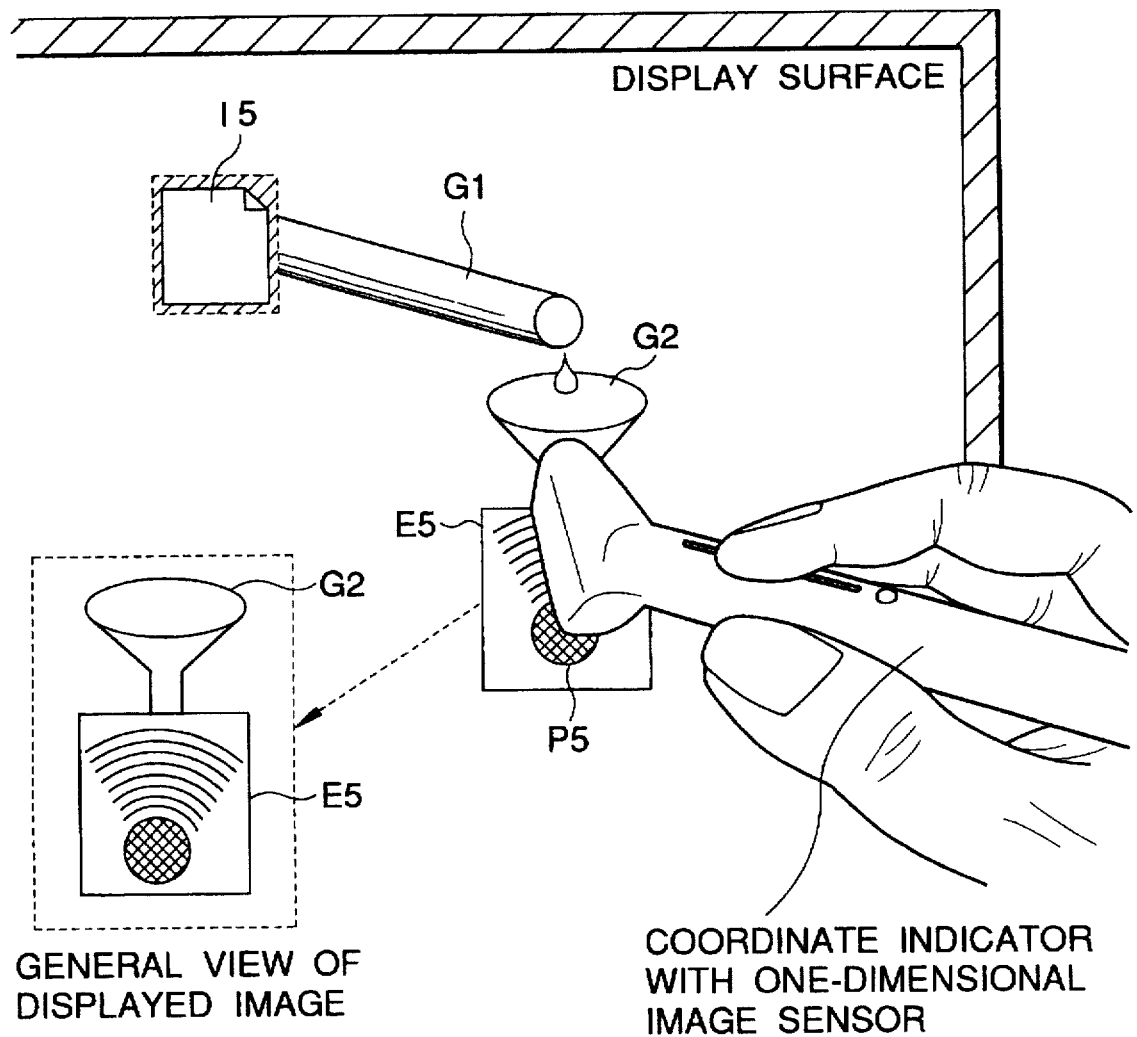
FIG. 71 is a schematic representation illustrating one example of a display which shows a coordinate indicating point serving as an exit for information.

For example, as shown in FIG. 71, the operator associates a water droplet or a pipe and funnel with the flow of water and the direction of the flow. As a result of this, the operator can realize that information is being output from the icon relevant to the information output source of the information processing device to the wireless coordinate indicator. In this case, the funnel is displayed so as to be relatively fixed to the upper end of a frame of the coordinate indicating point. The pipe moves to follow the funnel as the coordinate indicating point is moved. Another combination of icons such as a faucet and bucket or a gun and target may be similarly used. in this way, an image representing physical phenomenon or tools used in human life is employed to make the operator realize that the coordinate indicating point serves as an exit for information.

Figure 72:
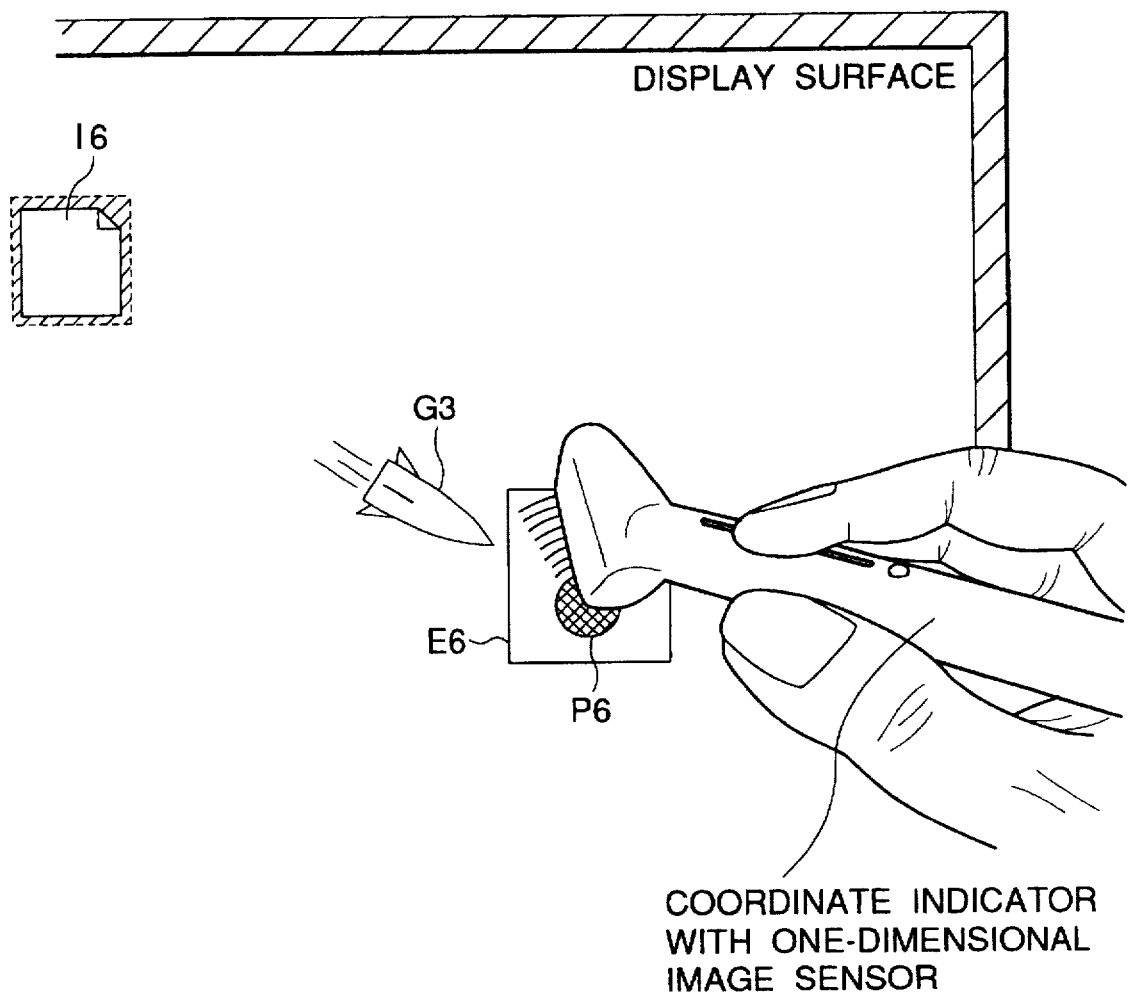
FIG. 72 is a schematic representation illustrating one example of a display which shows a coordinate indicating point serving as an exit for information.

Further, a rocket icon shown in FIG. 72 is associated with the movement of an object, and the operator can realize that the coordinate indicating point is an exit for information from the direction of the rocket icon. As a matter of courser the icon is not limited to a rocket but may be replaced with another image like sparrow. The contents of the image make the operator aware of the fact that the coordinate indicating point is an exit for information.

Figure 73:
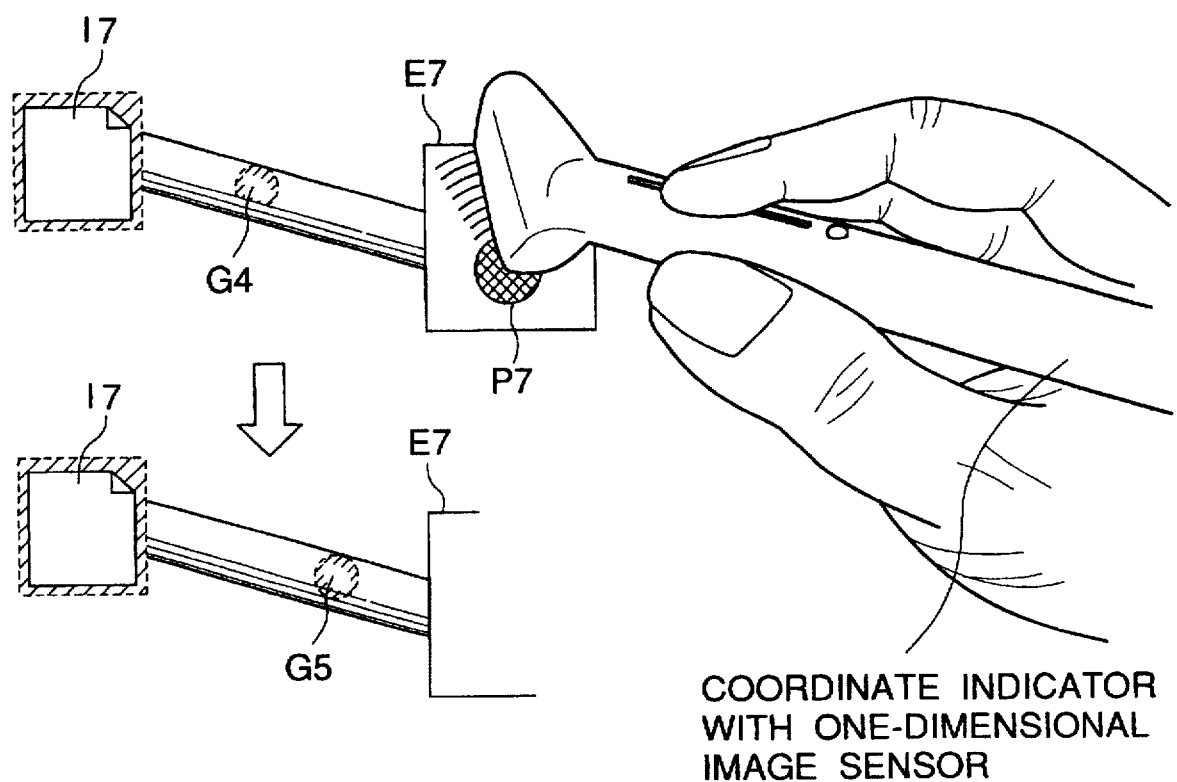
FIG. 73 is a schematic representation illustrating one example of a display which shows a coordinate indicating point serving as an exit for information.

FIG. 73 shows an example of a display in which the movement of a displayed image makes the operator aware of the fact that the coordinate indicating point is an exit for information. In FIG. 73, a pipe and round shadow in that pipe are shown in this drawing. This round shadow moves toward the coordinate indicating point as information is transmitted. The movement of this round shadow suggests that the coordinate indicating point is an exit for information. Such movement may be obtained by the use of other icons such as a belt conveyor and a package, a base ball, or marching ants.

Further, the contents of the icons shown in FIGS. 71 and 72 and the movement of the icon shown in FIG. 73 may be combined together. For example, the rocket shown in FIG. 72 is positioned in the vicinity of a selected icon when the disclosure of information output is started. As the output of information progresses, the rocket is moved to the coordinate indicating point. When the output of information is finished, the rocket arrives at the coordinate indicating point. As a result of this, the operator can know the state of the transmission of information. Moreover, the volume of water flowing through the pipe shown in FIG. 71 may be reduced as the transmission of information progresses.

This seventh embodiment is designed to display an exit for information. However, such a display is easily applicable to the display of bidirectional transmission.

In this way, in the seventh embodiment, the use of a displayed image allows the operator to intuitively understand an exit for information.

An eighth embodiment of this invention will be described.

This eighth embodiment is intended to improve drive duty and rate of transmission of information by the use of a display device which possesses properties like memory and is driven by a simple matrix method, and by limiting the shape of the display modulation range to a rectangular shape.

Figure 74A:
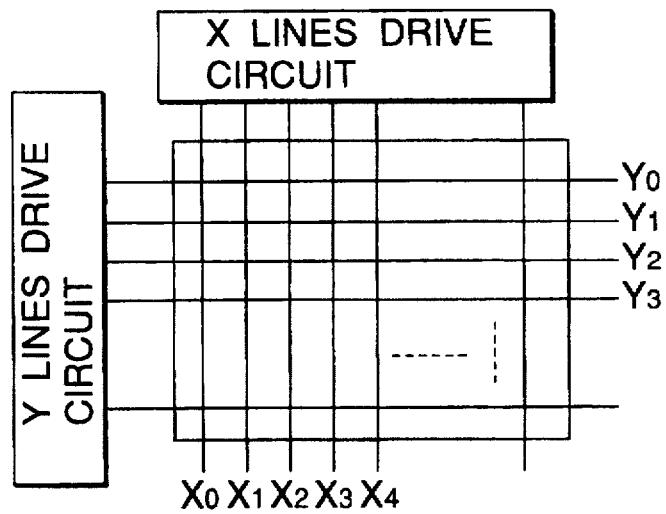
FIGS. 74(a) and 74(b) are schematic representations showing the configuration of a simple matrix drive display, and signals usually applied to this display.
Figure 74B:
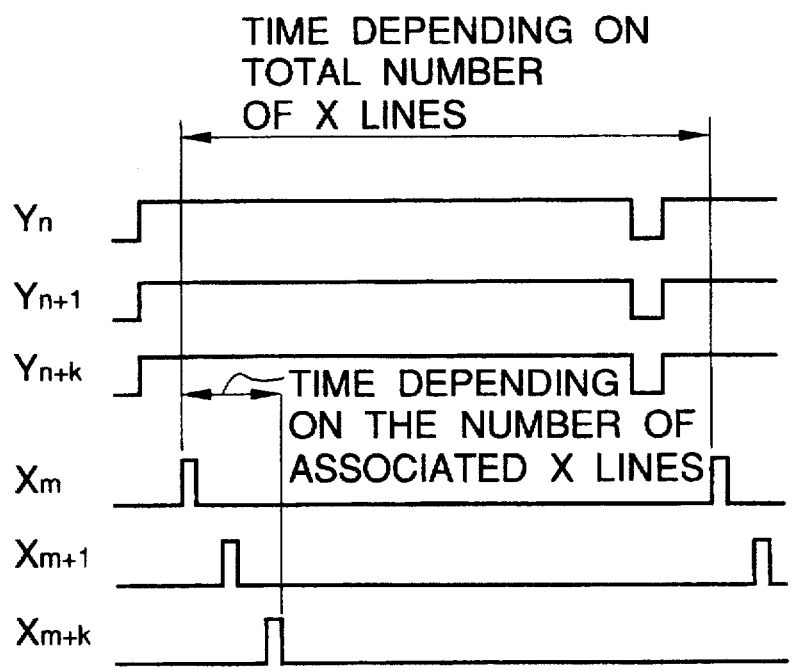

FIGS. 74a and 74b are schematic representations showing the structure of a display section of a general display section which is driven by a simple matrix method, and signals usually applied to this display section.

In FIG. 74a, the general simple matrix-driven display section has X lines and Y lines which cross each other at right angles to uniquely define a matrix coordinate. When the operator wants to display a desired coordinate, a voltage is applied across associated X and Y lines, so that a display medium is activated or polarized. The application of a voltage is scanned in compliance with a given regulation. As shown in FIG. 74b, one of the coordinates, the Y coordinate in this case, is activated parallel, and the other coordinate, that is, the X lines are sequentially scanned around. One screen is displayed as a result of the continuation of this operation. On the assumption that the time required to apply a voltage to one coordinate is constant, the time necessary to change one screen is dependent on a total number of X lines. Even when a display region is limited to a certain rectangular shape, the time necessary to change one screen is still dependent on the number of associated X lines.

Figure 75A:
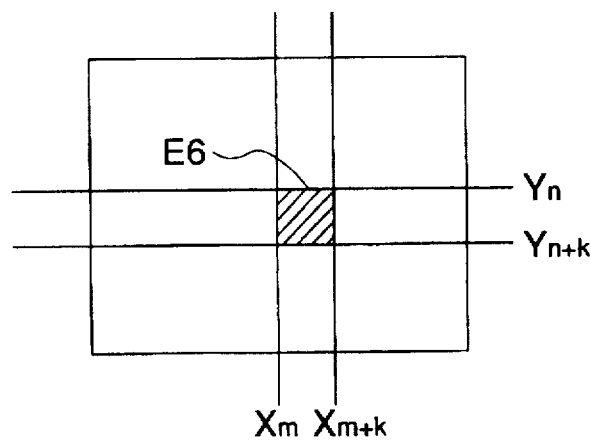
FIGS. 75(a) and 75(b) are schematic representations showing drive signals when modulated display is effected on a display according to an eighth embodiment of this invention.
Figure 75B:
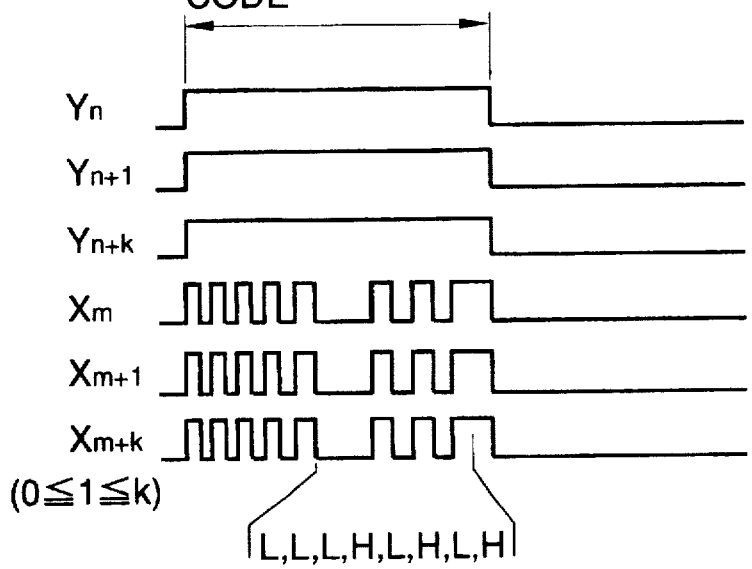
Figure 76:
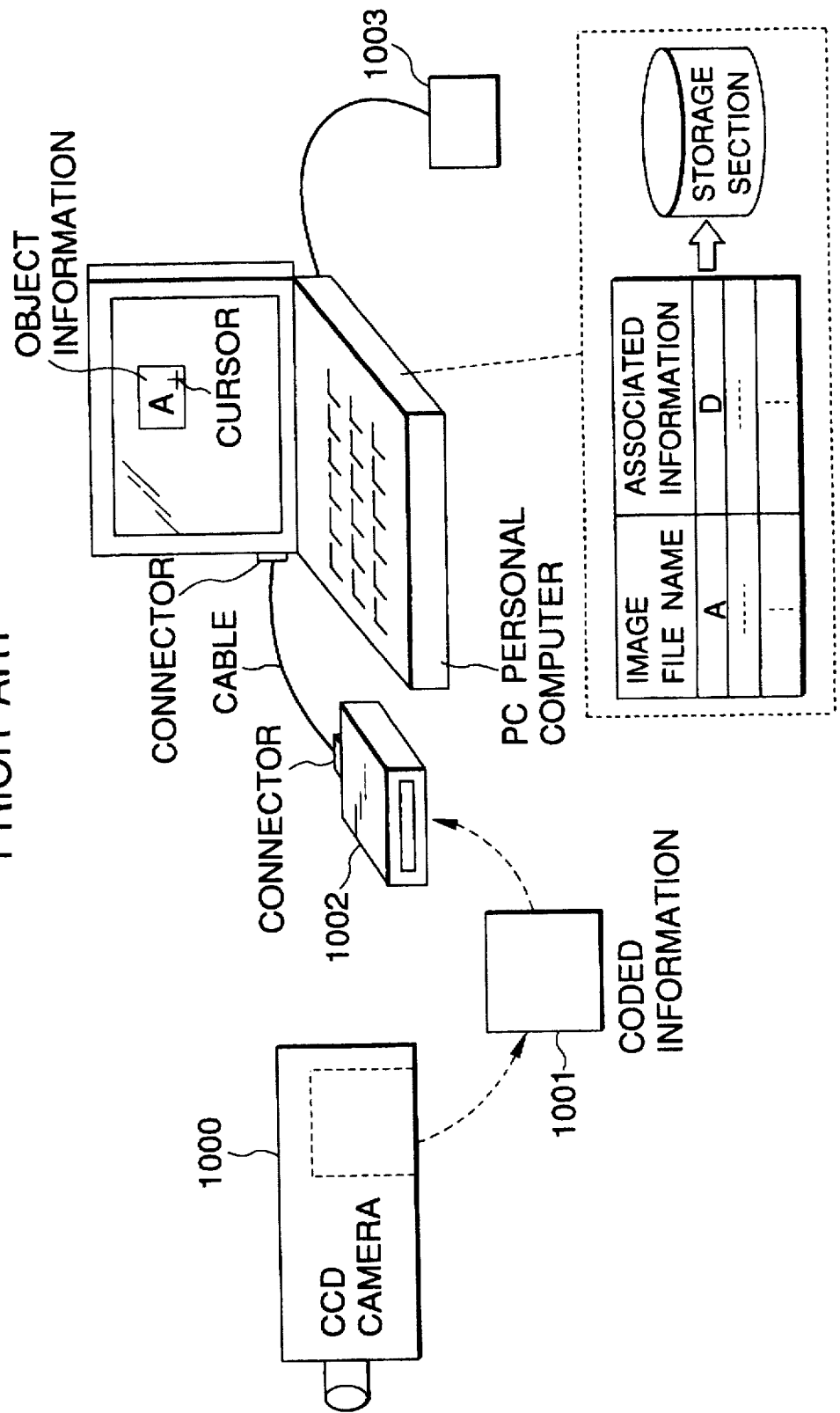
FIG. 76 is a schematic representation showing the transmission of information in a conventional information processing system.
Figure 77:
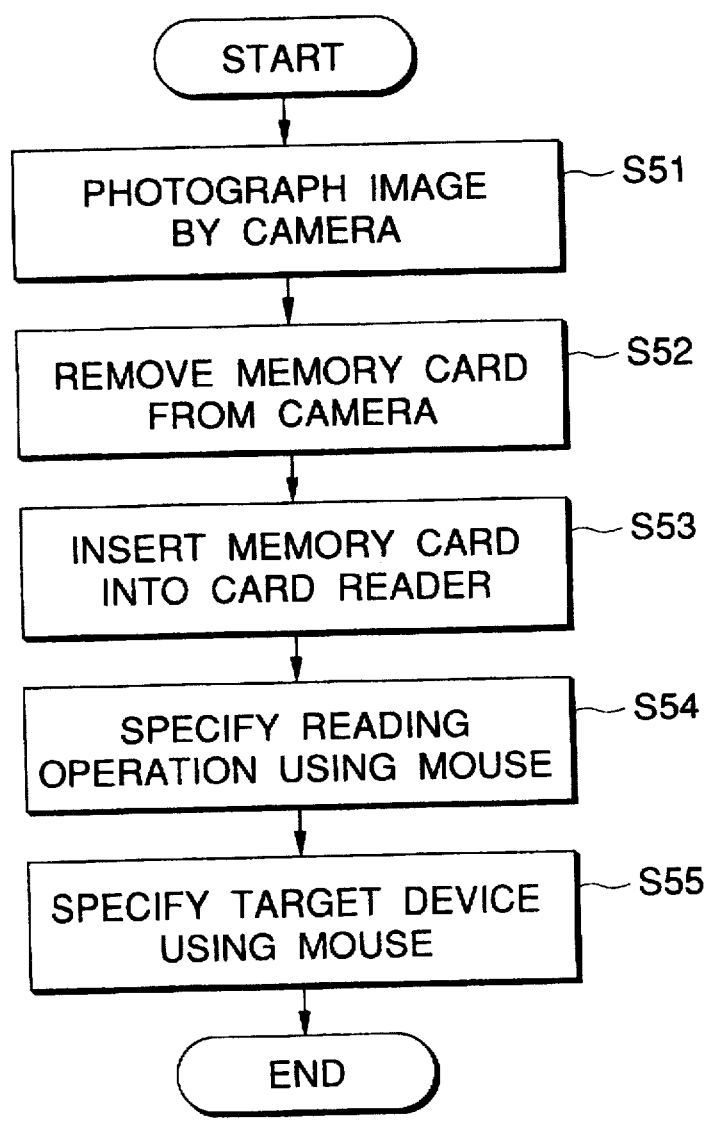
FIG. 77 is a flowchart showing operation procedures of an operator required when the information is transmitted as shown in FIG. 76.
Figure 78:
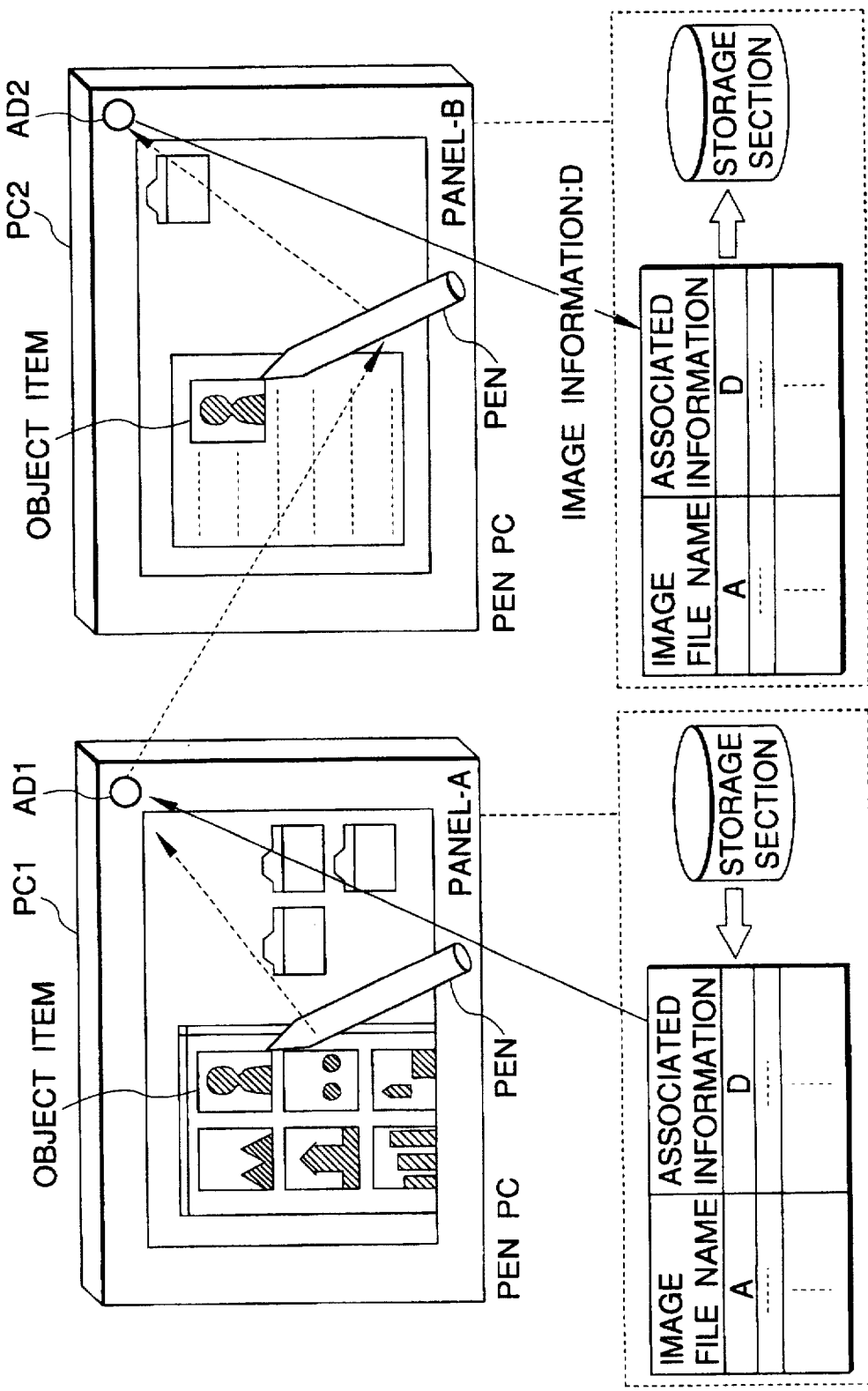
FIG. 78 is a schematic representation of a conventional example when information is transmitted between two information processing devices using a coordinate indicator.
Figure 79:
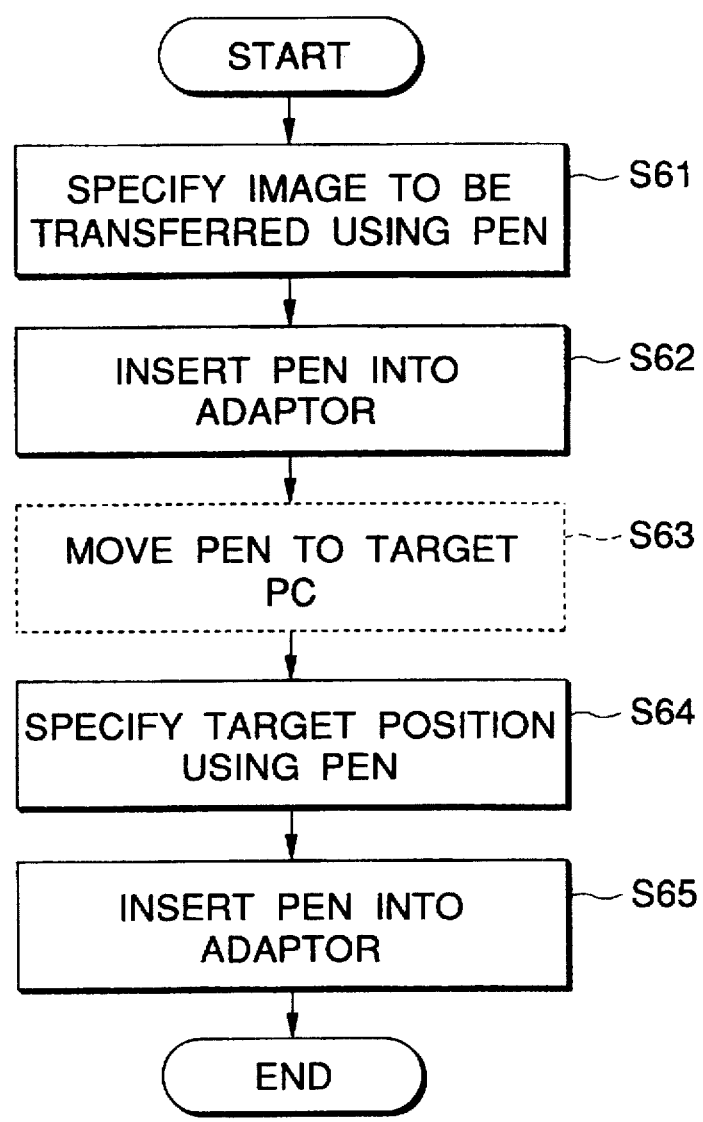
FIG. 79 is a flowchart showing operation procedures of an operator required when the information is transmitted as shown in FIG. 78.

FIGS. 75a and 75b are schematic representations showing drive signals used when a display region in the display section of the eighth embodiment is modulated. When a rectangular region E6 which is displayed in a modulated way is set in the manner as shown in FIG. 75a, a timing chart of the drive signals becomes as it is shown in FIG. 75b.

Particularly, when medium having properties like memory is used for the display device, the disappearance of a display or display failures never arise in any other region even if the drive method of the eighth embodiment is employed. Six signals shown in FIG. 75b comprise three Y lines of interest, that is, Yn, Yn+i, and Yn+k, and three X lines of interest, that is, Xm, Xm+i, and Xm+k, where $0 \leq i \leq k$. As a result of this, X and Y lines associated with the rectangular region E6 can be driven by one operation. Further, as shown in FIG. 74, it is possible to display all of the pixels in the rectangular region E6 within a constant application period of time. Specifically, the display of all the pixels in the rectangular region E6 is neither dependent on the number of X lines nor the number of Y lines of the rectangular region E6. When a code which represents normality is transmitted, the time required to transmit that code is dependent on the amount of the code to be transmitted.

As a result of this, it is possible to reduce the cycle of display modulation, and hence a rate of transmission of information can be improved.

As a matter of course, the above embodiments can be combined with each other as required.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. An information input/output system comprising:
   (1) an information processing device including:
   display means for displaying an object to be processed at a desired position;
   position detection means for detecting positional information based on indication information from outward;
   code extraction means for extracting coded information from the indication information;
   information control means for storing the detected positional information and the extracted coded information by associating with each other; and
   information processing means for carrying out predetermined processing; and
   (2) a wireless coordinate indicator including:
   storage means for storing the coded information; and
   signal transmission means for transmitting the coded information and the positional information to said information processing device;
   wherein the coded information is transmitted from said wireless coordinate indicator to said information processing device on the basis of positional relationship associated with coordinate indicating points of the object on said display means.

2. The information input/output system as defined in claim 1, wherein said wireless coordinate indicator further includes: information collecting means and coded information generation means, wherein collected information is converted into the coded information, and the coded information is stored in said storage means.

3. The information input/output system as defined in claim 1, wherein said information processing device further includes:
   coded information receiving error detection means; and
   error notification means for notifying said wireless coordinate indicator of error information when transmission errors arise; and
   said wireless coordinate indicator further includes:
   error recognition means for recognizing the error information, and coded information retransmission means for retransmitting the corresponding coded information depending on the recognized error information.

4. The information input/output system as defined in claim 1, wherein said information processing device further includes:
   reference value generation means for generating a reference value of a coded information receiving level; and
   reference value notification means for notifying said wireless coordinate indicator of the reference value to with predetermined timing; and
   said wireless coordinate indicator further includes:
   reference value recognition means for recognizing the reference value; and
   correction means for correcting a coded information transmission level on the basis of the recognized reference value.

5. The information input/output system as defined in claim 1, wherein the coded information is transmitted parallel between said wireless coordinate indicator and said information processing device.

6. The information input/output system as defined in claim 1, wherein the positional information and the coded information are transmitted in the form of a base band signal while said wireless coordinate indicator and said information processing device are closely connected with each other at an arbitrary position on one of said display means, said position detection means and said information detection means of said information processing device.

7. An information input/output system comprising:
   (1) an information processing device including:
   information control means for controlling an object to be processed and coded information associated with the object;
   display means for displaying the object at a predetermined position;
   position detection means for detecting positional information based on indication information from outward;
   coded information specifying means for specifying the associated coded information based on the detected positional information; and
   signal generation means for transmitting the thus specified coded information to outward; and
   (2) a wireless coordinate indicator including:
   signal transmission means for transmitting the positional information to said information processing device;
   coded information receiving means for receiving the coded information from said information processing device; and
   storage means for storing the coded information;
   wherein the coded information is transmitted from said information processing device to said wireless coordinate indicator on the basis of positional relationship associated with coordinate indicating points of the object on said display means.

8. The information input/output system as defined in claim 7, wherein said wireless coordinate indicator further includes: one of printing means and data transfer means, wherein the coded information stored in said storage means is output to outward.

9. The information input/output system as defined in claims 7, wherein said display means displays each of bits substantially concentrically in a modulated way, when displaying coordinate indicating points of the object.

10. The information input/output system as defined in claim 7, wherein said display means moves a modulation display region of an indicated coordinate point corresponding to positional displacements of said wireless coordinate indicator, when displaying the coordinate indicating points of the object.

11. The information input/output system as defined in claim 7, wherein said display means specifies drive pixels in such a way that the modulation density of an indicator becomes maximum, when displaying the indicated coordinate points of the object.

12. The information input/output system as defined in claim 7, wherein said display means hypothetically shows coordinate indicating points at a position different from the position of the coordinate indicating points for transmitting information between said information processing device and said wireless indicator, when displaying the coordinate indicating points of the object.

13. The information input/output system as defined in claim 7, wherein said display means is a display device which is driven by a simple matrix method, and a display range is limited to a rectangular shape.

14. The information input/output system as defined in claim 7, wherein the display means of the information processing device indicates that the position indicated by the wireless coordinate indicator is an exit for information, when displaying the coordinate indicating points of the object.

15. The information input/output system as defined in claim 7, wherein the coded information is transmitted parallel between said wireless coordinate indicator and said information processing device.

16. The information input/output system as defined in claim 7, wherein the positional information and the coded information are transmitted in the form of a base band signal while said wireless coordinate indicator and said information processing device are closely connected with each other at an arbitrary position on one of said display means, said position detection means and said information detection means of said information processing device.

17. An information input/output system comprising:
(1) an information processing device including:
information control means for controlling an object to be processed and coded information associated with the object;
display means for displaying the object at a predetermined position;
indication information detection means for detecting positional information and the coded information based on indication information from outward;
coded information specifying means for specifying associated coded information based on the detected positional information;
signal generation means for transmitting the thus specified coded information to outward;
information storage means for storing the detected positional information and the extracted coded information in said information control means by associating with each other; and
information processing means for executing predetermined processing; and
(2) a wireless coordinate indicator including:
signal transmission means for transmitting the code information and the positional information to said information processing device;
coded information receiving means for receiving the coded information from said information processing device; and
storage means for storing the coded information;
wherein the coded information is bidirectionally transmitted between said information processing device and said wireless coordinate indicator on the basis of positional relationship associated with coordinate indicating points of the object.

18. The information input/output system as defined in claim 17, wherein said display means displays each of bits substantially concentrically in a modulated way, when displaying coordinate indicating points of the object.

19. The information input/output system as defined in claim 17, wherein said display means moves a modulation display region of an indicated coordinate point corresponding to positional displacements of said wireless coordinate indicator, when displaying the coordinate indicating points of the object.

20. The information input/output system as defined in claim 17, wherein said display means specifies drive pixels in such a way that the modulation density of an indicator becomes maximum, when displaying the indicated coordinate points of the object.

21. The information input/output system as defined in claim 17, wherein said display means hypothetically shows coordinate indicating points at a position different from the position of the coordinate indicating points for transmitting information between said information processing device and said wireless indicator, when displaying the coordinate indicating points of the object.

22. The information input/output system as defined in claim 17, wherein said display means is a display device which is driven by a simple matrix method, and a display range is limited to a rectangular shape.

23. The information input/output system as defined in claim 17, wherein the display means of the information processing device indicates that the position indicated by the wireless coordinate indicator is an exit for information, when displaying the coordinate indicating points of the object.

24. The information input/output system as defined in claim 17, wherein said information processing device further includes:
coded information receiving error detection means; and
error notification means for notifying said wireless coordinate indicator of error information when transmission errors arise; and
said wireless coordinate indicator further includes:
error recognition means for recognizing the error information, and coded information retransmission means for retransmitting the corresponding coded information depending on the recognized error information.

25. The information input/output system as defined in claim 17, wherein said information processing device further includes:
reference value generation means for generating a reference value of a coded information receiving level; and
reference value notification means for notifying said wireless coordinate indicator of the reference value to with predetermined timing; and
said wireless coordinate indicator further includes:
reference value recognition means for recognizing the reference value; and
correction means for correcting a coded information transmission level on the basis of the recognized reference value.

26. The information input/output system as defined in claim 17, wherein the coded information is transmitted parallel between said wireless coordinate indicator and said information processing device.

27. The information input/output system as defined in claim 17, wherein the positional information and the coded information are transmitted in the form of a base band signal while said wireless coordinate indicator and said information processing device are closely connected with each other at an arbitrary position on one of said display means, said position detection means and said information detection means of said information processing device.

* * * * *